US012627736B2

(12) United States Patent
Nixon et al.

(10) Patent No.: US 12,627,736 B2
(45) Date of Patent: May 12, 2026

(54) PUBLISH-SUBSCRIBE COMMUNICATION ARCHITECTURE FOR FIELD DEVICES IN CONTROL AND AUTOMATION SYSTEMS

(71) Applicant: FISHER-ROSEMOUNT SYSTEMS, INC., Round Rock, TX (US)

(72) Inventors: Mark J. Nixon, Thorndale, TX (US); Gary K. Law, Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 18/514,543

(22) Filed: Nov. 20, 2023

(65) Prior Publication Data

US 2024/0089326 A1 Mar. 14, 2024

Related U.S. Application Data

(63) Continuation of application No. 17/017,399, filed on Sep. 10, 2020, now Pat. No. 11,824,934.

(51) Int. Cl.
H04L 67/12 (2022.01)
G05B 19/05 (2006.01)

(52) U.S. Cl.
CPC ............ H04L 67/12 (2013.01); G05B 19/058 (2013.01)

(58) Field of Classification Search
CPC ....... H04L 67/12; H04L 67/125; H04L 67/55; H04L 63/0823; H04L 63/0876;
(Continued)

(56) References Cited

U.S. PATENT DOCUMENTS 8,060,012 B2 11/2011 Sklovsky et al.
8,332,567 B2 12/2012 Burr et al.
(Continued)

FOREIGN PATENT DOCUMENTS

CN 101141339 A 3/2008
CN 101232421 A 7/2008
(Continued)

OTHER PUBLICATIONS

"FieldComm Group," (2018). Retrieved from the Internet at: <URL:https://fieldcommgroup.org/sites/default/files/global/Singapore/5%20FCG-181012_APLinAnutshell_1v0.5pptx.pdf>.
(Continued)

*Primary Examiner* — Johnny B Aguiar
(74) *Attorney, Agent, or Firm* — MARSHALL, GERSTEIN & BORUN LLP

(57) ABSTRACT

A method includes receiving at a field device, from a first client device or application, a message indicating a selection of a first one of a plurality of publish categories corresponding to a type of information desired by the first client device or application. The method further includes transmitting, from the field device to the first client device or application, an identification of each of a plurality of publish lists corresponding to the first one of the selected publish category. The publish lists are stored on the field device and each includes a set of parameters associated with the field device. The method includes receiving at the field device, from the first client device or application, a selection of a publish list identified by the field device, and transmitting, from the field device to the first client device or application, the set of parameters associated with the selected publish list.

39 Claims, 18 Drawing Sheets

(58) Field of Classification Search

CPC ............. H04L 63/0435; H04L 63/0442; H04L 63/1408; G05B 19/058; G05B 19/0426; G05B 2219/25205; G05B 2219/25428; G05B 19/4186; G05B 2219/31129; G06F 8/654; G06F 9/4401; G06F 21/606; G06F 21/575

See application file for complete search history.

(56) References Cited

U.S. PATENT DOCUMENTS

| | | | |
|---|---|---|---|
| 8,516,095 | B2 | 8/2013 | Eisener et al. |
| 8,898,481 | B1 | 11/2014 | Osburn, III et al. |
| 9,699,022 | B2 | 7/2017 | Bale et al. |
| 9,804,647 | B2 | 10/2017 | Nicholas et al. |
| 10,999,734 | B1 | 5/2021 | Alexander et al. |
| 11,076,001 | B1 | 7/2021 | Mohamed |
| 11,256,238 | B1 | 2/2022 | Nixon et al. |
| 11,275,861 | B2 | 3/2022 | Neitzel et al. |
| 11,281,650 | B2 | 3/2022 | Okamura |
| 2002/0077711 | A1 | 6/2002 | Nixon et al. |
| 2002/0163427 | A1* | 11/2002 | Eryurek .............. G05B 23/027 340/500 |
| 2004/0078600 | A1 | 4/2004 | Nilsen et al. |
| 2005/0007249 | A1 | 1/2005 | Eryurek et al. |
| 2006/0140209 | A1 | 6/2006 | Cassiolato et al. |
| 2006/0238364 | A1 | 10/2006 | Keefe et al. |
| 2007/0055391 | A1 | 3/2007 | Schneider et al. |
| 2008/0133721 | A1 | 6/2008 | Danz et al. |
| 2009/0292524 | A1 | 11/2009 | Anne et al. |
| 2010/0280636 | A1 | 11/2010 | Holland et al. |
| 2011/0258426 | A1 | 10/2011 | Mujtaba et al. |
| 2014/0107808 | A1 | 4/2014 | Yamamoto et al. |
| 2014/0277656 | A1* | 9/2014 | Nixon ............... G05B 19/4185 700/95 |
| 2015/0066979 | A1 | 3/2015 | Zhang et al. |
| 2015/0095789 | A1 | 4/2015 | Hyde |
| 2015/0127120 | A1 | 5/2015 | Telljohann et al. |
| 2016/0254609 | A1 | 9/2016 | Larsson et al. |
| 2016/0378101 | A1 | 12/2016 | Leonard |
| 2017/0102678 | A1* | 4/2017 | Nixon ............... G05B 19/4185 |
| 2017/0199843 | A1 | 7/2017 | Nixon et al. |
| 2017/0351226 | A1 | 12/2017 | Bliss |
| 2018/0024847 | A1 | 1/2018 | Campbell et al. |
| 2018/0026942 | A1* | 1/2018 | De Ligt ................... H04L 67/12 709/245 |
| 2018/0101152 | A1 | 4/2018 | Jundt et al. |
| 2018/0107179 | A1* | 4/2018 | Nixon ............... H04L 65/1083 |
| 2018/0210429 | A1 | 7/2018 | Jundt |
| 2018/0299274 | A1 | 10/2018 | Moghe et al. |
| 2018/0299849 | A1 | 10/2018 | Martin et al. |
| 2019/0115785 | A1 | 4/2019 | Kallamkote et al. |
| 2019/0138375 | A1 | 5/2019 | Dinh et al. |
| 2019/0244517 | A1 | 8/2019 | Moustafa et al. |
| 2019/0258214 | A1 | 8/2019 | Iwayama |
| 2019/0320025 | A1 | 10/2019 | Breter |
| 2019/0320451 | A1 | 10/2019 | Hansen et al. |
| 2019/0334860 | A1 | 10/2019 | Albrecht et al. |
| 2020/0081426 | A1 | 3/2020 | Kane et al. |
| 2020/0235949 | A1 | 7/2020 | Jones et al. |
| 2020/0287895 | A1 | 9/2020 | Hottgenroth |
| 2020/0334402 | A1 | 10/2020 | Grefen |
| 2020/0351089 | A1 | 11/2020 | Wentz |
| 2020/0366513 | A1* | 11/2020 | Yoneda ................... H04L 67/55 |
| 2021/0081346 | A1 | 3/2021 | Nixon et al. |
| 2021/0089278 | A1 | 3/2021 | Dunn et al. |
| 2021/0233115 | A1 | 7/2021 | Kardesler et al. |
| 2021/0266346 | A1 | 8/2021 | Gordon et al. |
| 2023/0097557 | A1 | 3/2023 | Ryecroft et al. |
| 2023/0314173 | A1* | 10/2023 | Welle ..................... G01D 21/02 702/189 |

FOREIGN PATENT DOCUMENTS

| | | |
|---|---|---|
| CN | 101588262 A | 11/2009 |
| CN | 101651720 A | 2/2010 |
| CN | 102047223 A | 5/2011 |
| CN | 102073316 A | 5/2011 |
| CN | 102271053 A | 12/2011 |
| CN | 102594579 A | 7/2012 |
| CN | 104767682 A | 7/2015 |
| CN | 104823121 A | 8/2015 |
| CN | 104950837 A | 9/2015 |
| CN | 106506230 A | 3/2017 |
| CN | 107272480 A | 10/2017 |
| CN | 108028068 A | 5/2018 |
| CN | 108718110 A | 10/2018 |
| CN | 109143992 A | 1/2019 |
| CN | 109189008 A | 1/2019 |
| CN | 110109427 A | 8/2019 |
| CN | 111314495 A | 6/2020 |
| CN | 111600754 A | 8/2020 |
| DE | 19510247 A1 | 10/1996 |
| DE | 102017123821 A1 | 4/2019 |
| EP | 2 897 299 A1 | 7/2015 |
| GB | 2 355 082 A | 4/2001 |
| GB | 2 568 379 A | 5/2019 |
| JP | 2010-524082 A | 7/2010 |
| JP | 2012-068947 A | 4/2012 |
| JP | 2012-090194 A | 5/2012 |
| JP | 2012-182599 A | 9/2012 |
| JP | 2013-089204 A | 5/2013 |
| JP | 2014-507917 A | 3/2014 |
| JP | 2015-503803 A | 2/2015 |
| JP | 2018-014108 A | 1/2018 |
| JP | 2019-106172 A | 6/2019 |
| KR | 10-2019-0097744 A | 8/2019 |
| WO | WO-2014/051632 A1 | 4/2014 |
| WO | WO-2018/005479 A1 | 1/2018 |
| WO | WO-2022/008071 A1 | 1/2022 |

OTHER PUBLICATIONS

"IEEE Computer Society, IEEE Standard for Ethernet Amendment 5: Phyical Layers Specification and Management Parameters for 10/Mb/s Operation and Associated Power Delievery Over a Single Balanced Pair of Conductors," (Feb. 2020). Retrieved from the Internet at: <URL:https://standards.ieee.org/ieee/802.3cg/7308>.

Alexander "DHCP Options and BOOTP Vendor Extensions," Network Working Gropu (Mar. 1997).

Anonymous, "Advanced Physical Layer," Wikipedia (2020).

Anonymous, "Ethernet-APL White Paper," (2022).

Anonymous, "Programmable Logic Controller," Wikipedia (2020).

Anonymous, "Public Key Infrastructure," Wikipedia (2018).

Anonymous, "Time-Sensitive Networking," Wikipedia (2020).

FieldComm Group "Ethernet To the Field," (2020).

Hoffman "The DNS-Based Authentication of Named Entities (DANE) Transport Layer Security (TLS) Protocol: TLSA," Internet Engineering Task Force (Aug. 2012).

Larson, "Advanced Physical Layer Standard to Make Field-Level Ethernet a Reality," (Jun. 2020). Retrieved from the Internet at: URL:https://www.controlglobal.com/articles/2020/advanced-physical-layer-standard-to-make-field-level-ethernet-a-reality/>.

Search Report for Application No. GB2112178.5, dated May 4, 2022.

Search Report for Application No. GB2112206.4, dated Jan. 21, 2022.

Search Report for Application No. GB2112855.8, dated May 5, 2022.

Search Report for Application No. GB2112857.4, dated May 12, 2022.

Search Report for Application No. GB2112858.2, dated May 13, 2022.

Notification of the First Office Action for Chinese Application No. 202111062270.1, dated Oct. 21, 2024.

Notification of the First Office Action for Chinese Application No. 202111063528.X, dated Oct. 19, 2024.

(56) References Cited

OTHER PUBLICATIONS

First Chinese Office Action for Application No. 202111063387.1, dated Nov. 12, 2024.

Yufei et al., "Design and implement of data communication interface for power plant," Electric Power Automation Equipment, 30(6) (2010).

IEEE Standard for Local and Metropolitan Area Networks— Bridges and Bridged Networks, IEEE Std 802. IQ-2018 (Revision of IEEE Std 802. IQ-2014), May 7, 2018, p. 197-205. <URL:https://ieeexplore.ieee.org/document/8403927>.

Office Action for Chinese Application No. 202111061968.1, dated Mar. 20, 2025.

Office Action for Chinese Application No. 202111063855.5, dated Mar. 18, 2025.

Office Action for Japanese Application No. 2021-136996, dated Mar. 18, 2025.

Office Action for Japanese Application No. 2021-142626, dated Mar. 25, 2025.

Office Action for Japanese Application No. 2021-142646, dated Apr. 7, 2025.

Takahashi, Japan Field Comm Group, Explosion-proof Ethernet (APL), Mar. 8, 2019. <URL:https://www.fieldcommgroup.org/sites/default/files/imce_files/technology/documents/4_apl.pdf>.

* cited by examiner

PUBLISH-SUBSCRIBE COMMUNICATION ARCHITECTURE FOR FIELD DEVICES IN CONTROL AND AUTOMATION SYSTEMS

CROSS REFERENCE TO RELATED APPLICATION(S)

This application is a continuation of U.S. patent application Ser. No. 17/017,399, filed on Sep. 10, 2020 and entitled "Security Systems for Use in Implementing Highly-Versatile Field Devices and Communication Networks in Control and Automation Systems," which issued as U.S. Pat. No. 11,824,934 on Nov. 21, 2023, the entire disclosure of which is incorporated by reference herein.

TECHNICAL FIELD

The present application relates generally to process control and factory automation systems and, more particularly, to enhanced field devices used in these systems that are capable of simultaneously performing various different functions in different contexts and of communicating with different or separate client devices or applications using one or more different communication protocols.

BACKGROUND

Distributed process control systems, like those used in chemical, petroleum, industrial or other process plants to manufacture, refine, transform, generate, or produce physical materials or products, typically include one or more process controllers communicatively coupled to one or more field devices via physical layers that may be analog, digital or combined analog/digital buses, or that may include one or more wireless communication links or networks.

The field devices, which may be, for example, valves, valve positioners, switches and transmitters (e.g., temperature, pressure, level and flow rate sensors), are located within the process environment and generally perform physical process control functions such as opening or closing valves, measuring process and/or environmental parameters such as flow, temperature or pressure, etc. to control one or more processes executing within the process plant or system. Smart field devices, such as the field devices conforming to the well-known FOUNDATION® Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a control application that runs, for example, different control modules which make process control decisions, generate process control signals based on the received information and coordinate with the control modules or blocks being performed in the field devices, such as HART®, WirelessHART®, and FOUNDATION® Fieldbus field devices. To perform this communication, the control modules in the process controller send the control signals to various different input/output (I/O) devices, which then send these control signals over specialized communication lines or links (communication physical layers) to the actual field devices to thereby control the operation of at least a portion of the process plant or system, e.g., to control at least a portion of one or more industrial processes running or executing within the plant or system. The I/O devices, which are also typically located within the plant environment, are generally disposed between a process controller and one or more field devices, and enable communications there-between, e.g., by converting electrical signals into digital values and vice versa. Different I/O devices are provided to support field devices that use different specialized communication protocols. More particularly, a different I/O device is provided between a process controller and each of the field devices that uses a particular communication protocol, such that a first I/O device is used to support HART field devices, a second I/O device is used to support Fieldbus field devices, a third I/O device is used to support Profibus field devices, etc. As utilized herein, field devices, controllers, and I/O devices are generally referred to as "process control devices," and are generally located, disposed, or installed in a field environment of a process control system or plant.

Still further, information from the field devices and the process controller is usually made available through the process controllers over a data highway or communication network to one or more other hardware devices, such as operator workstations, personal computers or computing devices, data historians, report generators, centralized databases, or other centralized administrative computing devices that are typically placed in control rooms or other locations away from the harsher field environment of the plant, e.g., in a back-end environment of the process plant. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing process control software, keeping and updating a configuration database, etc. The data highway utilized by the hardware devices and process controllers may include a wired communication path, a wireless communication path, or a combination of wired and wireless communication paths, and typically uses a packet-based communication protocol and non-time sensitive communication protocol, such as an Ethernet or IP protocol.

As indicated above, a process control system can include a plurality of field devices that provide many different functional capabilities within a plant, and these field devices are generally communicatively coupled to process controllers using one of various different types of specialized physical interfaces or physical layers of a communication interface developed specifically for process control. For example, a common process control communication physical interface uses a two-wire interface set up in either a point-to-point wiring connection arrangement (e.g., only one field device communicatively coupled to a particular wire interface) or in a multi-drop wiring connection arrangement (e.g., a plurality of field devices communicatively coupled to a wire interface). However, some field devices may be connected with a controller using a wireless communications physical layer which may include wireless gateway and transmitter/receiver devices. Still further field devices are typically configured to communicate with the process controllers using one of various different highly specialized communication protocols. These communication protocols are typically digital signal protocols but can be analog protocols (e.g., the 4-20 ma protocol) or combined digital and analog protocols (e.g., the HART protocol). Some of these protocols operate using relatively simple commands and/or communications (e.g., an ON command and an OFF command as used in the CAN protocol), while other protocols are more complex requiring more commands and/or more communication information, which may or may not include simple commands. For example, more complex protocols may communicate analog values with digital communications superimposed on the analog value using, for example, a Highway Addressable Remote Transducer (HART®) communication protocol. Other field devices can use entirely digital communications (e.g., a FOUNDATION® Fieldbus communication protocol) that provides many types of communications. Other process control communication protocols include the PROFIBUS communication protocol, although still other process control communication protocols have been developed and are being used as well. Each of these communication protocols calls for, or needs to be supported by a particular physical layer, which may include a two-wire, a four wire, etc. physical layer, particular switches, etc. Moreover, the physical layer may specify maximum or minimum wire lengths, wire thicknesses, wire types, termination types, other electrical characteristics, etc. Importantly, however, the field devices are configured to communicate using a single protocol and have a unified interface that communicates using that communication protocol and the physical layer associated with that protocol.

As a result of the development of these various field device communication protocols, each of which typically uses different communication wiring (physical layers) and signaling formats, various different field devices (e.g., field devices that use the different protocols) are communicatively connected to the process controller via different input/output devices (I/O devices), with each different I/O device conforming to a different one of the process control protocols and supporting a particular type of physical layer. That is, a typical plant may have a controller coupled to multiple different I/O devices including a Fieldbus I/O device (which in turn couples to one or more FOUNDATION Fieldbus field devices via a FOUNDATION Fieldbus compliant two-wire or four-wire bus), a HART I/O device which couples to each of one or more HART compliant field devices via a separate two-wire or four wire single drop connection, a CAN I/O device which couples to one or more CAN compliant field devices via a CAN compliant wiring connection, and so on.

Additionally, coupling the communication ports of field devices to a terminal block of an I/O device and, eventually, to a process controller in the process plant is generally a complex process. Field devices must be coupled to I/O cards that translate the signals received from the field devices to signals that can be processed by the process controllers and that translate the signals received from the controllers to signals that can be processed by the field devices. As a result, each channel of each I/O card, corresponding to a particular field device, must be associated with the appropriate signal types (so that signals are processed appropriately by the I/O card) and the I/O card must be communicatively coupled to the controller or controllers that will eventually be receiving signals from and/or sending signals to the field devices coupled to that I/O card.

As noted above, each field device is coupled to an I/O device using a particular communication medium or physical layer (e.g., a two-wire cable, a wireless link, or an optical fiber) via a terminal block on the I/O device, and further using one of the above or other specialized process control communication protocols (HART, CAN, WirelessHART, FOUNDATION Fieldbus, PROFIBUS, etc.) that have been developed in the process control industry. Still further, the I/O device is separately connected to a process controller, typically via another bus or wired connection. The use of these different I/O devices means that the physical and logical connections between different field devices must be precisely mapped so that the controllers connected to different I/O device can track which field devices are connected to which port of each I/O device in order to communicate signals via the correct "path" to that field device. This problem is especially cumbersome in the HART protocol, in which each field device is connected to a different output port of a HART compliant I/O device. Moreover, communication with a process control field device must occur via the defined communication path which typically incudes the field device communicating with a dedicated I/O device (typically via a first communication protocol), the I/O device communicating with a process controller (via a second and different communication protocol) and the process controller communicating with user devices or applications, such as process control operator applications, process control configuration applications, etc. located in servers or other user interface devices via a still a different communication protocol. In any event, all communications to and from the field device are routed or sent via specialized communication paths (links) through an I/O device and a process controller. As a result, all data to and from the field devices must be sent through the process controller and one or more I/O devices. In this case, the process controller must initiate and coordinate all messages or communications to and from the field device via the specified link from the process controller to the I/O device and from the I/O device to the field device. This configuration provides for a high degree of security as all applications seeking to communicate with the field device must be able to (and be authorized to) communicate with the process controller, which then serves as a proxy or server for information from the field device. Moreover, exterior applications are unable to communicate directly with the field device.

While process control field devices typically use specialized communication hardware and protocols, it is well known to use a general purpose IP or other packet-based communication protocol to perform communications between certain other devices within a process plant. For example, it is common to use a packet-based or general purpose IP protocol on an Ethernet bus that communicatively connects one or more distributed process controllers to one or more user interfaces, databases (e.g., configuration databases and historian databases), servers, etc. within a back-end plant environment. As such, Ethernet, which is a physical layer and partly a data link layer, is an important communication platform for automation systems as Ethernet enables flexibility, scalability, and performance in a way not seen before in automation. To help support the adoption of Ethernet in automation, an Advanced Physical Layer (APL) specification is being designed to support the connection of field devices in remote and hazardous locations. Behind APL is the IEEE P802.3cg project which is focused on the development of enhancements to the existing IEEE 802.3 Ethernet standard (IEEE 802.3) for Ethernet via twisted-pair wiring (10BASE-T1L). This development is significant because there is a long list of automation protocols developed for various purposes that can run on top of an Ethernet physical layer.

In support of this emerging Ethernet based communication development in process control, the FieldComm Group has standardized HART-IP as part of the HART 7 release. Although HART-IP was initially designed to allow hosts to efficiently communicate with gateways, it has now emerged as a method for devices to communicate directly with I/O servers and hosts/controllers. HART-IP today is already being used in monitoring, control, diagnostics, and condition monitoring applications. Because HART-IP already has available to it a full description of devices, it is a good protocol to layer on top of APL. Moreover, another protocol that is seeing wide-spread support at the device level is OPC Unified Architecture (OPC UA). Although OPC UA does not natively understand device communications and types, considerable effort is underway to provide some level of support in this regard. Although HART-IP and OPC UA are likely to be adopted relatively quickly by the marketplace, they will not be alone in their use. Other protocols, such as EthernetIP and PROFINET are already available on Ethernet and will be able to run on APL when it is available. In addition, IT-driven protocols such as MQTT and AMQP will emerge as important protocols as the Industrial Internet of Things (IIoT) gains acceptance.

However, supporting an Ethernet or other advanced physical layer, such as those associated with a packet-based or general purpose IP communication protocol, in a process plant that already includes an installed base that relies heavily on more traditional field devices, for example, HART or FOUNDATION Fieldbus field devices, is difficult and not straight forward, as these various communication protocols will need to be synthesized or merged at some place in the process control network via one or more electronic marshalling cabinets or devices. It is presently unclear how such advanced protocols can be integrated within typical process plant architecture to operate reliably and in a robust manner.

Still further, there are other systems, besides control systems, which have been developed to support other activities within process plants and factory automation environments. Plant Asset Management (PAM) or maintenance systems are typically set up to enable maintenance personnel to perform maintenance activities on devices in the plant or factory setting, such as field devices but also including other types of devices. The PAM is used to configure and provision devices, run diagnostics on devices once deployed, monitor device alerts, as well as perform a large list of many other functions. Still further condition monitoring systems are becoming more common and are being deployed at many sites. Condition monitoring systems may perform a wide range of functions including energy monitoring, equipment and device monitoring, and process monitoring. These condition monitoring systems generally stream data from the plant, perform the condition monitoring, and provide recommendations back to users and in some cases to the control systems themselves. Likewise, data logging systems exist in plant and factory automation settings to collect and log data for later use. For example, energy and monitoring data may be collected in a centralized manner by a data logging system for use in analyzing and establishing an alarm management system, e.g., if a water leakage is detected or energy is being lost due to a leak or break in piping. Likewise, smart metering systems are being implemented in many settings to perform ongoing or continuous metering. Metering can be a critical process in large-scale distributed systems such oil and gas fields, pipelines, chemical storage and finished product storage. In chemical storage systems, for example, it is important to have an accurate reading on what materials are present. Smart metering refers to the procedure of installing intelligent meter-reading systems, reading these meters through either a controller or independently through remote monitoring systems, and transporting the readings to the processing locations, such as edge gateways or central data servers. Additionally, environmental monitoring needs to be performed in many settings based on safety concerns, EPA mandates or rules, etc. For example, many plants have environmental reporting requirements, such as the reporting of NOx, SOx, and other items, and it is critical that the data from these systems be timestamped, immune to daylight savings time adjustments and secure.

In any event, these other systems are, in many cases, dedicated systems that perform data collection, calculations and reporting in a manner that is separate from the process control system. In these cases, these systems require their own infrastructure, wiring, communication paths, communication protocols, etc. In some cases, such as in plant asset management systems, these systems may communicate with and use some or all of the process control field devices. However, in these instances, the applications, servers, or other data collection devices must communicate with the field devices via the process controller using the various specialized field device protocols and physical layers installed for the field devices, to obtain data from the field devices, to send messages to the field devices, and to perform other activities with respect to the field devices. Again, in these cases, the process controllers (and typically, one or more I/O devices) are involved in and are responsible for performing communications with the field devices to support these other systems, and the field devices themselves have no specific knowledge of or ability to directly support these other systems. This technique puts the process controller in the middle of and responsible for performing communications with the field devices to support other applications or uses besides process control, such as maintenance activities, continuous monitoring, metering, etc. This additional load can make the process controller less effective or can lead to lost or slow communications with a particular field device because the process controller needs to prioritize which communications are necessary or needed in any particular situation. Moreover, this situation makes the field devices much less effective at supporting multiple uses.

SUMMARY

A new and highly versatile (HV) process control or factory automation field device is configured with security features and an interface and communication connection structure that enables the field device to operate as a data server that communicates with and supports multiple different applications or clients, either directly or indirectly, while simultaneously performing standard process and factory automation control functions in a highly secure manner. Moreover, various different process control and factory automation network architectures and, in particular, communication architectures, support the versatile field device to enable the versatile field device to simultaneously communicate with multiple different client devices or applications (each associated with a different system) via a common communication network infrastructure, using the same or different communication protocols in a highly secure manner. In one case, the communication architecture uses an IP based communication protocol and infrastructure connected directly to the highly versatile field device and this communication architecture may use one or more switches to route IP communications from/to the field devices to other client devices, such as process or factory automation controllers, condition monitoring systems, plant asset management systems, data logging systems, etc. In this case, the highly versatile field devices may be connected via a APL network (a level one network) to one or more client devices (e.g., a process or factory automation controller, a PAM system device, a data logger system, etc.) via a switch to a second level network that uses another IP based packet communication protocol, such as an Ethernet network. These one or more systems (e.g., the process controller of a process control system, a PAM server of a PAM system, a data logger database, a condition monitoring application of a condition monitoring system, etc.) may communicate directly with the highly versatile field devices via the second level network, a switch, and the first level network to obtain access to or to acquire data directly from the highly versatile field devices.

In still other cases, the various client devices and applications may be connected to a third level control network which is connected to the second level control network via a second switch which may implement security or isolation from the second level network. The other client devices or applications may be associated with non-control systems, such as PAM systems, data logging system, monitoring systems, etc. In yet another embodiment, the third level network may be connected via a firewall to an edge gateway device which may connect the third level network to various applications or devices in the cloud or at other remote locations, thereby enabling client devices in the cloud or other remote locations to obtain access to the field device data as clients to the field devices, via communication connections that use IP packet-based communications via the various networks.

In still another case, cloud based applications and devices (clients) may be connected directly to the first level network via a first level network switch, such as an APL power switch) to provide for support of applications at remote sites. This support may include process or factory automation controllers located in the cloud, and may include other applications or devices associated with other systems such as PAM systems, data logging systems, condition monitoring systems, etc. In another case, the highly versatile field devices may be installed in more traditional process control architecture that includes the use of traditional or legacy field devices connected to an APL network or other IP based communication network disposed in the plant. In still a further case, the highly versatile field devices may be connected via a first level, IP based communication network, such as an APL network to a flattened network, to which process controller, operator stations, applications stations, databases and engineering stations associated with both process control and other systems (e.g., PAM systems, data logging systems, condition monitoring systems) are connected.

The highly versatile (HV) field device and network architectures described herein are able to support APL or other Ethernet or general purpose IP based physical layers and the various communication protocols that run on top of them in a manner that enables the highly versatile field devices to act as servers to multiple different client devices simultaneously. In addition, the highly versatile field device described herein is able to nest protocols inside of other protocols for use when protocols, such as safety protocols, require additional handshaking, confirmations, etc. Still further, the highly versatile field device described herein includes configuration capabilities that enable easy configuration of a process control system by supporting multiple I/O types including packet-based, IP based, or other advanced protocols, such as HART-IP, OPC UA, Ethernet, etc. protocols. The highly versatile field device and associated network architectures described herein support a mixed physical layer and multiple protocol support that can be used to implement improved control while providing direct support for non-control systems, as the highly versatile field device described herein is able to support request/response, publish/subscribe, event-based communications, report communications, and streaming communications, that greatly help to support the combination of control and the Industrial Internet of Things (IIoT) applications (also generally referred to herein as monitoring systems) that are interested in measurement and actuator data, their capabilities, their diagnostics and information that can be determined by combinations of these measurements, capabilities and diagnostics.

Moreover, the highly versatile field device is highly secure as it includes a number of security features making it more secure in a more open communication environment for in which it is intended to be used. These securing features may include, for example, a root of trust feature, a secure boot feature, and endpoint identity feature, a secure storage, cryptographic capabilities, secure communications, secure device provisioning features and security audit functions, all combined in a field device to provide for a high level of security not ever before provided in a process control field device.

Accordingly, highly versatile (HV) field devices may be nodes of process control and/or automation networks as described herein, which are generally referred to herein as nodal communication networks. Nodal communication networks typically support packet-based, IP based, or other advanced protocols for communication of information between nodes of the network. New nodes, such as new HV field devices, may join a nodal communication network and be discovered by other nodes, and each node is identified within the nodal communication network by a unique endpoint identification. As such, in an embodiment, a system for managing nodes of a nodal communication network of a process control or automation system comprises a network node manager that is communicatively connected to the nodal communication network, and a Domain Name Service (DNS) that is accessible to the network node manager. The network node manager includes a mapping database that stores associations of respective tags or identifiers of a plurality of devices utilized in the process control or automation system to respective endpoint identifications of the plurality of devices utilized in the nodal communication network, where the plurality of devices includes one or more highly versatile (HV) field devices. Each of the one or more HV field devices has a respective one or more physical components that perform one or more respective physical functions during run-time operations of the process control or automation system to control an industrial process, for example. The network node manager further includes a state database storing respective states of the plurality of devices. The DNS of the system provides, via the nodal communication network, a response to a request for an endpoint identification of a particular device of the plurality of devices, where the response is generated based on the mapping database and the state database of the network node manager.

Moreover, as highly versatile (HV) field devices may join a nodal communication network and be discovered, in embodiments, a highly versatile field device comprises one or more physical components that perform a physical function to control an industrial process within the process control or automation system, a communication interface to the nodal communication network, one or more processors, and one or more non-transitory memories into which a tag or identifier corresponding to the HV field device has been provisioned and stored. The one or more non-transitory memories additionally store computer-executable instructions that, when executed by the one or more processors, cause the HV field device to: upon a powering up of the HV field device, detect that the HV field device is connected to the nodal communication network via the communication interface; and transmit, via the nodal communication network to a DHCP server of the nodal communication network, a request for an endpoint identification of the HV field device, where the request includes an indication of the tag or identifier corresponding to the HV field device. The execution of the computer-executable instructions by the one or more processors cause the HV field device further to obtain, from the DCHP server via the nodal communication network, an endpoint identification that has been assigned by the DCHP server to the HV field device; and establish, over the nodal communication network and by using the endpoint identification assigned to the HV field device, a communication session with another device, where the another device is a consumer of data generated by the HV field device, and the generated data corresponds to the physical function performed by the HV field device during the run-time operations of the process control or automation system. Additionally, the execution of the computer-executable instructions cause the HV field device still further to, during run-time operations of the process control or automation system, transmit the data corresponding to the physical function performed by the one or more physical components of the HV field device to the another device via the established communication session to thereby control the industrial process.

In an embodiment, a method at a highly versatile (HV) field device of a process control or automation system comprises detecting, by the HV field device upon a powering up of the HV field device, that the HV field device is connected, via a communication interface of the HV field device, to a nodal communication network that has nodes which are identified within the nodal communication network by respective endpoint identifications. Additionally, the method includes transmitting, by the HV field device via the nodal communication network to a DHCP server of the nodal communication network, a request for an endpoint identification by which the HV field device is to be identified within the nodal communication network, where the request includes an indication of a tag or identifier of the HV field device, and the tag or identifier identifies the HV field device within the process control automation or automation system; and obtaining, by the HV field device from the DCHP server via the nodal communication network, an endpoint identification that has been assigned to the HV field device. Further, the method includes establishing, by the HV field device over the nodal communication network and by using the endpoint identification assigned to the HV field device, a communication session with another device, where the another device is a consumer of data that is indicative of a physical function performed by one or more physical components of the HV field device during run-time operations of the process control or automation system to control an industrial process. Still further, the method includes, during the run-time operations of the process control or automation system, transmitting, by the HV field device via the communication session, the data indicative of the physical function performed by the one or more physical components of the HV field device to the another device to thereby control the industrial process.

Still further, the use of highly versatile (HV) field devices in the nodal communication network, combined with the above device discovery methods benefits from sophisticated network resource management schemes that may be implemented in the nodal communication network. In an embodiment, the controller controls physical devices in an industrial process or factory automation plant that performs operations on one or more raw materials to transform the one or more raw materials into a product. The HV field devices are coupled to the controller, and both receive commands from, and transmit parameters to, the controller. The communication network, including the advanced physical layer (APL) infrastructure—APL wiring, APL power switch(es) providing connectivity and power via the APL wiring, and APL field switch(es) receiving the power from the APL power switch(es) and distributing power and connectivity to the HV field devices—also includes a network resource management component configured to manage network resources on the communication network to facilitate communication over the network of network traffic that includes both managed network traffic, of which the network resource management component is aware, and unmanaged network traffic, of which the network resource management component is not aware.

In various embodiments, the network resource management component implements a deterministic management scheme, while in other embodiments, the network resource management component implements a non-deterministic management scheme. Some embodiments of the network resource management component that implement deterministic management schemes implement a time-sensitive networking (TSN) network management scheme, in which both TSN-based and non-TSN devices may operate on the communication network. The deterministic network resource management component, in embodiments, allocates network resources such that time-critical data is allowed to be transmitted with minimal blocking between the source and the destination. In some embodiments, the network resource management component includes one or more outbound ports. Each of the outbound ports includes a plurality of queues, each of which accommodates a corresponding class of network traffic. A queue selection unit for each outbound port is configured to receive incoming data and determine into which of the queues the incoming data is placed, while a transmission selection algorithm is configured to select which data to take from each of the plurality of queues. Each of the queues has an associated gate, and a gate control list determines which of the plurality of gates is open. If a gate is closed, transmission of data is blocked, even if the transmission selection algorithm has selected the data for transmission, so that priority can be given to data other than that with a highest assigned priority. A time-aware shaper controls or synchronizes the gate control list of each outbound port, in embodiments, to create a clear communication channel for ultra-low latency data transmission.

In embodiments implementing non-deterministic network resource management components, the network resource management component includes an interface that controls network traffic through switch ports by enabling and disabling ports and throttling network through ports, especially when the network traffic is identified by source, destination, and application type. A flexible runtime model is used to allocate network resource usage and, in embodiments, to optimize an allocation of network resources on the network when new devices join the communication network, in part by controlling one or more APL field switches and/or power switches. Some percentage of network resources is allocated to unmanaged network traffic, in embodiments, and the network resource management component adjusts the switches when a detected percentage of unmanaged traffic exceeds the allocated percentage.

In an embodiment, a method of managing network resources in the industrial process control or factory automation system includes implementing, in the system, a controller controlling physical devices. The controller is configured to perform operations on one or more raw materials to transform the materials into a product, and to communicate, over a communication network, with a plurality of highly-versatile (HV) field devices coupled to the controller to receive commands from the controller and transmit parameter values to the controller. The method also includes configuring the communication network to facilitate communication of network traffic over an APL medium, using one or more APL power switches each configured to provide connectivity to other devices and each including a power supply to provide power via the APL medium. Further, the method includes using one or more APL field switches, each receiving power from one of the one or more APL power switches via the APL medium, and each configured to distribute both communication signals and power signals to HV field devices communicatively coupled by the APL medium to a respective APL field switch. The method further includes configuring a network resource management component to manage network resources on the communication network to facilitate communication over the network of traffic that includes both managed network traffic, of which the network resource management component is aware, and unmanaged network traffic, of which it is not aware.

The implementation of highly versatile (HV) field devices in the nodal communication network, combined with the above device discovery methods also benefits from new methods of establishing communication between applications and HV field devices, and between HV field devices and other HV field devices. In an embodiment a method includes receiving at an HV field device, from a first client device or application, a message indicating a selection of a first one of a plurality of publish categories, which corresponds to a type of information desired by the client device. The HV field device transmits to the first client device or application an identification of each of the plurality of publish lists corresponding to the first one of the plurality of publish categories. The plurality of publish lists are stored on the HV field device, and each publish list is a set of parameters associated with the HV field device. The HV field device receives from the first client device or application a selection of a first one of the plurality of publish lists identified by the HV field device, and thereafter transmits to the first client device or application the set of parameters associated with the first one of the plurality of publish lists.

In various embodiments, the publish categories include a monitor and control category and/or a condition monitoring category. In embodiments, the publish lists may include manufacturer-defined publish lists, user-defined publish lists, and/or custom publish lists. In embodiments, the method further includes receiving, at the HV field device, from a second client device or application, a message indicating a selection of a second one of the plurality of publish categories and transmitting, from the HV field device to the second client device or application, an identification of each of a second plurality of publish lists corresponding to the second one of the plurality of publish categories received from the second client device or application. The method further includes receiving at the HV field device, from the second client device or application, a selection of a one of the second plurality of publish lists identified by the HV field device and, thereafter, transmitting from the HV field device to the second client device or application, the set of parameters associated with the selection of the one of the second plurality of publish lists received from the second client device or application. In embodiments, receiving from the first or second devices or application a selection of one of the plurality of publish lists further includes receiving an update rate specifying a frequency with which the set of parameters associated with the one of the publish lists will be transmitted from the HV field device to the respective client device or application.

In still other embodiments, an HV field device includes a field device hardware component that interacts with a process phenomenon, a communication interface that communicatively couples to one or more external devices via an external communication network, a processor coupled to the field device hardware component and to the communication interface, and a computer readable memory coupled to the processor, wherein the computer readable memory includes a secure storage that stores boot firmware to be executed upon start-up of the processor. Moreover, the field device includes an operating system that is stored in the memory and implemented on the processor to perform communications via the communication interface and one or more communication applications stored in the memory and executed on the processor and managed by the operating system, wherein the one or more communication applications implement communications via the communication interface. The field device also includes a root of trust component including a unique device identity stored in the computer readable memory, and one or more security keys or security certificates stored in the computer readable memory, capable of being used to perform secure communications with external devices via the communication interface. Moreover, the processor implements a secure boot procedure that provides for protecting boot firmware from tampering upon startup, generates an endpoint identity feature including a device identification derived from the unique device identity and uses a cryptographic algorithm to encrypt one or more of data communications performed by the device, data stored in the device and data as used in device. Likewise, the communication applications use the one or more security keys or certificates to perform communications with external devices via the communication interface. The processor may use the unique device identity to verify communications between the external devices and the field device and to verify boot activities performed by the processor in the field device.

In some cases, the boot firmware may be stored and executed directly from a non-writable location in the computer readable memory. Moreover, the processor may load the boot firmware executed by the processor from a protected memory region of the computer readable memory into a protected memory store set aside for boot firmware execution by the processor. Moreover, the processor may derive internal keys from the unique device identity, and the processor may execute self-tests and code validation to verify the code identity and to establish a set of keys for use in performing secured communications with the external devices via the communication interface. The processor may execute the boot firmware using digitally signed binaries or digitally signed boot files and may verify the boot files using a digital key verified using the root of trust component. The processor may execute the boot firmware using a secure or trusted boot loader or a security microprocessor and/or using boot file encryption. The processor may check the validity of the boot firmware using the root of trust component and may perform a secure firmware update by validating incoming communication payloads intended to replace existing firmware images prior to being stored or applied in the computer readable memory. Moreover, the processor may perform a secure firmware update by performing a rollback to a known verified boot firmware image if there is a failure to validate new boot image code. Still further, the processor may perform secure communication connectivity to cloud resources by implementing a secure boot process that ensures that the field device is authenticated with an external device each time the field device attempts a connection to the external device through the use of the security keys or certificates.

Still further, the secure storage may include off-chip flash memory, and the processor may copy one or more software applications or the operating system into SRAM or external DDR memory to execute after the processor is booted. Still further, the cryptography algorithm may include a standards-based symmetric cipher suite, and/or a hashing function, and/or a random number generator. Still further, the processor may store and perform a security audit application that enables the field device to be monitored. The security audit application may perform logging and providing audit log information to an external server. The audit log information may include event logs, and the security audit application may capture system and security events, and may transfer the captured events to a host using the external server, such as a Syslog server. In some cases, the security audit application may store a local audit log in the computer readable memory, and the audit log may include one or more of the last time/date the external server was powered up; the last time/date the security credentials were modified; the external server status; a circular 128 entry session summary list; and timestamps. Still further, the security audit applications may store a session summary for each communication session with an external device and the session summary may include one or more of a client identity including an IP address and port number, a connect/disconnect time/date for a client, a starting/ending configuration change counter, a session status and a communication counter indicating the number of publish, request, and response PDUs. The security application may perform push audit messaging by pushing messages to an external security information and event management system. Likewise, to ensure security, provisioning information may be stored into the computer readable memory by the device manufacturer and this provisioning information may include one or more of a device tag, a pre-shared security key and or certificate, a security server hostname and port, a DNS server name, a default port number that the field device listens on and a static IP address and mask.

DETAILED DESCRIPTION

Figure 1:
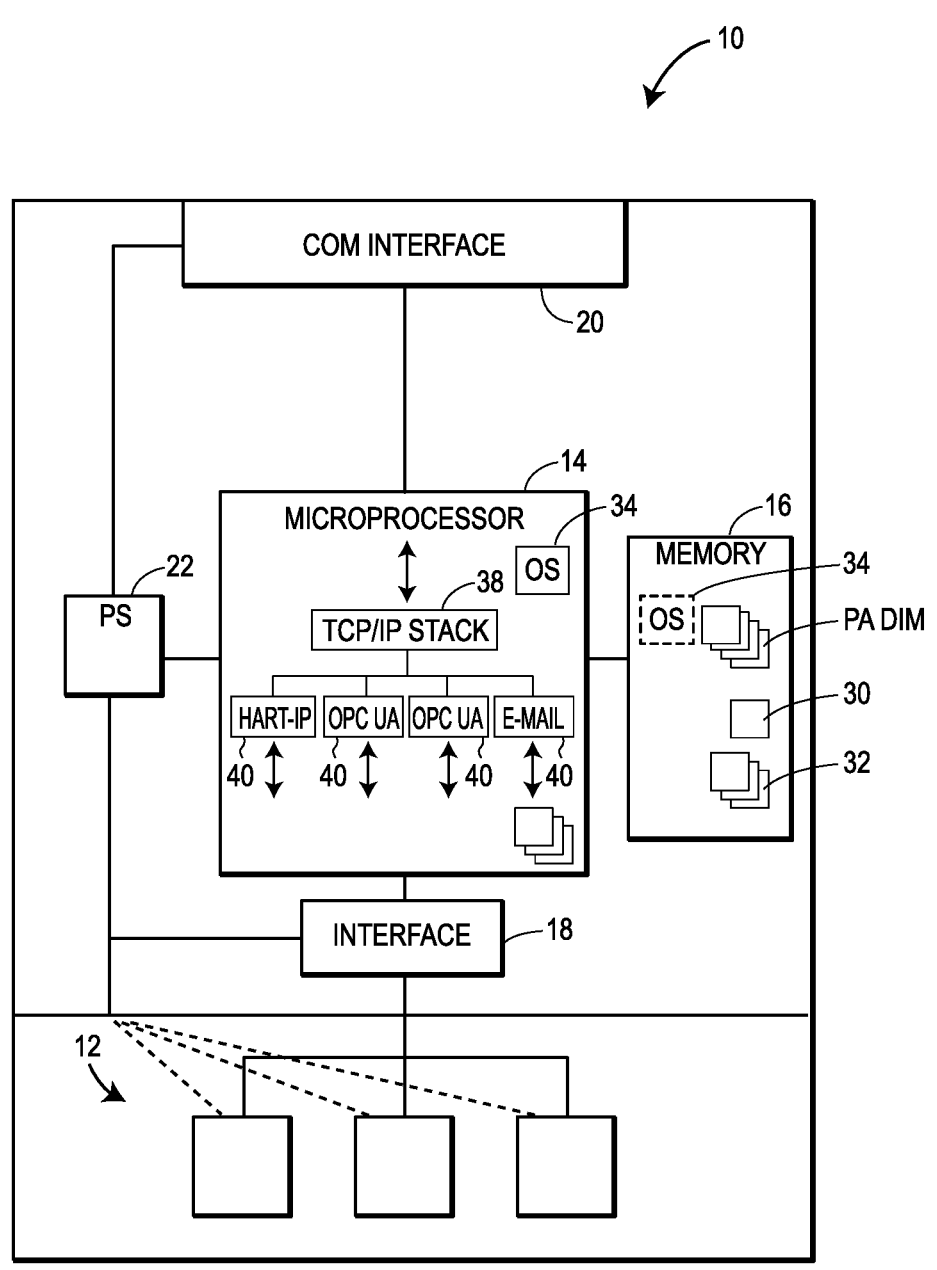
FIG. 1 is block diagram of a highly versatile field device as described herein.

Referring now to FIG. 1, a highly versatile (HV) field device 10 is generally illustrated in block diagram form. In particular, the highly versatile field device 10 includes field device hardware 12 which may be, for example, one or more sensors, an actuator, a valve seat and valve stem, or any other typical or desired control hardware associated with the operation of the field device. The control hardware 12 may be any combination of hardware typically associated with any type of control device, such as a sensor (e.g., temperature sensor, flow meter, level sensor, pressure sensor, etc.), a valve or other flow gas or liquid flow control structure, ignitors, fans, motors, actuators, pumps, etc. The control hardware 12 may be, for example, control structure that measures or senses one or more physical phenomena in a plant or factory setting, or that controls or effects one more physical phenomena in a plant or factory setting, and may be any control hardware associated with any known control field device.

Additionally, the highly versatile (HV) field device 10 includes a computer processor 14, a computer memory 16, a hardware communication interface 18, an external communication interface 20 (which connects to a physical layer of an external communication network, not shown) and a power supply 22. Generally speaking, the hardware communication interface 18 enables communications between the processor 12 (and more particularly one or more applications or routines stored in the memory 16 and executed on the processor 12) and the field device hardware 12 using any desired communication technique or protocol, including any proprietary protocols or techniques, any open process control protocols or techniques, such as HART, FOUNDATION Fieldbus, CAN, Profibus, etc. The communication interface 18 may be an internal input/output device that multiplexes and or conditions signals from the hardware devices 12 and converts these signals for reading by or communication to the processor 14 and vice versa. The communication interface 18 may convert signals from the processor 14 to be sent to control or effect the operation of the hardware 12 in any known or desired manner and, likewise, may convert signals from the hardware 12 to the processor 14 in any known or desired manner. Still further, the processor 14 may execute one or more hardware control applications 30 (which may be stored in the memory 16) to communicate with, control, read signals from, change settings in, etc. any or all of the field device hardware 12. The hardware control applications 30 may be stored in a ROM or a RAM of the memory 16 and/or may be implemented as an ASIC, as an executable application or in any other desired manner.

Still further, the power supply 22 is preferably coupled to the communication interface 20 and, more particularly, to the physical layer of the bus or wired network to which the field device 10 connects, receives power in the form of current (e.g., DC current) from the physical layer, and converts that current into a power signal (typically one or more voltage signals) which are provided to the various other components of the device 10 to power these devices as needed. The power supply 22 is able to provide enough power to the processor 14 as described herein to enable the operation of the processor 14. Still further, the power supply 22 may power the memory 16, the interface 18 and one or more of the field device hardware components 12. If desired, the power supply may include or consist entirely of a battery. If the power supply 22 includes a battery, this battery may be charged by a power signal provided via an external wired communication network. In other cases, the battery may be used to provide power to the field device 10 and the communication network to which the field device 10 is connected may be a wireless network. In this case, the communication interface 20 may be a wireless communication interface including an antenna and a wireless receiver.

Additionally, the memory 16 may store one or more communication applications 32 which execute on the processor 14 and which control communications with exterior devices via the communication interface 20. The communication applications 32 may be programmed to use any known or standard format, such as XML, JSON, etc., and may perform communication using a known or standard communication protocol over one or more different communication networks, such as wired networks, wireless networks, etc.

Importantly, the processor 14 of the device 10 is powerful enough to have and execute an operating system (OS) 34 which is stored in the memory 16 and executes, typically in real time on the processor 14, to enable the applications 30 and 32 to execute on the processor 14 in a structured manner as separate applications that share the processor resources. In particular, the OS 34 may be a general purpose operating system, such as a Linux operating system, or a real-time operating system (RTOS) including any of various light-weight operating systems, such as a ThreadX operating system. Various different ones of the applications 32 and processor and communication loading techniques will be discussed in more detail below. In any event, the processor 14 may execute any number of different communication applications 32 and/or may enable any communication application 32 to establish multiple and different communication threads or proxies (also referred to as communication processes) that simultaneously execute in the processor 14, which enables the versatile field device 10 to communicate simultaneously (i.e., in an overlapping manner) with different external applications (generally referred to herein as client application or client devices) and these applications may be in the same or in different external devices, hosts or servers connected to the field device 10 via the communication interface 20. Of course, the communication interface 20 may conform to any desired standard communication protocol or paradigm, such as an IP or packet-based protocol such as TCP, UDP, HTTP, HTTPS, TLS, DTLS, etc.

As will be understood, during operation, the OS 34 executing on the processor 14 can set up and manage a communication stack 38, such as a TCP, UDP or other IP or package based stack to perform external, packet based digital communications via the communication interface 20. Additionally, the OS 34 may set up and manage multiple different communication threads (processes) that may run simultaneously (and at the same or different speeds) via the communication interface 20 and the underlying communication stack 38. In particular, as illustrated in FIG. 1, the OS 34 may set up various communication threads 40 that implement the same or different higher lever or more specialized communication protocols, such as the HART-IP protocol, an OPC protocol such as the OPC UA protocol, an e-mail protocol, or any other type of communication protocol used for various purposes by different types of external applications. Thus, the OS 34 running on the processor 14 may create, manage and destroy (decommission) various different communication threads 40 (also referred to as communication processes or sockets) during operation, wherein the threads 40 run simultaneously to provide communications with different external devices and applications. The various different threads 40 may use the same or different higher level communication protocols to communicate more effectively with different clients (i.e., exterior devices or applications). In the example illustrated in FIG. 1, the OS 34 is managing four threads 40, with a first of the threads 40 using HART-IP which may be used to communicate with a process controller that is using the field device to perform process control, with a second and third of the threads 40 running an OPC UA protocol and communicating with a device maintenance system and a data monitoring system, and with a fourth to the threads 40 communicating using an e-mail protocol with an e-mail server so as to send e-mails to one or more persons. Of course, any number of threads 40 can be created and run simultaneously, and each thread may use one of any number of different communication protocols to communicate with various different kinds of client devices and applications, such as process or automation controllers, maintenance systems, monitoring systems, data collection systems, general purpose communication systems such as e-mail systems, texting systems, internet based communication systems such as Twitter and Facebook, etc.

Thus, as will be understood, the highly versatile field device 10 may store and execute different modules, applications or routines that enable the device 10 to communicate with different client devices and/or applications via the communication interface 20, to thereby support multiple different uses and to enable multiple different client systems, such as control systems, maintenance systems, monitoring systems, etc., to have access to the same or different field device information (e.g., information from or about the field device hardware devices 12) within the device 10. The communications with these various different client systems may use different higher level communication protocols that are packetized using the underlying IP communication stack 38, based on the particular needs of the client applications. For example, some protocols, such as HART-IP are better suited to control applications and control communications as HART-IP generally provides for faster, more reliable and real time data flow. Other protocols, such as OPC UA are better suited to monitoring or maintenance applications because this protocol provides for more diagnostic functionality, while not requiring as fast or real time communications. Still other protocols may enable the device 10 to effectively provide or build a web page for a client device to enable a user to browse device information from the device 10, to send e-mails or texts, to communicate with an exterior network or a public network such as the internet, or to provide other device information in other formats useful for different client applications and purposes. Moreover, the communication system and OS 34 of the highly versatile field device 10 may enable communication connections between the field device 10 and external client devices to be established independently of one another, and without the other client systems being aware which other systems are accessing or communicating with the highly versatile field device 10.

In some cases, the applications 30 may access and obtain data from the field device hardware 12 and may store this data in a random access memory 16 of the device 10. The applications 32 may, depending on their use or function, enable access to data within the memory 16 and may publish that data to one or more external devices or client applications. In other cases, the applications 32 may enable authorized client devices to view and even change configuration data or settings of the field device hardware 12. Typically, control systems may include an application that communicates with an authorized controller to change settings of the field device hardware 12 and to change configurations of the hardware 12. Likewise, applications associated with PAM systems may enable authorized user to view device data and to change device configuration settings, to run other applications on the device (such as calibration applications, testing applications, etc.) Other systems, such as monitoring systems, may have more limited access to the device hardware 12 or to the device data stored in the memory 16.

In one example embodiment, the applications or modules 32 may be or include device models mapped to a particular communication protocol. As an example, the applications 32 may use OPC UA communications and APIs and may include device models mapped to OPC UA through profiles. The device models enable the applications 32 to be configured to provide certain device data and functionality (according to the device models) to be accessible by an external client device using a particular communication protocol or paradigm.

Thus for example, the applications 32 may use Process Automation Device Information Models (PA-DIMs) which can be accessed by any client application that is able to open a client/server connection with the field device 10 and subscribe to data publications. While the general concept of a PA-DIM has been defined by a FieldComm Group (FCG) working group, the current device information model does not support control, extensions for condition monitoring, standard pub/sub lists, and templates for supporting customized pub/sub lists. In this case, the PA-DIMs used in the highly versatile field device 10 may be implemented on top of or in addition to existing field device hardware and communication interfaces. Here, the PA-DIMs are able to communicate in a particular protocol, such as OPC UA, that is compatible with IP packet-based communication protocols and may be used to standardize the information available from the field device 10.

Generally speaking, the highly versatile field device 10 is configured to operate in a field environment of a plant or factory, for example, that includes a communication network that supports advanced protocols running on open physical layers to perform communications between field devices and one or more client devices, which may be devices associated with any number of different systems, such as control systems, maintenance systems, monitoring systems, etc. Thus, the client devices can be process controllers (associated with control systems), maintenance applications or servers (associated with device or plant maintenance systems), monitoring applications or servers (associated with monitoring systems), and or other systems.

Figure 2:
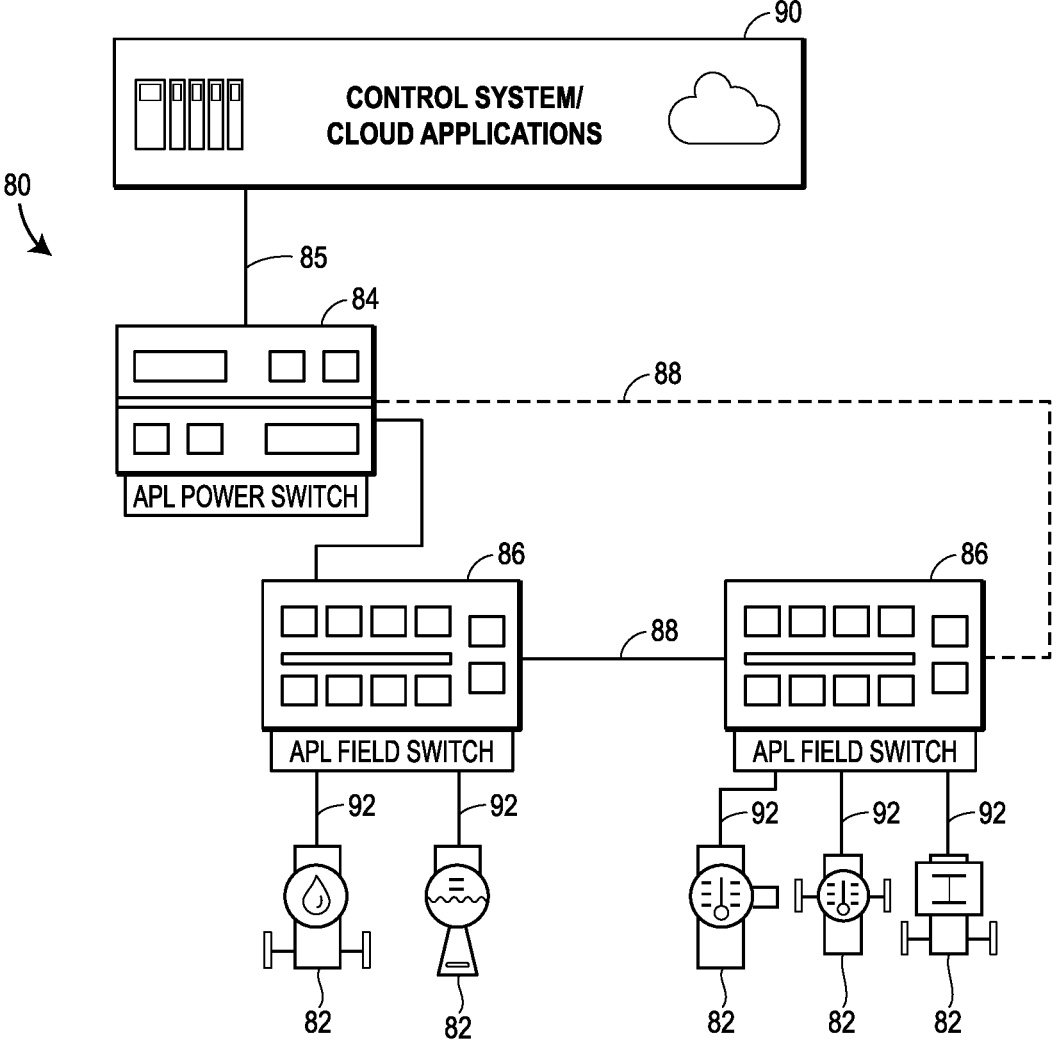
FIG. 2 depicts an APL network in which a highly versatile field device as described herein may be used.

In one embodiment, the highly versatile (HV) field device 10 may communicate over an Advanced Physical Layer (APL). FIG. 2, for example, illustrates an APL based network 80 in which the highly versatile field device 10 may be used to provide support to multiple client applications and devices. The APL network 80 supports communications between various field devices 82, any or all of which may be the highly versatile field device 10 of FIG. 1, and any other devices (such as controllers, servers, user interface devices, etc.) using a packet-based or an advanced (e.g., general purpose IP based) communication protocol. Importantly, the APL provides for a two-wire physical communication layer (two-wire bus) that supports both digital communications and power delivery to the devices connected to the physical layer. Unlike previous control specific communication physical layers (e.g., those associated with the FOUNDATION Fieldbus, HART, Profibus, CAN, etc. protocols), the APL provides sufficient power (in the form of voltage and current) over the two-wire bus to power a general purpose or higher level operating system based microprocessor such as the microprocessor 14 of FIG. 1, within the field devices connected to the APL physical layer or bus. This higher level of power is needed to be able to implement a processor with the functionality to run a general purpose or real time OS, such as that described above with respect to FIG. 1. However, the APL does not provide so much power (in particular, voltage) over the two-wire physical layer to make it dangerous to use in hazardous environments due to the danger of creating sparks. Thus, APL has sufficient power to power process control devices having microprocessors that run operating systems, such as real time operating systems, without having enough power to cause potential safety issues in real process control environments in which the field devices are located. Generally speaking, the APL network provides power (on spur lines) at about 1.4 watts to each device at a voltage of 14 volts or less and preferably at a voltage of 10 volts or less. Moreover, the APL network provides a two-wire ruggedized physical layer or wires, by using 14 gauge stranded wires, which makes the wiring less susceptible to brakeage in the field and enables more power (current) with lower voltage levels due to decreased resistance. Moreover, the APL supports IP based or packet based digital communications in the form of traditional Ethernet based communications, making the APL communications easy to use in other types of applications besides control applications and thus extending the communication power of traditional Ethernet down into the process control or factory automation environment or plant while not having the drawbacks of the Ethernet physical layer (which generally provides 48 volts over thin or higher gauge, single strand wiring).

While the use of an APL network is described herein as the communication network that is connected to the highly versatile field devices, other communication networks can be used to connect to and power the highly versatile field devices. Generally speaking, such networks preferably use 14 gauge (0.06 inch diameter) or lower (e.g., 12 gauge, 10 gauge, etc.) cabling, and also preferably use stranded cabling to provide better power delivery with a stronger and more resilient cable. Still further, these networks preferably provide power at 14 volts or less and more preferably at 10 volts or less to limit the occurrence of sparking in hazardous areas. Likewise, these networks should preferably provide at least 200 milliwatts of power and may, in some cases, provide up to 2 watts of power to each device. In other embodiments, the networks may provide at least 300 milliwatts of power and may provide up to 4 watts of power to the device. More preferably, the networks provide between 1 and 2 watts to the field devices at a maximum of between 10 and 14 volts, although lower voltages can be used and the networks used to power the field devices can provide higher power (wattage) than that specified herein.

In the system of FIG. 2, the network 80 includes an APL power switch 84 connected via, for example, an Ethernet or other bus 85, to the control system (e.g., a process controller) and/or to a cloud or other applications 90 within a cloud or other network. The cloud applications 90 may be or may include any or all of the applications of various different systems, such as control applications (controllers) associated with control systems, maintenance applications, associated with maintenance systems, monitoring application and devices (servers) associated with monitoring systems, etc. As examples, the cloud applications 90 may include simulation applications, control applications, data storage and processing applications, etc. In any event, the APL power switch 84 includes an APL power device that provides power over the APL physical layer, and the APL power switch 84 acts as a gateway to the APL network 80 and, in particular, to various APL field switches 86, which are connected to the APL power switch 84 via a bus or wire network 88 conforming to the APL physical layer standards. As illustrated with respect to FIG. 2, the bus or network 88 may be a trunk line or may be a ring-type connection, as indicated by the dotted portion of the bus 88. In any event, the bus 88 is an APL physical layer including, for example, a two-wire or a four-wire wired network, that provides communication signals as well as power signals from the APL power switch 84 to the APL field switches 86. Moreover, each of the APL field switches 86 has one or any other number of highly versatile field devices 82 connected thereto via an appropriate APL physical layer or link 92. As an example, the APL links 92 may conform to the APL specification and may be two-wire or four-wire buses, which provides or enables communication signals and power signal to be sent between the APL field switches 86 and the field devices 82.

Of course, the APL power switch 84 acts as a gateway to the bus 85 and operates to multiplex signals from outside sources onto the link 88 using a communication protocol set up for the network 80. Likewise, the power switch 84 may operate to decode messages from any of the field switches 86 (which may be messages from the field devices 82) that are on the link 88 and that are addressed to destinations outside of the network 80 and to send these messages onto the link 85. Likewise, the APL field switches 86 decode messages on the link 88 and, if addressed to one of the field devices 82 connected to the field switch 86, the field switch 86 places the message on the spur line or link 92 to be sent to the field device 82. Likewise, the field switches 86 receive messages from the field devices 82 via the links 92 and place those messages on the link 88 for delivery to another field switch 86 or the power switch 84. Generally speaking, the field devices 82 are all APL compliant field devices in that they use the APL physical layer and a communication protocol that is supported by the APL physical layer (e.g., an IP communication protocol) for communications via the links 92 and 88. The field devices 82 may also receive power via the links 92, and this power is provided from the field switches 86 and is ultimately provided over the bus 88 from the APL power switch 84 and a power supply associated therewith.

In one example, the APL (physical layer) of FIG. 2 may be a ruggedized, two-wire, loop-powered Ethernet physical layer that uses 10BASE-T1L plus extensions for installation within operating conditions and hazardous areas of process plants. In this case, the APL power switch 84 provides connectivity between all standard Ethernet networks and field devices and includes power supplies to provide power to the APL field switches 86 and the field devices 82. Typically, the power switch 84 will be located in the control room or in a junction box on a skid. Likewise, the APL field switches 86 may be designed for installation and operation in hazardous areas. The field switches 86 are loop-powered by the APL power switch 84 and distribute both communication signals and power via spurs 92 to the field devices 82. The Advanced Physical Layer (APL) project was initiated to create a protocol-neutral Ethernet that can solve the problem of finding a long-reach Ethernet protocol. This physical layer can be used as described herein in process automation and on process instrumentation to connect field devices in, for example, remote and hazardous locations and operates to extend the Ethernet physical layer operating at 10 Mb/sec over single-pair cable. Moreover, APL extends 10BASE-T1L for use in hazardous areas which enables the development of standards associated with typical protection methods, especially intrinsic safety.

As such, the network 80 of FIG. 2 can use any communication protocol supported by the APL, such as any protocol supported by an Ethernet connection. These protocols include, but are not limited to, internet protocols (IP protocols), packet-based protocols, time sensitive and non-time sensitive protocols, etc. More particularly, these protocols may include the HART-IP, the OPC UA and any other desired protocols designed for process control communications. Likewise, these protocols may include protocols not traditionally used in process automation, such as general purpose IP protocols, including protocols that support request/response, publish/subscribe, and event-based communications, and data streaming.

The use of the network 80 illustrates one methodology of implementing an APL physical layer and a supported communications protocol within a process control system or factory automation environment to provide communications between field devices, such as the field devices 82, and other devices such as process controllers 11 or other devices on the network 85/90 of FIG. 2. Of course, in other cases, a process controller can be connected directly to the APL power switch 84 in order to provide communications with that power switch using the APL physical layer and to thereby perform communications between the field devices 82 and the controller (e.g., the controller 11) using an APL physical layer. Moreover, while a power supply may be provided in or associated with the APL power switch 84 and may send power to the field switches 86 via the bus 88, the APL field switches 86 may be separately powered or may include their own power supplies or sources and power themselves, as well as the field devices 82, via the APL spur lines 92.

Generally speaking, the network 80 is an example of a manner of providing a stand-alone network that supports one or more highly versatile field devices 10 of FIG. 1 or field devices 82 of FIG. 2) within a process control or factory automation system environment to provide communications, using a more traditional IP based communication protocol, in the process control or factory automation system while simultaneously providing communications (e.g., traditional IP based communications) between the highly versatile field devices and other systems, such as maintenance systems, monitoring systems, etc.

However, it is also possible to integrate an APL physical layer (and an IP communications protocol using that layer) within an existing plant or factory network. More particularly, an overall I/O system may be used within a field environment of a plant or factory to support multiple I/O types while keeping the more traditional I/O architecture of the plant and simultaneously supporting multiple different systems directly from the highly versatile field devices. In general, the highly versatile field device 10 provides or supports a mixed physical layer which can support multiple different communication protocols, including traditional process control protocols and more common or general purpose IP based protocols while also supporting multiple different systems in a direct client/server relationship. This versatility leads to improved control while simultaneously supporting the combination of control and industrial internet of things (IIoT) applications (which are typically interested in measurement and actuator data), their capabilities, and their diagnostics.

Figure 3:
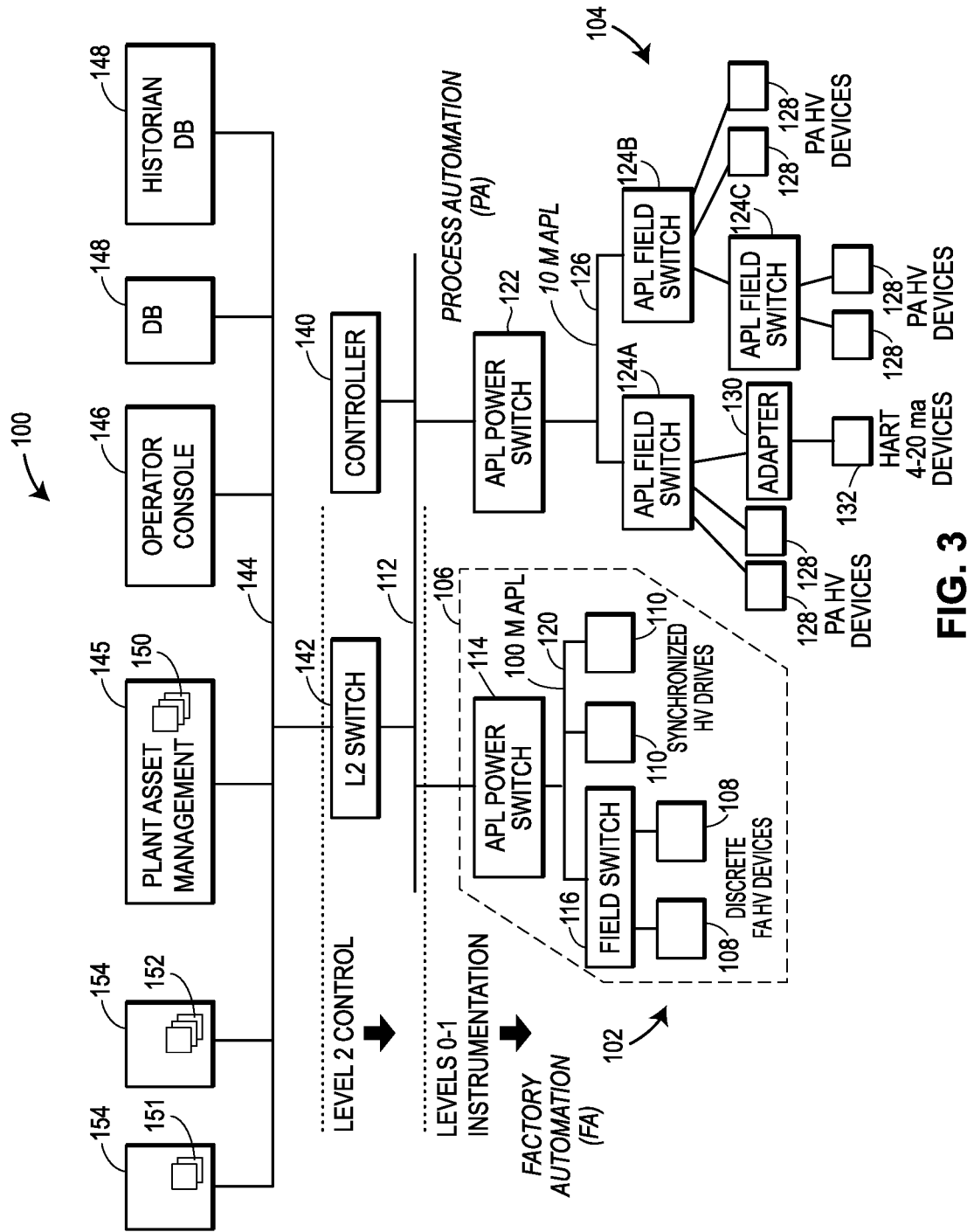
FIG. 3 depicts a first example communication architecture which uses APL networks to support access to a highly versatile field device by multiple client applications/devices.

One example of a more traditional plant and factory automation control architecture incorporating or supporting the highly versatile (HV) field devices 10 described herein is illustrated in FIG. 3. The plant 100 of FIG. 3 includes both process automation (PA) and factory automation (FA) components and control devices which are connected through a communication network backbone, such as an Ethernet communication network, to one or more process and factory automation controllers. More particularly, as illustrated in FIG. 3, the plant 100 includes a factory automation area or section 102 and a process automation area or section 104. The factory automation section 102 is illustrated as including a single APL network 106 having a control topology that mirrors how instrument and control are typically setup in automation plants. In this case, however, the APL network 106 is used to connect each of a set of different FA highly versatile (HV) field devices 108 and 110 to a common or shared network backbone 112, which may be, for example, a 100 megabit (M) or a gigabit Ethernet network. The APL network 106 includes an APL power switch 114 connected to an APL field switch 116 and to multiple FA highly versatile field devices 110 over, for example, a 100 M APL network connection 120, and includes an APL field switch 116 that is connected to each of a set of discrete FA highly versatile field devices 108.

Similarly, the process automation section 104 includes an APL power switch 122 connected to two APL field switches 124A and 124B via, for example, a 10 M APL network connection 126. The APL field switch 124A of FIG. 3 is illustrated as being connected, via trunk lines, to two highly versatile PA field devices 128 and to an adaptor device 130 which connects to and serves as an input output device for traditional field devices, in this case HART 4-20 ma field devices 132. Likewise, the APL Field switch 124B is illustrated as being connected directly to two highly versatile PA field devices 128 and further to an APL field switch 124C, which is in turn connected to two highly versatile (HV) field devices 128. Of course, the highly versatile field devices 108, 110, 128 communicate via their respective APL networks 104 and 106 to devices connected to the network backbone 112 via the APL power switches 114 and 122. In this manner, the highly versatile field devices 108, 110 and 128 can be communicatively connected to one or more controllers 140 on the network backbone 112 via various different APL field switches and APL power switches using different APL supported physical layers (or communication networks with different speeds) while performing control in the process and factory settings using traditional control techniques.

However, as illustrated in FIG. 3, the network backbone 112 is connected through a switch 142 to a further network 144 to which other plant or factory applications and assets may be connected. In particular, as illustrated in FIG. 3, a plant asset management device 145, one or more operator consoles 146, one or more databases 148, such as control configuration and historian databases, may be connected to the network 144, which may be in this case a Gigabit Ethernet network. The devices 145-148 may communicate via the network switch 142 to the controllers 140 and directly to the highly versatile field devices 108, 110 and 128 on the APL networks 104 and 106 via the APL power switches 114 and 122. Moreover, the plant asset management system 145 may include asset management applications 150 that obtain data from (e.g., by subscribing as a client to) the various highly versatile field devices 108, 110 and 128. Still further, other applications 151 and/152 and/or devices 154 (computer devices such as servers or hosts) associated with other systems, such as monitoring systems, data logging systems, etc. can be connected to the network 144 and act as clients to various data available from the highly versatile field devices 108, 110, and 128. Thus, for example, the plant asset management system 145 may execute one or more asset management applications 150 (in the device 145 or in other devices connected to the networks 144 and 112) which may discover and register with any of the highly versatile field devices 108, 110 and 128 to obtain data therefrom as a client (with the field devices 108, 110 and 128 operating as servers of their internal data and information). Similarly, other applications 151, 152 can discover and register with the field devices 108, 110 and 128 and subscribe to data therefrom. Once registered with the field devices 108, 110, 128, the plant asset management applications 150 or other applications 151, 152 may communicate directly with the field devices 108, 110, 128 via the network 144, the switch 142, and one of the APL power switches 114, 122 and possibly one or more of the field switches 116, 124A-C. This architecture makes it possible for the process automation and factory automation controllers 140 to control the plant and factory floor using the field devices 108, 110, 128 without having to manage or be a conduit for communications for other systems, such as the plant asset management system implemented in the device 145. In this case, however, the switch 142 serves as a security switch (e.g., a firewall) to enable authorized applications and users to access the network 112 (and by extension, the APL networks 104 and 106 and their associated field devices) only when authorized or using the appropriate security techniques.

Of course, while the system 100 of FIG. 3 illustrates four highly versatile FA field devices 108 and 110 connected via a single APL network 106, and illustrates six highly versatile PA field devices 128 connected via a single APL network 104, each of the factory automation and process automation systems may include any number of highly versatile field devices connected to the controllers 140 (and the network 112) via any number of different APL networks, each of which can have any number of field switches associated therewith. Moreover, as illustrated in FIG. 3, the APL networks can use different types of communication hardware and communication speeds (physical layers) for each network connection (depending on use for example) and each APL network can include highly versatile field devices connected directly to the power switch thereof, or connected to the power switch thereof via one or more field switches.

Figure 4:
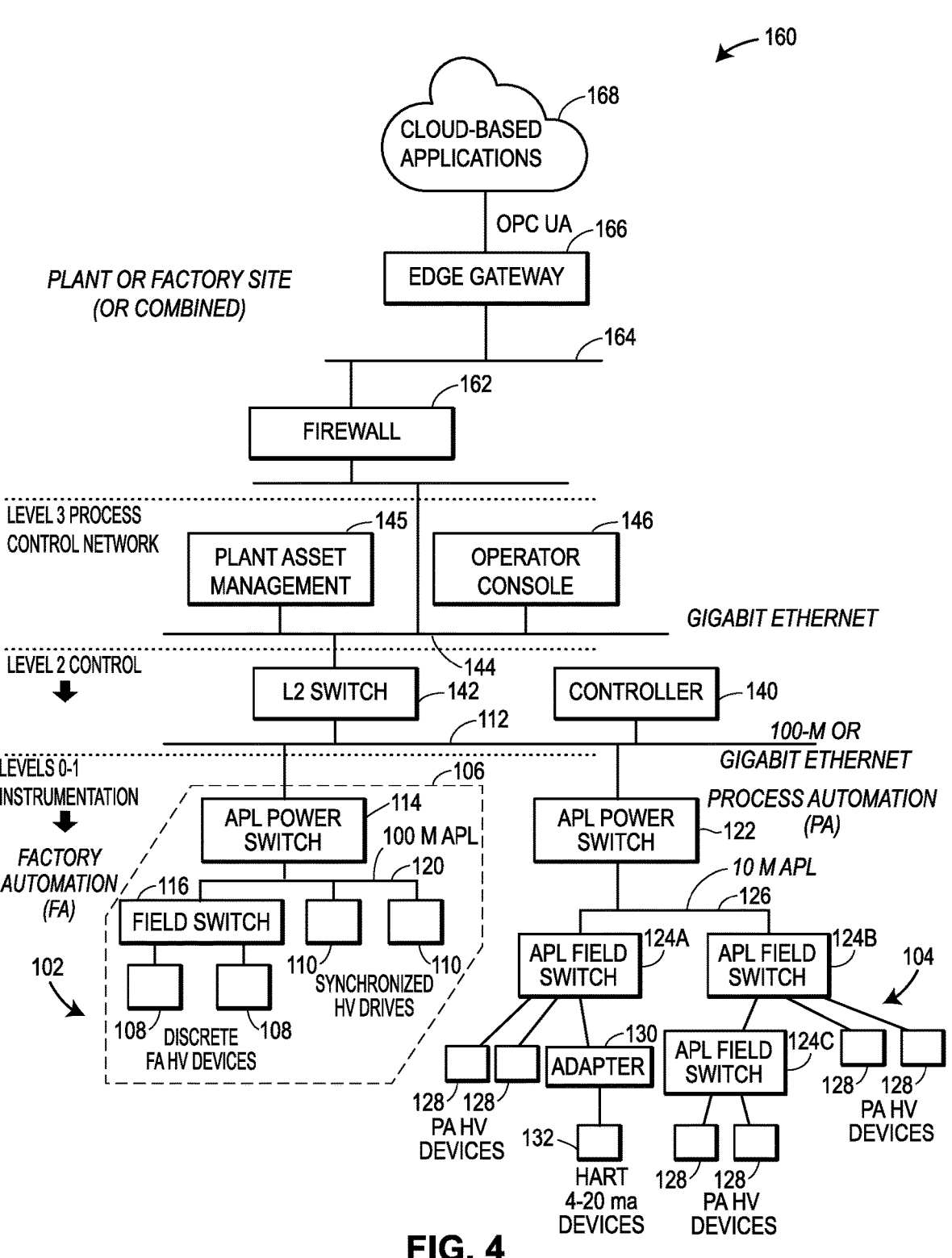
FIG. 4 depicts a second example communication architecture which uses APL networks to support access to a highly versatile field device by multiple client applications/devices.

In another example architecture, the system of FIG. 3 may be expanded to include or provide one or more applications in further networks, such as in the cloud, to obtain access to the highly versatile field devices 10. For example, FIG. 4 illustrates a system 160 similar to the system 100 of FIG. 3, wherein the network 144 is coupled via a firewall device 162 to a further network 164 which may be a plant or factory business network within a plant or factory. The network 164 may further be connected, via an edge gateway 166 to the cloud 168 using, for example, an OPC UA protocol and supported physical layer. One or more other applications associated with other systems, such as monitoring systems, data logging systems, etc. may be stored in and executed in computer devices in the cloud 168 and these devices and applications may communicate with the highly versatile (HV) field devices 108, 110, 128 as clients via the edge gateway 166 (and the network 164), via the firewall 162 and the network 144, via the switch 142 and the network 112 and via one of the APL power switches 114, 122 over one of the APL networks 102 or 104 to which the field devices 108, 110, 128 are connected. This architecture or configuration provides access to the highly versatile field devices from applications (client applications) and devices in one or more external networks, i.e., networks external to the plant or factory. As will be understood, the edge topology network of FIG. 4 runs on top of or in parallel to process and factory automation systems 102, 104. The edge devices or applications 166 and 168 may be used, for example, to support plant information integration including scheduling, asset monitoring, analytics, simulations, and other functions.

Figure 5:
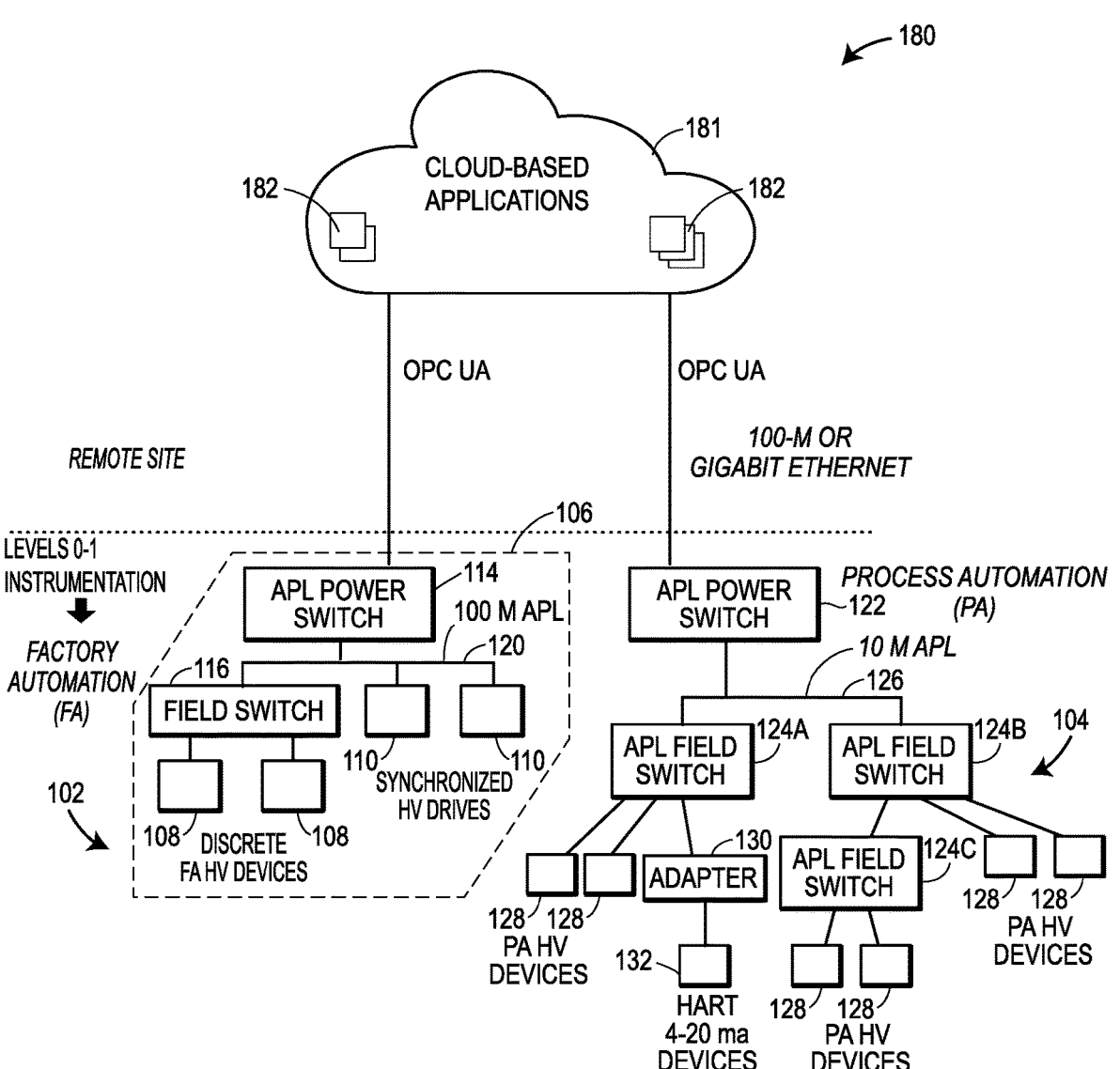
FIG. 5 depicts a third example communication architecture which uses APL networks to support access to a highly versatile field device by multiple client applications/devices.

In still another example, a plant and factory automation network architecture may make the highly versatile field devices (also referred to herein as highly connectable field devices) available directly to a cloud based device or application. Cloud-based topology can be used in process plants to run in parallel to process instrumentation, and may, for example, be used for condition-based monitoring which is typically used for energy monitoring, equipment and device monitoring, and process monitoring. Here, the monitoring systems stream data from the plant, perform their analysis, and provide recommendations back to users and in some cases the control systems themselves. A cloud-based topology is illustrated in FIG. 5, wherein a network architecture 180 includes the APL networks 102 and 104 connected, via the APL power switches 114 and 122 to a cloud network 181 having various client applications 182 therein. The client applications 182 can be applications associated with any of the various systems mentioned above, including process control or factory automation control systems, plant asset management systems, data logging systems, monitoring systems, etc. Moreover, these client applications 182 may communicate with the power switches 114 and 122 of the APL networks 102 and 104 using any desired IP communication protocol, such as the OPC UA protocol using, for example, a 100 M or a Gigabit Ethernet or any other suitable physical layer. Here, the client applications 182 can have direct access to the highly versatile field devices 108, 110 and 128 of the APL networks 102 and 104 via the APL power switches 114, 122. This type of architecture is useful in providing support for remote sites in a plant or factory automation setting, to enable control and other access to the highly versatile field devices via a remote or cloud based connection.

Figure 6:
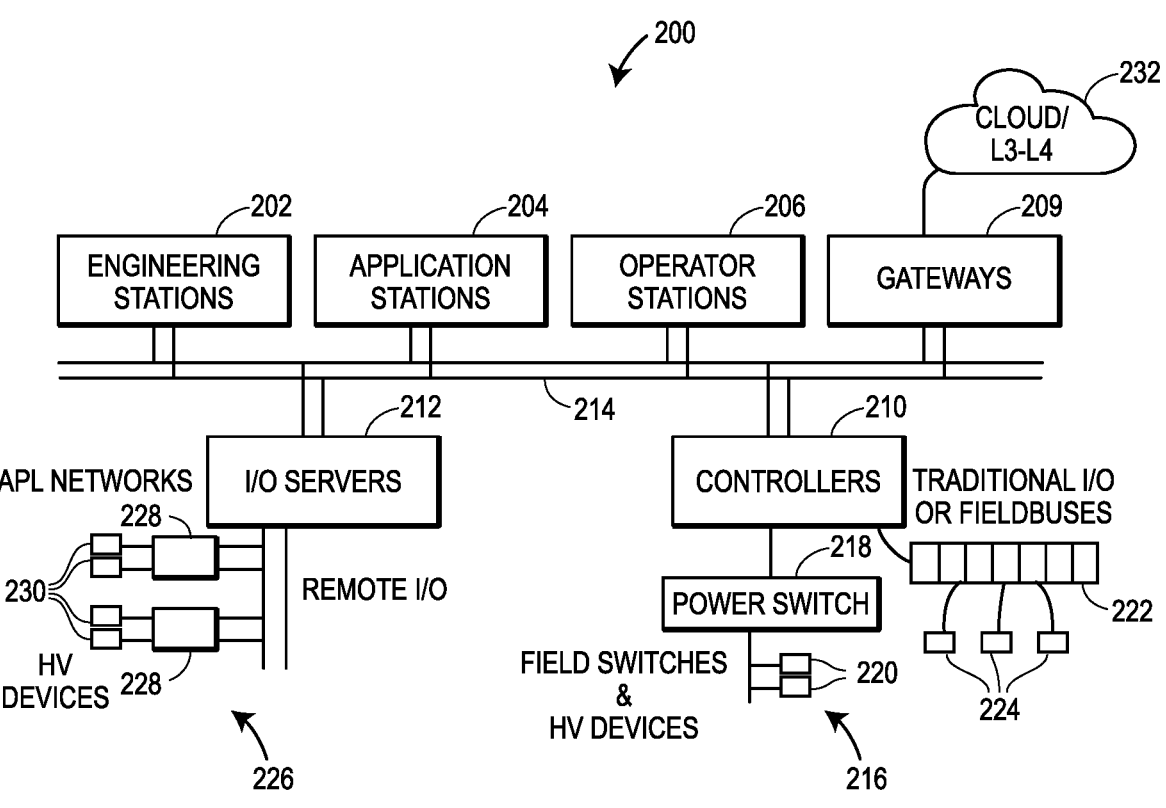
FIG. 6 depicts a fourth example communication architecture which uses APL networks to support access to a highly versatile field device by multiple client applications/devices.
Figure 7:
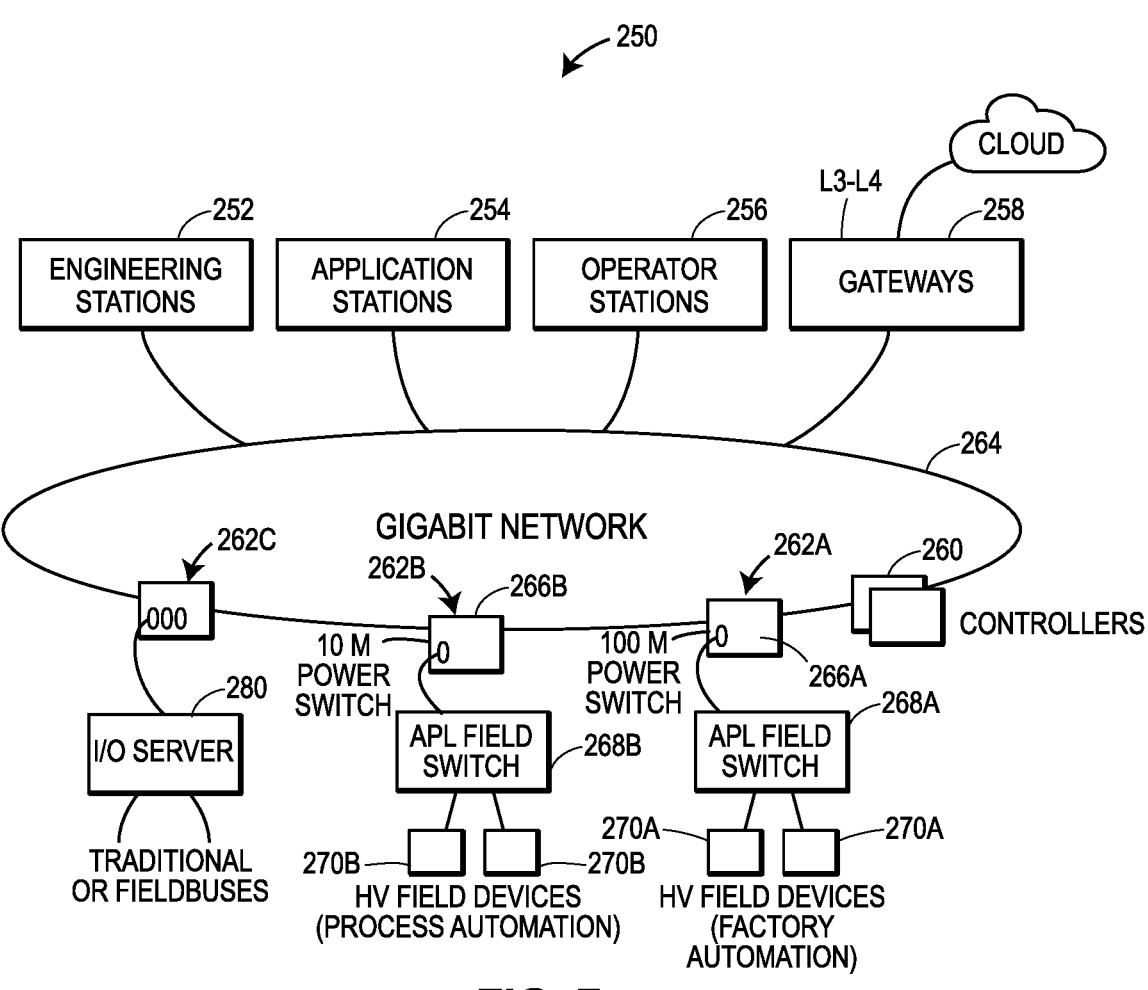
FIG. 7 depicts a fifth example communication architecture which uses APL networks to support access to a highly versatile field device by multiple client applications/devices.

FIGS. 6 and 7 illustrate still other control system architectures that include highly versatile (HV) field devices that can be accessed by various client devices or applications. More particularly, the network architectures of FIGS. 6 and 7 are designed to work with traditional networking as well as flattened networking. Generally speaking, traditional networking provides access to devices through controllers and I/O servers, while flattened networking provides direct access to highly versatile field devices.

FIG. 6, for example, illustrates a process control network 200 having engineering stations 202, application stations 204, operator stations 206 and gateways 208 connected to controllers 210 and I/O devices 212 via a communications network 214, which may be an Ethernet network. The controllers 210 are connected to one or more APL networks 216, with each APL network 216 having a power switch 218 connected to one or more highly versatile field devices 220 via zero or one or more field switches (not shown). Additionally, the controllers 210 may be connected via standard or traditional I/O devices 222, such as HART, FOUNDATION Fieldbus, WirelessHART, CAN, Profibus, etc., I/O devices to traditional process control field devices 224. Likewise, the I/O devices 212 may be communicatively connected to one or more APL networks 226, with each APL network 226 having a power switch 228 connected to one or more highly versatile field devices 230 via zero or one or more field switches (not shown). Additionally, remote or cloud based applications 232 may be connected to the network 214 via the gateways 208 to obtain access to the controllers 210 and I/O devices 212, to obtain data from the highly versatile field devices 220, 230. The I/O devices may be, for example, the I/O devices described in detail in U.S. patent application Ser. No. 16/573,380, entitled "Integration of Multiple Communication Physical Layers and Protocols in a Process Control Input/Output Device," filed Sep. 17, 2019, the entire disclosure of which is hereby expressly incorporated by reference herein.

Moreover, FIG. 7 illustrates a flattened process control network 250 having engineering stations 252, application stations 254, operator stations 256 and gateways 258 (and cloud based devices connected in a cloud network 259 coupled to the gateways 258), all of which are connected to controllers 260 and I/O networks 262 via a high speed high throughput communications network 264, which may be a Gigabit Ethernet network, for example. The I/O networks 262B and 262C are illustrated as APL networks having different APL power switches 266A and 266B connected to the gigabit network 264. The APL network 262A may be a high speed APL network such as a 100 M network that includes one or more field switches 268A, which are connected to various highly versatile field devices 270A that support or are used for control in a factory automation environment. In this example, the APL network 262B may be a slower speed APL network such as a 10 M network that includes one or more field switches 268B, which are connected to various highly versatile field devices 270B that support or are used for control in a process environment. Additionally, the I/O network 262C may include a switch connected to an I/O device 280 that supports traditional field devices, such as HART, Fieldbus, etc., field devices under control of the controllers 260. In this flattened architecture, the highly versatile field devices 270 may be controlled by the controllers 260, while also being connected to and serve data to clients (e.g., client applications) in the stations 252, 254, 256 and in the cloud network 259 connected directly (or via a gateway 258) to the gigabit network 264.

In both the traditional network 200 of FIG. 6 and the flattened network 250 of FIG. 7, device tagging must be unique. In both cases devices include unique IDs, are allocated unique tags, and support multiple application sessions. However, even here, the highly versatile field devices 220, 224, 230 and 270 described herein support both request and publish/subscribe models. To setup pub/sub devices publishers (highly versatile field devices) must be discovered and once discovered, authenticated with sessions. Once sessions are established, the highly versatile field devices may support both predefined and custom publish lists. Clients or client applications can subscribe to an existing publish list or setup a custom publish list and then subscribe to it, as will be explained in greater detail herein.

As will be understood, the highly versatile field devices disclosed herein may support many different uses or systems. In particular, the highly versatile field devices first of all act as and operate as control field device to perform process or factory automation control activities in response to a process or automation controller. However, the highly versatile field devices can also support plant asset management systems (including configuration of devices). Typically, plant asset management systems are used to configure and provision devices, run diagnostics on devices once deployed, monitor device alerts, as well as large list of many other functions. Still further, the highly versatile field devices described herein may support an IIoT platform for continuous condition monitoring. More particularly, condition monitoring systems may be deployed at many sites to perform a wide range of functions including energy monitoring, equipment and device monitoring, and process monitoring. Such monitoring systems may stream data from the plant, perform the condition monitoring, and provide recommendations back to users and in some cases the control systems themselves.

In another case, the highly versatile field devices described herein may support data logger systems. As an example, many systems collect energy and monitoring data in a central manner for analyzing and establishing an alarm management system, e.g., if a water leakage is detected or energy is being lost due to a leak or break in piping, and these systems may subscribe to or connect to the highly versatile field devices described herein to obtain data for analysis and data logging. Likewise, the highly versatile field devices described herein may support secure smart metering systems. In particular, metering can be a critical process in large-scale distributed systems such oil and gas fields, pipelines, chemical storage, and finished product storage. In chemical storage systems, for example, it is important to have an accurate reading on what materials are present. Smart metering systems typically include intelligent meter-reading systems, which the smart metering system meters through either a controller or independently through remote monitoring systems, and then transports the readings to the processing locations, such as edge gateways or central data servers. Still further, the highly versatile field devices disclosed herein may support environmental monitoring such as that mandated by the Environmental Protection Agency (EPA) or monitoring needed in other uses. As an example, many plants have environmental reporting requirements, such as the reporting of NOx, SOx, and other items. These systems tend to be dedicated systems that perform data collection, calculations, and reporting. It is critical that the data from these systems be timestamped, immune to daylight savings time adjustments, and secure. The highly versatile field devices described herein can additionally provide these additional features to the data served to client applications.

Thus, as will be understood, the highly versatile field devices and field device network architectures described herein support a wide range of application scenarios. The data required in these scenarios is often different. In contrast to control applications, which require measurement parameters, unit codes, and status information, condition monitoring applications require information about the operation and health of the device. For example, for valves the control data includes the valve output value (also referred to as the target or valve set point) and its actual position along with their unit codes and status information. On the other hand, the valve condition monitoring data includes the valve set point, travel, drive, instrument air, travel percent per reversal, temperature and other measurements. To make it easier for device manufacturers, these different sets of device parameters for these different uses can be included in prebuilt templates for control, condition monitoring, data logging, environmental monitoring, or other functions. It is also possible for users to define their own templates and download them to the highly versatile field devices. Custom templates, on the other hand, can be set up on-the-fly. Client applications can then subscribe to these templates. To streamline the plug and play operations of the highly versatile field devices, these templates can be included as part of the application connection such that the field device (server) tells the client what templates it has, and client can subscribe to them or define its own custom templates.

In any event, because the highly versatile field devices support IP communications with client devices directly, i.e., without going through a process controller using one or more specialized control protocols and physical layers, the highly versatile field devices and network architectures in which they are located need additional security over traditional field devices and networks. As noted above, the highly versatile field devices described herein enable an IP-based connection between these devices (i.e., field instrumentation) and multiple different client data consumers, simultaneously. Thus, the highly versatile field devices and supporting networks include field device servers and client applications and devices, wherein the field device servers include field devices like flow, pressure, temperature, etc., sensors, valves, process analyzers, etc., and as described above, the clients include hosts such as PLCs, DCS controllers, Plant Asset Management, and Edge Gateways and applications stored on and executed on hosts or other computer devices, such as process controller applications, plant asset management applications, environment monitoring applications, condition monitoring applications, data logging applications, smart metering applications, etc.

To provide this support, the communication interface of the highly versatile field devices described herein include a session-oriented capability on top of IP and may, for example, support both UDP and TCP. Most real-time implementations use UDP which gives the designers considerably more control over connection management, timeouts, and other capabilities. As a result, publish messages can be used to send periodic and exception-based data from the field devices to subscribed clients, such as controllers. Clients subscribe to devices to receive published messages. Once subscribed to a publish list of a field device, the client listens on an IP endpoint and the field devices publish messages to that endpoint. As such, the highly versatile field devices and the networks in which these field devices are located must implement rigid security.

In traditional control systems using traditional field devices, the control system cyber security and control system design and operation make the assumption that control instruments and instrumentation networks are secure because they are physically isolated and protected by the control system networks. To support this type of security, control system implementations often include considerable use of firewalls, network monitoring, and other defensive mechanisms positioned between layers of the control system. In reality, however, the field devices and the field device networks themselves are often not monitored, which makes anomaly detection difficult. Moreover, these traditional control field devices and networks are also not protected, which makes attacking them a target. This security deficiency is further worsened when the protocols used in the control networks are converted to other protocols, such as MODBUS and OPC DA, where semantics and context are lost (e.g., unit codes). In these cases, when clients receive the measured value, such as a device measurement value converted to an OPC DA value using an OPC DA status, the client will not be aware that values, or status(es) of values, have been altered. These systems do not provide a standardized way to map the original value along with its unit code and status, to the automation applications and other clients.

Figure 8:
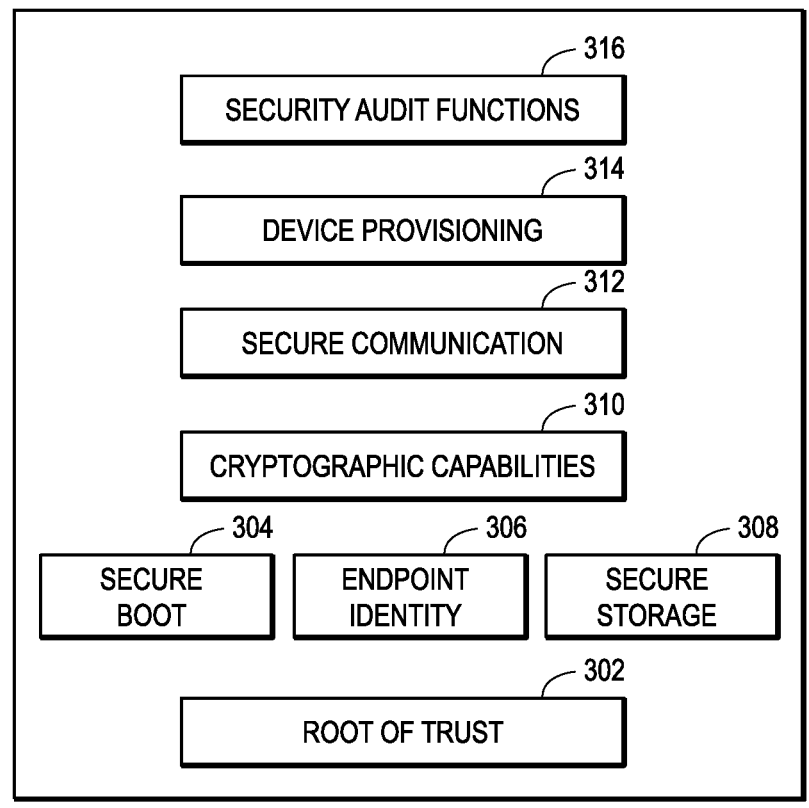
FIG. 8 depicts a block diagram of various security features and components implemented in the highly versatile field device of FIG. 1.

The highly versatile field devices and the networks in which these devices are disposed address these security issues by having security mechanisms incorporated into the field devices and networks, which security mechanisms may include the use of TLS, certificates for authentication, and a complete security train of trust. More particularly, FIG. 8 illustrates a general block diagram of the various security features provided in the highly versatile field device 10 of, for example, FIG. 1 and in the networks of FIGS. 2-7 in which these devices are located. In particular, as illustrated in FIG. 8, the security features include a root of trust component 302, a secure boot feature 304, an endpoint identity feature 306, secure storage 308 and cryptographic capabilities 310. Additionally, the security features include secure communication features 312, device provisioning 314 and security audit functions 316.

In particular, each highly versatile field device 10 includes or contains a root of trust component 302 that forms the basis for the security of the device. Trust in embedded security refers to an expectation that the field device is operating as designed. In particular, the device software trusts that the hardware is operating as it should be, the applications run on the device trust that the operating system is not corrupting device configurations, and remote systems in communication with the device trust in the device identity to which the remote systems are connected. The process of establishing this trust is called attestation, and the root of trust 302 of the field device is the point where attestation and authentication start. This root of trust, once established, extends through and provides the basis for each layer of trust. Thus, a root of trust component 302 is an important building block in the highly versatile field device 10 because the root of trust component 302 provides the basis for securing the device and all communications with the device. A root of trust component 302 can be established using any of a variety of methods and can take many forms, but generally the root of trust component 302 assures that the start-up code on the field device is the code intended by the manufacturer. This root of trust feature 302 protects the start-up code in a manner that makes it unchangeable or incorruptible to outside tampering. In one simple case, the root of trust component 302 may be established by storing and/or executing the manufacturer start-up code for the field device 10 in or directly from a non-writable location in the memory map of the device processor. Alternatively, the device can include a root of trust component 302 that enable updates and patches to be made to start-up code by allowing the start-up code to be loaded from a protected memory region into a protected memory store of some sort set aside for firmware execution. The important aspect for a root of trust component is to be sure that the initial code is what the manufacturer intended, before execution and this root of trust component protects the manufacturer code (or updated code) from being able to be tampered with by third parties. When the code starts, the root of trust derives its internal keys from the supplied device identity inputs and the device executes self-tests and code validation for itself to verify its identity and to establish the basic keys for the root of trust to be used with other devices in a network.

Additionally, the highly versatile field device 10 includes a secure boot feature or process 304. A secure boot process 304 prevents the execution of unauthorized code at the time of device power up, and prevents the exposure of embedded boot code and software. A secure boot process can be accomplished in many different ways, including using digitally signed binaries, using secure and trusted boot loaders, using boot file encryption, and using security microprocessors. While the secure boot feature 304 may center around digitally signed boot files, unless those signatures are verifiable using some sort of an immutable root of trust, the boot is not secure. Therefore, to validate boot files, the highly versatile field device has a digital key installed therein (and established by the root of trust component 302) when the device is manufactured or after manufacturing using a trusted application, and this digital key is then used to perform or enable other security features. Moreover, a secure boot process protects software on the device, such as proprietary algorithms and provides for trusted remediation actions. That is, the secure boot process 304 provides the ability to safely remediate the process control system in case of a device failure or a compromise, because remediation relies on having a secure boot process that checks the validity of the firmware image being booted with or using the root of trust component 302. The device secure boot process 304 provides standardization of these checks to ensure that one bad device does not compromise more than itself.

Moreover, the device secure boot process 304 provides for or enables a secure firmware update. In particular, a secure firmware upgrade includes validating incoming payloads intended to replace existing firmware images, which is critical to maintaining device integrity throughout the system lifecycle. The source of the payload and the payload itself must be validated prior to being applied, and with a properly implemented secure boot process 304, failure to validate the incoming code results in a safe rollback to a known verified boot image. Still further a secure boot process 304 enables a secure connectivity to cloud resources because a secure boot process 304 ensures that the device is authenticated with the cloud each time the device attempts a connection to the cloud through the use of embedded keys and certificates.

Likewise, the highly versatile field device 10 provides for an endpoint identity feature 306. In particular, endpoint identity is a fundamental building block essential for most other security measures. To provide for endpoint identity, the highly versatile field device 10 includes a unique device identifier or identity, and this unique device identity is tied the device's unique device ID.

Still further, the highly versatile field device 10 includes a secure program storage 308. In particular, program storage may be implemented in off-chip flash memory, whose contents are copied into SRAM or external DDR memory to run once the field device is booted. The hardware root of trust protects the device's unique ID and the keys associated with that ID, and thus secures the facilities (communications) that derive from these keys. The device includes secure storage 308 for the rest of the chip, and acts as an identification or authentication device.

In addition, the highly versatile field device uses and implements cryptography 310 across transport protocols (data-in-motion), in storage (data-at-rest), and in applications (data-in-use). Although various types to cryptographic services listed below may be used to implement cryptography in this manner, device manufacturers may use others. As an example, the highly versatile field device may use or include standards-based symmetric cipher suites (PSK or PKI), hashing functions, and random number generators of appropriate strength and NIST/FIPS standards-based validated cryptographic algorithm implementations, and may enable interoperability of cryptographic keys.

Still further, the highly versatile field device 10 provides for secure communications 312 by including a secure end-to-end communications protocol stack. The highly versatile field devices 10 may provide for secure transport using TLS, hash functions using SHA-2 (hash function for generating MAC codes) and may provide encryption using AES-128.

Likewise, the highly versatile field device 10 provides for or includes secure device provisioning 314 (generally performed by the manufacturer in a secure or trusted environment using a secure process) which may including writing certain information into the device such as the device tag, the pre-shared key and or certificate, the Syslog server hostname and port, the DNS server name and, optionally, the default port number that device listens on and a static IP address and mask. Devices should be provisioned before they are installed in the plant. This provisioning is often referred to as onboarding. In one example, during the provisioning phase, the devices should have the following information set by a secure device provisioning process, including (1) the device name and the unit name in which the device will be installed, (2) the pre-shared key or X.509 certificates that will be used to establish a session, (3) the hostname and port used to connect to the Syslog server, (4)

the name of the DNS server, (5) a static IP address and its submask (this is optional), and (6) an optional port number if the default is blocked by a firewall (this is also optional). All of this information should be loaded into the device in a secure location. The information will also have to be made available to the hosts that will open sessions with the devices.

In addition, the highly versatile field device 10 includes or supports security audit functions (e.g., a Syslog) 316 which enables the field device 10 to be monitored as part of regular operations. To assist with this monitoring, the highly versatile field device 10 supports audit logging, including providing audit log information to a Syslog server. In particular, for incident response and audits, event logs are used as a valuable input that can be helpful to measure and assess risks continually and to mitigate threats. This requires the ability to capture system and security events (it may not be a security event), transfer events to a host using Syslog, and an application to review the system events. To implement this functionality, the highly versatile field device 10 supports audit logs and audit functions (Syslogs). In particular, the devices (servers) may record the following in local, volatile audit logs, (1) the last time/date the server was powered up; (2) the last time/date the security credentials were modified; (3) server status; (4) circular 128 entry session summary list; and (5) timestamps, such as 8-byte unsigned integer timestamps. Each session summary record may include (1) client identity including IP addresses (IPv4, IPv6) and port numbers, (2) connect/disconnect time/date for that client, (3) starting/ending configuration change counter, (4) session status and (5) communications counters indicating the number of publish (burst), request, and response PDUs. Moreover, the highly versatile field device 10 may support Syslogs by supporting or providing push audit messages (Syslog messages) which are pushed to security information and event management systems which support the field device 10. These pushed messages are critical to detecting security attacks and unauthorized manipulation of the field device 10. Detection enables improvements to plant security policies and procedures to minimize vulnerabilities.

As one example, the highly versatile field devices 10 and clients connected thereto may support various communication security protocol such as TLS Version 1.2 and 1.3; and DTLS Version 1.2 and 1.3. For both TLS and DTLS, secure sessions are established using a secure handshake. Once established, communications are protected with TLS. Sessions can be established with certificates or with pre-shared keys. The highly versatile field devices may support both PKI and pre-shared keys (PSK). OPC UA fully supports certificates, so if OPC UA is used for communications with the field devices 10, then the certificates will be used. If the end user decides to use symmetric keys, then the system is designed to manage these keys. Moreover, the highly versatile field device 10 may support different security protocols (PSK and PKI) for different sessions or with different clients.

Network Node Management

Figure 9:
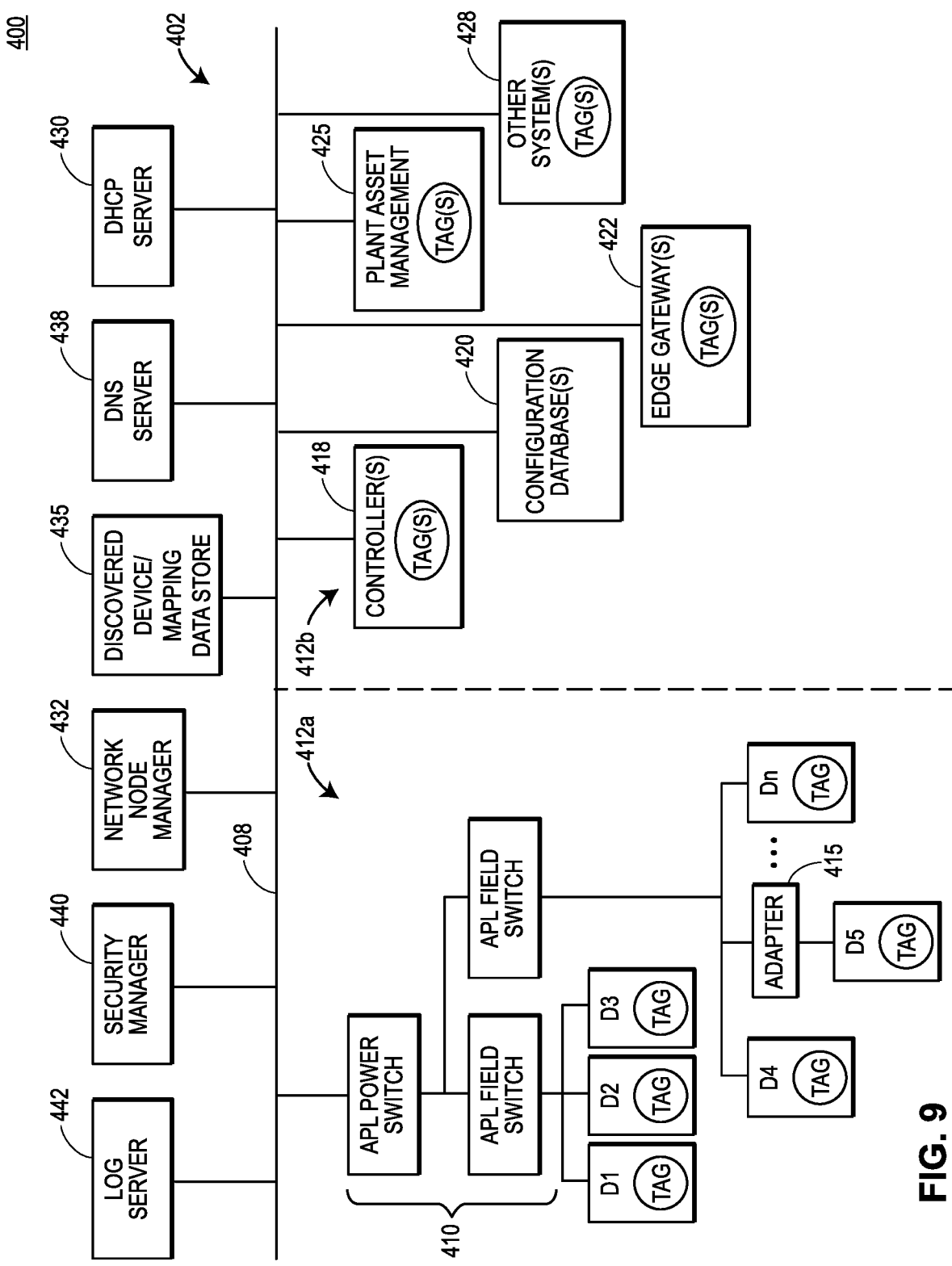
FIG. 9 depicts a block diagram of an example system for managing nodes of a nodal communication network of an industrial process plant or factory automation system, which may include one or more highly versatile field devices of FIGS. 1 and 8.

FIG. 9 is a block diagram of an example system 400 for managing nodes of a nodal communication network 402 of an industrial process plant or factory automation system, where at least one highly versatile (HV) field device 10 is a respective node of the network 402. In example implementations, the system 400 may be included in or otherwise support embodiments of any one or more of the plant and factory automation networking and control architectures depicted in FIGS. 3-7. For example, at least a portion of the nodal communication network 402 may include the traditional process control network 200 of FIG. 6, and/or at least a portion of the nodal communication network may include the flattened process control network 250 of FIG. 7.

In FIG. 9, the nodal communication network 402 includes a backbone 408 (which may, for example, be implemented using Ethernet technology (e.g., 100 Mb or Gigabit Ethernet technology, and/or other suitable types of technology) and includes one or more advanced physical layer (APL) components 410 that provide an Advanced Physical Layer to safely and flexibly connect devices D1-Dn (which are physically disposed within the process plant, automation network, or field environments thereof, as denoted by reference 412a) to the backbone 408. For example, the APL components 410 of FIG. 9 may be included in the APL based network 80 of FIG. 2, the APL network 106 of FIG. 3, etc. As such, devices D1-Dn disposed within the field environment 412a of the industrial process plant or factory automation system are considered to be nodes of the nodal communication network 402.

Devices D1-Dn may include one or more field devices, each of which performs a respective physical function during run-time operations of the plant or network to thereby control an industrial process. For example, field devices which are included in D1-Dn may include sensors, valves, actuators, gauges, other types of measurement devices, etc. In addition to field devices, devices D1-Dn may include other types of devices which are disposed within the field environment 412a of the process plant or automation network, such as controllers; I/O devices, systems, and/or components thereof; safety instrumented system (SIS) components; process control or automation network communication components, such as adapters, routers, gateways, etc.; user interface devices; portable devices; etc. Some of the devices D1-Dn may be highly versatile (HV) field devices such as the highly versatile field device 10, e.g., devices D1-D4 and Dn are shown in FIG. 9 as being highly versatile field devices. Some of the devices D1-Dn may be legacy or traditional devices, e.g., device D5 shown in FIG. 9, and as such may communicatively connect to the APL components 410 (and therefore to the backbone 408 of the nodal communication network 402) via an adapter 415, where the adapter 415 supports the native I/O of the traditional device D5 and thereby enables the traditional device D5 to communicate over the communication network 402 via the APL components 410.

Other nodes 418, 420, 422, 425 of the nodal communication network 402 may communicatively connect to the backbone 408, either directly or without the use of any APL components 410 such as illustrated in FIG. 9, or via respective APL components and/or APL networks (not shown in FIG. 9). Such other nodes 418, 420, 422, 425 typically (but not necessarily) are disposed in a back-end environment of (and/or remotely from) the process plant or automation network, as denoted by reference 412b, and are shielded or protected from the harsher field environment 412a of the process plant or automation network. As shown in FIG. 9, one or more controllers 418, configuration databases or servers 420, and edge gateways 422 of the process plant or automation network may directly connect to the backbone 408 and/or otherwise communicatively connect to the backbone 408 without the use of any APL components 410. For example, such components 418, 420, 422 may be communicatively connected to the backbone 408 via second level networks (e.g., Level 2 networks). Other systems 425, 428 related to the process plant or automation network may also communicatively connect to the backbone 408 of the nodal communication network 402 (e.g., a plant asset management system 425, diagnostic systems, analytics systems, data logging systems, condition monitoring systems, and/or other types of systems 428), e.g., via second level networks, third level networks (e.g., Level 3 networks), and/or higher leveled networks. For example, at least some of the other systems 425, 428 may reside in a cloud computing system. Generally speaking, the nodes 418-428 disposed in the back-end environment 412b are considered to be nodes of the nodal communication network 402, irrespective of whether or not the nodes 418-428 utilize any APL components and/or networks to communicatively connect to the backbone 408.

Generally speaking, and in a manner such as discussed elsewhere herein, during run-time operations of the process plant or automation network, at least some of the devices D1-Dn generate data as the devices D1-Dn perform their respective functions during run-time control of the industrial process, where the generated data may include data indicative of respective physical functions as the respective physical functions are being performed, and/or related data. As such, the devices D1-Dn are considered to be "data hosts" or "data servers" within the nodal communication network 402, as such devices generate or produce data that may be operated on, utilized, or otherwise consumed by other devices. Other devices and/or systems 418-428 may be consumers of the data generated by the devices D1-Dn, and thus may be considered to be "data clients" of the "data hosts" within the nodal communication network 402, as such devices operate on, utilize, or consume data that has been generated/produced by host devices.

A particular data host and a particular data client may establish a (secured) communication session over the nodal communication network 402 via which the particular data host and the particular data client communicate data with each other, e.g., upon request. Additionally or alternatively, data hosts may publish various data over the nodal communication network 402, and various data clients may subscribe to various data that has been published by various data hosts. In an example scenario, a particular data host and a particular data client establish a communication session with each other over the nodal communication network 402, the particular host publishes specific data over the communication session, and the particular data client subscribes to the data published by the particular data host over the established communication session.

Some of the nodes D1-Dn, 418-428 may simultaneously be both data hosts and data clients. For instance, a controller 418 may be a data client of data generated by a data host field device D3, and the controller 418 may also be a data host that generates data (e.g., control signals which are generated by the controller 418 executing a control routine on data generated by the field device D3) that is consumed by another field device Dn, another controller 418, another system 428, etc. Generally, within the nodal communication network 402, each node D1-Dn, 418-428 of the nodal communication network 402 (whether the node is operating as a data host, a data client, or both) is identified via a respective IP address (which, in embodiments, may be a secure endpoint identity 306, e.g., as discussed above with respect to FIG. 8), which may be assigned to the node by a Dynamic Host Configuration Protocol (DHCP) service (e.g., in a manner such as described elsewhere in this disclosure), where the DHCP service may be hosted on a DCHP server 430 of the system 400. As illustrated in FIG. 9, the DCHP server 430 is communicatively connected to the nodal communication network 402, e.g., via the backbone 408. In some arrangements, a nodal communication network 402 may include multiple DCHP servers 430, which may operate in a redundant manner (e.g., for back-up purposes), or in parallel to service respective sets of requests of queries of nodes for IP addresses/endpoint identities that are utilized within the system 400.

On the other hand, within the process control system or automation network, each device D1-Dn is identified by and/or associated with one or more respective logical identifiers or tags, for example, a device tag, one or more data tags identifying types of data that the device transmits and/or receives, etc. For example, a device tag may be a first-order device identification or device identifier, as the device tag directly identifies a device, whereas a data tag may be second-order device identification or device identifier, as the data tag indirectly identifies the device via specific data that the device is to produce or consume. Generally speaking, tags or identifiers that are identified and/or are associated with a device D1-Dn are defined in one or more configurations of the process control system or automation network, such as the one or more configuration databases 420. The one or more configuration databases 420 may be nodes of the nodal communication network 402, e.g., as illustrated in FIG. 9, or the one or more configuration databases 420 may communicatively connect to the devices D1-Dn via one or more other types of process control or automation networks (not shown in FIG. 9), which may include legacy or traditional process control or automation networks. Some identifiers or tags may be manually or automatically provisioned into a respective device D1-Dn (e.g., during bench provisioning and/or commissioning of the device D1-Dn, or at some other time prior to the initial powering-up of the device D1-Dn within the field environment 412a), and/or some identifiers or tags may be downloaded into or otherwise stored in respective devices D1-Dn along with the respective device's configuration. The respective device tags and any respective data tags identifying and/or associated with each device D1-Dn are denoted in FIG. 9 by the encircled "tag" symbols.

The system 400 for managing nodes of the nodal communication network 402 (e.g., nodes D1-Dn and 418-428) includes a network node manager 432 which is communicatively connected to the nodal communication network 402. The network node manager 432 has knowledge of (e.g., stores information indicative of) all devices that have connected to the nodal communication network 402 and have been discovered, e.g., "nodes" of the nodal communication network 402. For example, the network node manager 432 may store identifications of discovered devices (e.g., respective IP addresses, endpoint identities, or names, and/or respective device identifications) within a discovered device data store or database 435. In embodiments, at least a portion of the discovered device data store 435 may be integral with the network node manager 432 (not shown in FIG. 9), and/or at least a portion of the discovered device data store 435 may be implemented as a separate node of the nodal communication network 402, such as shown in FIG. 9. The network node manager 432 further stores and updates the discovered devices' respective states or statuses within the discovered device data store 435. Non-limiting examples of possible device states or statuses include commissioned, active, inactive, off-line, fault, booting, undergoing diagnostics, limited operations, and/or any other suitable states or statuses. Device states or statuses may be updated by the devices themselves, or by other devices. In some embodiments, device states and/or statuses may refer to operational, physical, component, and/or equipment states and/or statuses. In some embodiments, the network node manager 432 also stores respective security credentials of and/or associated with the discovered devices.

Additionally, the network node manager 432 is communicatively connected to other management nodes of the nodal communication network 432, such as to the DHCP server or service 430, a DNS server or service 438, a security manager 440, and/or a system log server 442, e.g., via the backbone 408. Generally speaking, within the nodal communication network 402, the network node manager 432 performs node management, including aiding various devices in discovering other devices, coordinating information flow between the various management nodes 430, 438, 440, 442, and the like by utilizing the discovered device data store 435.

To this end, the discovered device data store 435 stores associations or mappings between device identifications as defined in the process control configuration databases 420 (e.g., device tags of and optionally data tags associated with devices) and respective IP addresses/endpoint identities which have been assigned to the devices by the DHCP server 430. As such, the discovered device data store 435 is interchangeably referred to herein as "mapping database 435." To illustrate, consider an example device D1 which has been provisioned and/or configured with its identifying device tag A and with two data tags B and C identifying two specific types of data that are generated by the device D1. The DHCP server 430 assigns an IP address A1B2 to the device D1. Accordingly, the mapping database 435 (e.g., the discovered device database 435) stores indications of associations between (1) device tag A and IP address A1B2, (2) data tag B and IP address A1B2, and (3) data tag C and IP address A1B2.

Upon assigning an IP address to a device, the DHCP server 430 and/or the device itself may cause the mapping database 435 to be updated accordingly with an indication of the association(s) between the device identifier(s) (e.g., tags) and the assigned IP address, e.g., by directly updating the mapping database 435, and/or by informing a Domain Name Service server (438) that updates the mapping database 435 with the newly created association or mapping. Typically, the DNS server 438 manages the mapping database 435 and its contents; however, in other embodiments, the network node manager 432 and/or other management nodes such as the DHCP server 430 may manage the mapping database 435 and its contents. It is noted that although FIG. 9 depicts the mapping database 435 as being a separate node of the network 402, in embodiments, the mapping database 435 may be supported and/or integrated into one or more of the other management nodes, such as the network management node 432 or the DNS server 438.

Indeed, the system 400 for managing nodes of the nodal communication network 402 (e.g., nodes D1-Dn and 418-428) further includes the Domain Name Service (DNS) server 438 which is communicatively connected to the nodal communication network 402. The DNS server 438 provides a Domain Name Service within the nodal communication network 402. As such, the DNS server 438 receives a request or a query from a first device for the assigned IP address of a second device, where the second device is identified within the request or query by the particular device's configured identification (e.g., the device identification or tag that is stored in the process control configuration databases 420). Upon receiving the request, the DNS server 402 accesses the mapping database 435 to obtain and return the IP address of the second device to the first device, e.g., so that the first device is able to use the second device's IP address to communicate with the second device. In some embodiments, the DNS server 438 also takes into account the state of the device as indicated in the device states database 435 in its reply. For example, if the second device is out-of-service, the DNS server 438 may reply with an indication thereof, in addition to or instead of the requested IP address of the second device. In some arrangements, a nodal communication network 402 may include multiple DNS servers 438.

The system 400 for managing nodes of the nodal communication network 402 (e.g., nodes D1-Dn and 418-428) may include a security manager 440 communicatively connected to the nodal communication network 402. Generally speaking, the security manager 440 of the nodal communication network 402 may provide and manage security credentials of various devices and nodes of the network 402. That is, the security manager 440 may automate certificate management as well as credential provisioning and management. For example, the security manager 440 may assign one or more keys and/or one or more passwords to each device, the security manager 440 may validate certificates and/or other types of security credentials upon request, etc. Additionally, the security manager 440 may include an interface via which various security credentials may be provisioned or otherwise stored into devices (e.g., prior to the devices being powered-up in the field environment 412a via bench-provisioning). Additionally or alternatively, the security manager 440 may provide various security credentials to a device when a respective IP address is assigned (e.g., by the DHCP server 430) to the device. The security manager 440 may include a user interface via which a user may manually enter security credentials, and/or may include a communication interface via which a tool or other computing device may provide and/or obtain security credentials of devices. Additional details pertaining to security credentials are described elsewhere within this disclosure.

In embodiments, the system 400 for managing nodes of the nodal communication network 402 (e.g., nodes D1-Dn and 418-428) includes a system log server 442 (also referred to herein as a "log server 442") that is communicatively connected to the nodal communication network 402. Generally speaking, the system log server 442 is a centralized log server which logs or records events pertaining to the network 402, such as when devices connect and disconnect to the nodal communication network 402, when communication sessions are established and torn down, etc. The devices themselves may inform the log server 442 of the occurrences of various events, such as each time the devices connect to and/or are about to disconnect from the network 402. For example, when a device is a highly versatile field device 10, the device may utilize the security audit function 310 (as discussed above with respect to FIG. 8) to communicate connection, disconnection, and other types of information with the system log server 442. In some cases, devices may additionally inform the log server 442 of events pertaining to other devices. Logs that are stored at the log server 442 may be audited and/or otherwise analyzed for the purposes of mitigating security issues.

It is noted that although FIG. 9 illustrates the DHCP server 430, the network node manager 432, the DNS server 438, the security manger 440, the log server 442, and the mapping database 435 (e.g., the "management" nodes of the network 402) as being separate and distinct nodes of the nodal communication network 402, this is for ease of illustration only, and is non-limiting. Any two or more of these management nodes 430, 432, 435, 438, 440, and 442 may be implemented as an integral node, as desired. For example, the network node manager 432 may include the DNS service or server 438, the network node manager 432 may include the DHCP service or server 430, the DNS server 438 may include the mapping database 435, etc. Further, although FIG. 9 illustrates each of nodes or servers 430, 432, 435, 438, 440, 442 as a respective single node, in embodiments, the system 400 may include multiple ones of each of nodes 430, 432, 435, 438, 440, and/or 442. Still further, any one or more of the management nodes 430-442 maybe implemented or hosted by any suitable computing systems, such as one or more physical and/or virtual servers, one or more data banks, etc., at least portions of which may be disposed locally or proximate to the process plant or automation system, and/or at least portions of which may be remotely disposed with respect to the process plant or automation system, e.g., at a server farm, in a cloud computing system, etc.

Generally speaking, the management nodes or components 430, 432, 435, 438, 440, 442 of the system 400 operate to provide management and security of nodes or devices D1-Dn and 418-428 of the nodal communication network 402. For example, the system 400 may provide device discovery, device state tracking, device security, and other types of device management.

Figure 10:
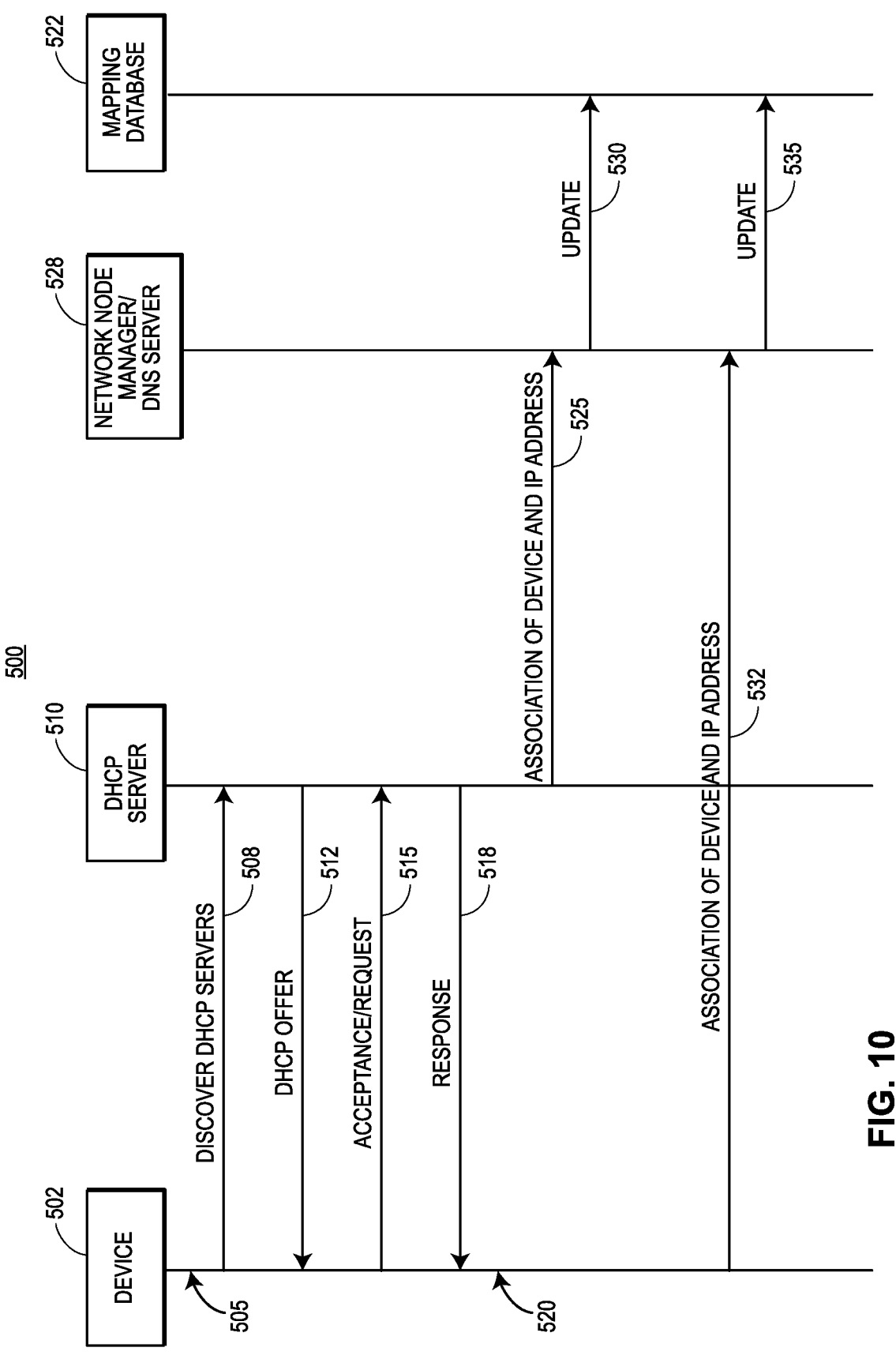
FIG. 10 depicts a first example message flow which may occur upon an initial connection of a highly versatile field device to the nodal communication network of FIG. 9.

To illustrate, FIG. 10 depicts an example message flow 500 that occurs upon the initial connection of an example device 502 to the nodal communication network 402. The device 502 may be a highly versatile field device, for example, such as devices 10, D1-D4 or Dn, or the device 502 may be a legacy field device such as device D5 connected to the APL components 410 and the network 402 via the adapter 415. Accordingly, for situations in which the device 502 is a legacy device, the adapter 415 communicates with the network 402 on behalf of the legacy device even though the adapter 415 is not depicted in FIG. 10. Generally speaking, the message flow 500 may occur in embodiments of the system 400 of FIG. 9, or may occur in other systems for managing nodes of a nodal communication network of a process control system or automation network. For ease of illustration, though, and not for limitation purposes, the message flow 500 is described below with simultaneous reference to FIGS. 8 and 9.

In the example message flow 500, the device 502 has been provisioned with its own identity prior to powering up 505 and connecting to the nodal communication network 402. That is, the unique identification of the device (e.g., the device tag) and optionally any data tags corresponding to data that the device is to send and/or receive during run-time operations, may have been provisioned or otherwise stored into the memory of the device 502, e.g., either manually by an operator and/or by use of a provisioning, commissioning, or other suitable tool, such as the security manager 440 or 605. Said process of storing identity and other information into the device 502 while it is not yet powered-up for run-time operations and while the device 502 is unconnected from the network 402 is referred to herein as "bench-provisioning" and is described in more detail elsewhere within this disclosure. At any rate, as previously discussed, the device's unique identification (e.g., the device tag) and any data tags associated with the device 502 typically have been defined in one or more configurations stored in the configuration database(s) 420 of the process control system or automation network, and as such, the device 502 is provisioned with the logical identifier by which the device 502 is known to the process control system or automation network (e.g., the corresponding device tag), and optionally with any corresponding data tags that are also known to the process control system or automation network.

The device 502 is physically disposed and installed at its intended location of the process control plant or automation network, e.g., in a field environment thereof (such as field environment 412a of FIG. 9), and any physical interfaces to the network 402 are physically connected thereto. Subsequently, the device 502 is powered on, as denoted by reference 505. For example, the device 502 may be powered on using secure boot feature 304 of FIG. 8.

Upon powering on 505, the device 502 broadcasts a Discover DHCP message (508) via the network 402 to determine or discover any DHCP servers that are servicing the nodal communication network 402 and that would be able to assign an IP address or endpoint identifier to the device 502 so that the device 502 may be identified within and as a node of the network 402. The Discover DHCP message 508 is received by any DHCP services and/or servers which are servicing the network 402, such as the DHCP server 510 shown in FIG. 10. In an example implementation, the DHCP server 510 is an embodiment of the DHCP server 430 of FIG. 9.

In the example message flow 500, the DHCP server 510 responds to the Discover DHCP message 508 with a DHCP Offer 512 which identifies the DHCP server 510 therein and includes IP addressing information for the device 502. For example, the Offer 512 may include the endpoint identity 306 of the device 502. The device 502 selects one of the responding DHCP servers (in this scenario, the DHCP server 510), and sends an Acceptance 515 of the Offer 512, where the Acceptance 515 includes a request for corresponding network parameters and other information associated with the IP address (e.g., endpoint identity 306) that has been assigned to the device 502. The DHCP server 510 responds 518 with the requested information, and thus provides the device 502 with not only an IP address that has been assigned to the device 502 (e.g., endpoint identity 306), but also with other parameters such as a netmask, gateway, router, and/or other network configuration parameters. In some embodiments, the assigned IP address is valid for only a finite amount of time (e.g., a lease), and the DHCP server 510 indicates a duration of the lease to the device 502 in the response 518.

In some embodiments, the nodal communication network 402 supports stateless address configurations (SLAAC). In these embodiments, instead of the DHCP server 510 assigning an IP address to the device 502, the device 502 selects its own IP address (e.g., its own endpoint identity 306), e.g., based on a prefix advertised on the connected interface of the device 502 to the network 402. In these embodiments, in the response 518, the DHCP server 510 may inform the device 502 of network configuration and/or other types of parameters, such as time servers, domain names, DNS services and/or servers, etc.

At any rate, at this point 520 of the message flow 500 (e.g., after the response 518 has been received by the device 502), both the device 502 and the DHCP server 510 have knowledge of the association between the device's process control/automation network identification (e.g., device tag) and the IP address/endpoint identifier that has been assigned to the device 502. In some implementations, the device 502 and the DHCP server 510 may additionally or alternatively have knowledge of respective associations between each of the device's data tags and the IP address assigned to the device 502. As such, the DHCP server 510 and/or the device 502 may update a discovered device/mapping data store or database 522 with the new association(s) or mapping(s). In an example implementation, the discovered device/mapping data store or database 522 is an embodiment of the discovered device/mapping data store 435 of FIG. 9.

In an example branch of the message flow 500 denoted by reference 525, the DCHP server 510 may transmit an indication of the new association or mapping between the device 502 and its assigned IP address to a network node manager and/or the DNS server 528, and the network node manager and/or DNS server 528 may update 530 the mapping database 522 with an indication of the new association between the device's identification and the IP address assigned to the device 502 (and/or of the respective associations between each of the device's data tags and the IP address assigned to the device 502). In an example implementation, the network node manager and/or the DNS server 528 is an embodiment of at least one of the network node manager 432 or the DNS server 438 of FIG. 9. Additionally or alternatively, the device 502 may transmit, to the network node manager and/or DNS server 528, an indication of the new association between the device's identification and the IP address assigned to the device 502 (and/or of the respective associations between each of the device's data tags and the IP address assigned to the device 502), as denoted in FIG. 10 by reference 532, thereby causing the mapping database 522 to be updated accordingly (reference 535).

Figure 11:
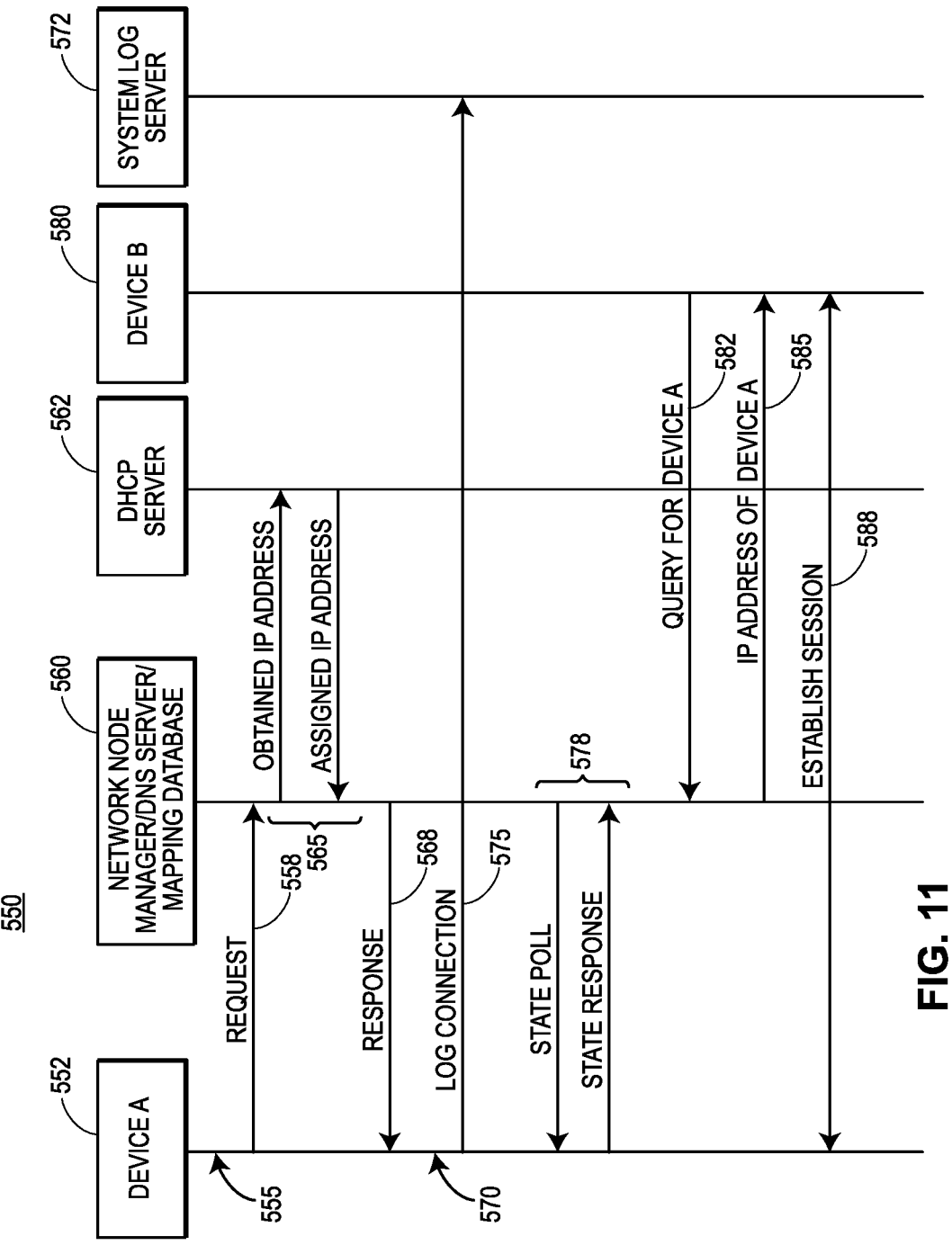
FIG. 11 depicts a second example message flow which may occur upon an initial connection of a highly versatile field device to the nodal communication network of FIG. 9.

Significantly, the system 400 may provide the ability for "plug-and-play" devices, as illustrated by the example message flow 550 of FIG. 11. In FIG. 11, a device 552 (e.g., "Device A") physically arrives at the site of a process control plant or automation network at which the device 552 is to be installed and is to operate, during run-time, to control an industrial process. The device 552 may be a highly versatile device, for example, such as one of highly versatile field devices 10, D1-D4 and Dn, or the device 552 may be a legacy device, such as device D5 which is to be connected to the nodal communication network 402 via an adapter 415 and the APL components 410. Accordingly, for situations in which the device 552 is a legacy device, the adapter 415 communicates on behalf of the device 552 via the nodal communication network 402 even though the adapter 415 is not shown in FIG. 11. Generally speaking, the message flow 550 may occur in embodiments of the system 400 of FIG. 9, or may occur in other systems for managing nodes of a nodal communication network of a process control system or automation network. For ease of illustration, though, and not for limitation purposes, the message flow 550 is described below with simultaneous reference to FIGS. 8-9.

Prior to powering-up 555 of the device 552 on-site for the purpose of run-time operations, the device 552 may be provisioned (e.g., bench-provisioned) with a device tag and optionally with information such as corresponding data tags, one or more security credentials (e.g., keys, certificates, passwords, etc.), respective IP addresses of a DHCP server 430, DNS server 438, and/or network node manager 432, an IP address of a system log server 442, an IP address of a security manager 440, and/or other information. For example, an operator or user may communicatively and temporarily connect the otherwise unconnected device 552 to the security manager 440 or 605, to a provisioning or commissioning tool (not shown), or to another suitable device or tool via which such information is provisioned or otherwise stored into the memories of the device 552, thereby bench-provisioning the device 552. In embodiments in which security credentials are bench-provisioned into device 552, typically the security manager 440 assigns the one or more security credentials to the device 552. In embodiments in which the device 552 is a highly versatile field device 10, the device 552 may utilize on-board device provisioning feature 314 to obtain identifications and security credentials from the security manager 440, and the obtained information may be stored in on-board secure storage 308 for utilization by, for example, features such as the root of trust 302, secure boot 304, cryptographic capabilities 310, secure communication 312, security audit 316, etc.

In FIG. 11, for ease of discussion and not for limitation purposes, the embodiment of the system 400 supporting the message flow 550 is arranged so that the network node manager includes or hosts the DNS service. That is, in FIG. 11, the network node manager and the DNS service or server are an integral node, e.g., as represented by the reference 560. Additionally, in FIG. 11, the DHCP server is a separate node of the nodal communication network, e.g., as represented by the reference 562. In an example implementation, the network node manager/DNS service 560 is an embodiment of the network node manager 432 and the DNS server 438 of FIG. 9, and the DCHP server 562 is an embodiment of the DHCP server 430 of FIG. 9.

Upon the device 552 powering up 555 (e.g., by utilizing the secure boot feature 304), the device 552 sends a request 558 to the integral network node manager/DNS service 560 for an IP address or endpoint identity via which the device 552 is to be identified within the nodal communication network 402. For example, the device 552 may utilize an IP address of the network node manager/DNS service 560 which was bench-provisioned into the device 552 to send the request 558 to the network node manager/DNS service 560. Upon reception of the device's request 558, the network node manager/DNS service 560 interfaces with the DHCP server 562 (e.g., via message exchange 565) to obtain an IP address for the device 552 (e.g., to obtain the device's endpoint identity 306), and the network node manager/DNS service 560 returns the device's assigned IP address/endpoint identity (and optionally other information, such as previously discussed) to the device 552 in a response 568. The device 552 may store its assigned IP address/endpoint identity and other information in secure storage 308 at the device 552, for example. At this point 570 of the message flow 550, the device 552 is known or identified by its configured device identification or tag within the process control system or automation network, and is known or identified by its assigned IP address/endpoint identity within the nodal communication network 402. The association between the device's configured identification or tag and the device's IP address/endpoint identity is stored in a mapping database or discovered device data store, such as mapping database 435, which, as previously discussed, is accessible to at least the network node manager/DNS service 560. Additionally, the network node manager/DNS service 560 updates the state of the device 552 within the mapping database or discovered device data store to be "connected," "active," "available," or some suitable equivalent state indicating that the device 552 is active and operational. In the example implementation illustrated by FIG. 11, the discovered device/mapping database is integral with the network node manager/DNS server 560.

Thus, at this point 570 in the message flow 550, the device 552 has been "plugged" into the nodal communication network 402. That is, the device 552 has connected to the nodal communication network 402 and is available to communicate with other nodes of the network 402. Upon the completed connection 570, the device 552 informs a system log server 572 that the device 552 has connected to the network 402 (e.g., as denoted by the reference 575), and the system log server 572 records the connection event. In an example, the system log server 572 is an embodiment of the system log server 442, and the device 552 utilizes security audit feature 316 to provide the log server 442 with an indication of the connection event.

It is noted that although in FIG. 11 the device 552 is shown as obtaining its assigned IP address by communicating with the network node manager/DNS service 560, this is only one of many possible embodiments. For example, the device 552 may obtain its assigned IP address by utilizing a broadcast Discover DHCP message, e.g., in a manner similar to that performed by the device 502 in the example message flow 500 of FIG. 10. In another example, the device 552 is bench-provisioned with the IP address of the DHCP server 562, and upon powering up 555, the device 552 may directly communicate with the DHCP server 562 to thereby request and/obtain an IP address of the device 552 and associated parameters. Of course, other embodiments are possible.

With further regard to FIG. 11, while the device 552 remains "plugged into" or connected to the nodal communication network 402, the network node manager/DNS service 560 tracks and updates the state and/or the status of the device 552 within the discovered device or mapping database (e.g., discovered device/mapping database 435 which, as previously discussed, is illustrated in FIG. 11 as being integral with the network node manager and DNS service 560). In the message flow 550, the network node manager/DNS service 560 polls the device 552 (e.g., periodically, on demand, when triggered, etc.) and receives a current operating state from the device 552 in response to the poll, e.g., as denoted by message exchange 578. For example, the network node manager/DNS service 560 may poll each device of which it has knowledge (e.g., via discovered device or mapping database) for updates to the devices' states. Additionally or alternatively (not illustrated in FIG. 11), the device 552 may provide, of its own accord, a current state and/or status to the network node manager/DNS service 560, e.g., either periodically, and/or when the device's state and/or status changes (e.g., a fault is discovered, the device 552 undergoes diagnostics, re-boots, etc.). Still additionally or alternatively, third-party devices may provide the network node manager/DNS service 560 with updates to the state and/or status of the device 552 (also not illustrated in FIG. 11), such as when a diagnostic tool takes the device 552 off-line for diagnostic purposes, when the security manager (e.g., security manager 440) discovers a security anomaly pertaining to the device 552 that needs to be mitigated and affects the device's state, etc. At any rate, the network node manager/DNS service 560 updates the state and/or the status of the device 552 within the discovered device database.

While the device 552 is connected to the nodal communication network 402, other devices or nodes of the network 402 may discover the device 552 and establish communications with the device 552 (e.g., the " . . . and-play" portion of "plug-and-play"). To illustrate, consider an example scenario in which device 552 is a field device that generates data as it operates during run-time of the process control system or automation plant. In this scenario, the field device 552 and a controller device 580 (e.g., "Device B" of FIG. 11) are included in a process control loop that operates during run-time of the industrial process plant or automation network to control an industrial process. Configurations of the process control loop, the field device 552, and the controller 580 are stored in the configuration database(s) 420, and each of the field device 552 and the controller 580 has been respectively provisioned with its device tag or identification (e.g., as indicated in the configuration database(s) 420) and has been respectively assigned a unique IP address by the DHCP server 562. Further, the controller 580 stores (and executes during run-time) one or more control modules or routines that have been configured to operate on data generated by the field device 552, where such generated data is referenced by the field device's device tag or by one or more respective data tags associated with the field device 552. That is, the controller 580 is configured to be a consumer (e.g., a client) of run-time data generated by the field device 552 (e.g., a host). The configuration of the controller 580 and the configuration of the control modules or routines that the controller 580 is to execute are defined within the configuration database(s) 420, and are downloaded into and/or otherwise provided to the controller 580 for storage and execution during run-time operations. As such, the controller 580 has knowledge of the device tag and/or data tag(s) associated with the field device 552 (e.g., as provided in the downloaded configuration); however, the controller 580 does not have a priori knowledge of the IP address that has been assigned to the field device 552 within the nodal communication network 402.

Accordingly, to establish communications with the field device 552 over the nodal communication network 402, the controller 580 discovers the field device 552 via the nodal communication network 402. Specifically, and as shown in FIG. 11, the controller 580 (e.g., via a DNS client executing at the controller 580) queries the DNS service or server 560 for the IP address of the field device 552 (as denoted by reference 582), e.g., by utilizing the IP address of the DNS server 560 with which the controller 580 has been bench-provisioned and providing, to the DNS server 560, the device tag and/or data tags of the field device 552 that are known to the controller 580. Upon receiving the query 582, the DNS service 560 accesses the mapping database/discovered device data store to find the IP address that has been assigned to the field device 552. The DNS service 560 replies to the controller 580 with the IP address assigned to the field device 552 and/or indications of the field device's current status (reference 585). For example, the DNS service 560 may only return the IP address of the field device 552 when the field device 552 is active, the DNS service 560 may return both the IP address of the field device 552 and an indication of the field device's current state (e.g., active, temporarily out of service, etc.), the DNS service 560 may return an indication that the field device 552 has been disconnected from the network 402, etc.

In embodiments, upon reception of the query 582, the DNS service 560 may authenticate the controller 580 and the field device 552 using their respective security credentials (e.g., keys, certificates, etc.). For example, the DNS service 560 may authenticate the controller 580 and/or the field device 552 by utilizing respective security credentials which have been stored in the discovered device database 435, by querying the security manager 440 to authenticate, validate, verify, etc.

At any rate, upon receiving the reply 585 from the DNS service 560, the controller 580 has discovered the field device 552 with which the controller 580 is to communicate during execution of the process control loop. The controller 580 may use the field device's IP address (and the field device 552 may use the controller's IP address) to communicate in any suitable manner (e.g., direct messaging, client/server-type communications, request/response, publish/subscribe, etc., such as described elsewhere in this disclosure) via the nodal communication network 402 to execute the control loop, and/or for other purposes. In embodiments, the controller 580 and the field device 552 utilize their respective IP addresses to establish a secured communication session over the network 402 via which the controller 580 and the field device 552 communicate data and information, as denoted by reference 588. For example, the controller 580 and the field device 552 may exchange security credentials (which may have been assigned by the security manager 440 and bench-provisioned into each of the devices 580, 552), may validate certificates with the security manager 440 and/or the network node manager 560, and/or may take other associated actions to secure the communication session. Typically, each of the controller 580 and the field device 552 notifies the system log server 572 of the establishment and tearing down of sessions, and other events associated with the communication session (not shown in FIG. 11).

It is noted that although the above example scenario refers to the client device 580 (e.g., Device B) as being a controller and the host device 552 (e.g., Device A) as being a field device which are both included in a same process control loop, this is for illustrative purposes only. Indeed, any type of client device connected to the nodal communication network 402 may utilize a similar approach (e.g., message exchange 582, 585) to discover one or more host devices that produces data which the client device is to consume.

Returning now to FIG. 9, as previously discussed, the network node manager 432 may discover devices that have attached or connected to the nodal communication network 402, store the device identifications (e.g., whether first-order device identification such as device tags, or second-order device identifications such as data tags) and the IP addresses of the discovered devices within the mapping database/discovered device data store 435, and maintain updated states and/or statuses of the discovered devices within the mapping database/discovered device data store 435. For example, in embodiments in which the network node manager 432 and the DHCP server 430 are an integral node, the network node manager 432 discovers newly connected devices by way of receiving the devices' queries of the DHCP server 430 for IP addresses. When the network node manager 432 is a different node than the DHCP server 430, the DHCP server 430 may inform the network node manager 432 and/or the DNS server 438 of newly connected devices and their respective device identification/IP address associations. When the DHCP server 430 informs only one of the network node manager 432 or the DNS server 438 of the newly connected devices (and their respective device identification/IP address associations), the other node may query (e.g., periodically, or otherwise as desired) the informed node for any newly added devices and their respective IP addresses and device identifications. Thus, generally speaking, the mapping/discovered device database 435 may store device identifications and corresponding IP addresses, as well as updated device status and state information.

In embodiments, the mapping or discovered device database 435 also stores security credentials of at least some of the discovered devices, such as keys, certificates, passwords, and the like. At least some of the security credentials may have been generated by the security manager 440, and may have been stored in the discovered device database 435 directly by the security manager 440 (e.g., via bench provisioning). Additionally or alternatively, at least some of the security credentials may be provided during device discovery by the security manager 440 and/or by devices themselves to the network node manager 432 for storing in the discovered device database 435. For example, referring to FIG. 11, the device 552 may provide its bench-provisioned security credentials or information (e.g., keys, certificates, passwords, etc.) to the network node manager 560 in conjunction with the request for its IP address 558.

The network node manager 432 may utilize the device credentials and/or security information stored in the discovered device database 435 for managing device security for individual devices and among multiple devices. For example, the network node manager 432 may verify or validate the device credentials of a host device that is attempting to connect to the nodal communication network L15, the network node manager 432 may verify or validate the device credentials of a client device (such as in conjunction with the client device's query for a host device's IP address, e.g., as per reference 582), the network node manager 432 may verify or validate device credentials in conjunction with polling a device for its status (e.g., reference 578 of FIG. 11), etc. Additionally or alternatively, the network node manager 432 may rely on the security manager 440 to verify and/or validate device credentials and security information, e.g., by asking the security manager 440 to perform verification, validation, and other security tasks.

Of course, a client device and a host device may utilize their respective security credentials or information to establish a communication session over the nodal communication network 402, such as in the session establishment 588 shown in FIG. 11. For example, in addition to providing the client device and the host device with their respective security credentials during bench-provisioning, the security manager 440 may also manage respective keys and validate certificates after provisioning, e.g., when the devices connect to the network 402 and/or while the devices remain connected to the network 402. If a device fails to successfully validate or be successfully verified, the device may be quarantined and prevented from communicating with other nodes of the nodal communication network 402 until the device's security credentials and/or information have been resolved, e.g., manually.

Such security techniques advantageously allow for physical devices to be easily replaced. For example, a physical replacement device need only be bench-provisioned with the security credentials that had been provisioned into the device that it is replacing. Accordingly, when the physical replacement device is identified within the process control system by using the device tag and security credentials of the previous device, by using the techniques described herein, the physical replacement device will automatically be configured with the same settings as the device it is replacing, and can be plugged-and-played.

Figure 12:
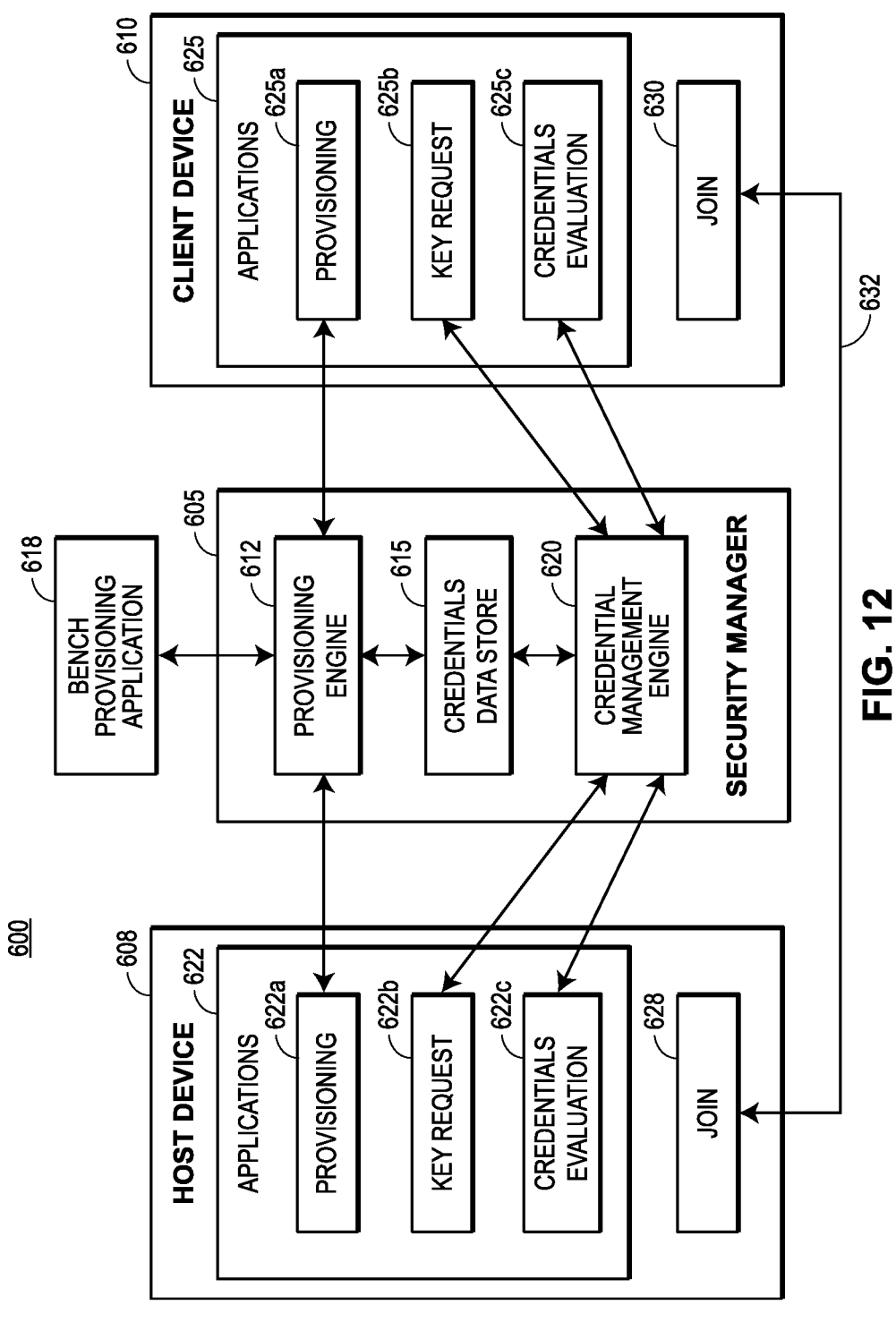
FIG. 12 depicts a block diagram of an example security architecture for a node management system of a nodal communication network, such as the nodal communication network depicted in FIG. 9.

FIG. 12 depicts a block diagram of an example security architecture 600 which illustrates at least some of the security techniques and/or aspects of a system for managing nodes of a nodal communication network of an industrial process plant or automation system, such as those security techniques and/or aspects described elsewhere herein. The security architecture 600 may be utilized for devices and/or nodes of the system 400 of FIG. 9 or of other suitable systems. For example, the security architecture 600 may be utilized to secure a highly versatile field device 10 of FIG. 1, and/or in conjunction or in cooperation with any one or more of the security features discussed above with respect to FIG. 8. For ease of illustration, though, and not for limitation purposes, the architecture 600 is described with simultaneous reference to the security features of FIG. 8 and the system 400 of FIG. 9.

As shown in FIG. 12, the architecture 600 includes a security manager 605 which may communicate, for security purposes, with a host device 608 and a client device 610. In an example implementation, the security manager 605 is an embodiment of the security manager 440 of FIG. 9, the host device 608 is an embodiment of one of the devices or systems 10, D1-Dn, 418, 422, 425, 428, and the client device 610 is an embodiment of another one of the devices or systems 10, D1-Dn, 418, 422, 425, 428. In the example illustrated in FIG. 12, the client device 610 is a consumer of data that is generated or produced by the host device 608 while the devices 608, 610 are operating during run-time operations of the industrial process plant or automation network. For instance, the host device 608 may be the field device 552 of FIG. 11, and the client device 610 may be the controller 580 of FIG. 11.

The security manager 605 includes a provisioning engine 612 which generates or otherwise determines respective security credentials of devices of the industrial process plant or automation system that are to connect to the nodal communication network 402 during bench provisioning of such devices, e.g., when such devices are not yet powered up for run-time operations within the industrial process plant or automation system, and while such devices are unconnected from the network 402. The provisioning engine 612 records or stores provisioned credentials of such devices into a credential data store 615. Typically, bench provisioning occurs when such devices are located on-site at the process plant or automation system; however, bench provisioning may occur any time prior to the powering up of such devices for the purposes of connecting to the nodal communication network 402, such as when such devices are located at the manufacturing factory, at a staging site, etc.

The provisioning engine 612 operates in conjunction with a bench provisioning application 618 which may be provided via a user interface of the security manager 605, and/or may be otherwise exposed to or provided at user interfaces of other devices that are utilized to administer provisioning (e.g., hand-held computing devices or other types of tools). For example, the security manager 605 may download an instance of the bench provisioning application 618 to various user-operated computing devices or tools, the security manager 605 may host the bench provisioning as a service that is accessible to various user-operated computing devices or tools, etc. Generally speaking, the bench provisioning application 615 provides access of users to the security manager 605 for defining, generating, viewing, and administering device security credentials, and/or for performing other tasks related to provisioning security credentials into devices.

The security manager 605 further includes a credential management engine 620 which typically manages security credentials of devices while the devices are attempting to connect to the network 402, to each other, and during run-time operations of the industrial process plant or automation system. For example, the credential management engine 620 may authenticate or verify various devices, provide keys to various requesting devices, validate certificates, and the like. As such, the credential management engine 620 may access the credential data store 615. Typically, but not necessary, the credential management engine 620 operates automatically, e.g., without any user input.

In an embodiment, each of the provisioning engine 612, bench provisioning application 618, and credential management engine 620 comprises a respective set of computer-executable instructions which is stored on one or more memories of the security manager 605 and is executable by one or more processors of the security manager 605 to perform its respective tasks and/or functions.

The host device 608 stores, on one or more of its memories, one or more routines or applications 622 which, when executed by one or more processors of the host device 608, enable the host device 608 to communicate with the security manager 605. Likewise, the client device 610 stores, on one or more of its memories, one or more routines or applications 625 which, when executed by one or more processors of the client device 610, enable the client device 610 to communicate with the security manager 605. For example, the host device 608 may include a provisioning routine 622a which obtains device identifications of the host device 608 (e.g., the device tag of the host device 608, any associated data tags, etc.) and associated security credentials for the host device 608 from the provisioning engine 612, e.g., during bench provisioning of the host device 608. The information obtained by the provisioning routine 622a is stored in the one or more memories of the host device 608 (not shown in FIG. 12). In an example implementation in which the host device 608 is a highly versatile field device, such as the highly versatile field device 10, the provisioning routine 622a may include the device provisioning functionality 314, and the obtained device identifications and/or security credentials may be stored in secure program storage 308, for example.

Similarly, the client device 610 may include a provisioning routine 625a which obtains device identifications of the client device 610 (e.g., device tag of the client device 610, any associated data tags, etc.) and associated security credentials of the client device 610, e.g., during bench provisioning of the client device 610. Additionally, the provisioning routine 625a of the client device 610 may also obtain respective device identifications (e.g., device tags, associated data tags, etc.) of any host devices that produce run-time data that the client device 610 consumes and operates on during run-time, including the host device 608. The information obtained by the provisioning routine 420a is stored in the one or more memories of the client device 610 (not shown).

At times other than during provisioning, e.g., during the process of connecting to the nodal communication network 402, and/or while connected to the nodal communication network 402, the host device 608 may execute a key request routine 622b via which the host device 608 requests keys (e.g., private keys, public keys, etc.) from the credential management engine 620 of the security manager 605. For example, the key request routine 622b may be included in the secure communication features 312. Similarly, the client device 610 may execute a key request routine 625b via which the client device 610 requests keys (e.g., private keys, public keys, etc.) from the credential management engine 620. Further, for authenticating, verifying, validating, and/or other types of credentials evaluation during the process of connecting to the network 402 and while connected to the network 402, each of the host device 608 and the client device 610 may execute a respective credential evaluation routine 622c, 625c that interfaces with the credential management engine 620 of the security manager 605 to accomplish the same, e.g., by accessing the stored credentials 615. For example, when the host device 608 and the client device 610 execute respective join routines 628, 630 to respectively and securely join the nodal communication network 402 and thereby be able to establish a communication pathway or even a communication session 632, at least some device security routines or applications 612b, 612c, 620a, 620c may be executed. For example, the host device 608 may utilize any one or more of the security features and/or security protocols (e.g., 306, 310, 312, etc.) discussed with respect to FIG. 8 to establish the secured communication session 632.

It is noted that in FIG. 12, the applications or routines 622a, 622b, 622c, 628 of the host device 608 are illustrated as being separate and distinct applications or routines, however, this is for clarity of discussion purposes only. Indeed, the functionality of host device applications/routines 622a, 622b, 622c, 628 may be implemented using lesser or more numbers of separate and distinct applications or routines. Similarly, the functionality of client device applications/routines 625a, 625b, 625c, 630 may be implemented using lesser or more numbers of separate and distinct applications or routines, and the various functionalities provided by security manager 612, 615, 620 may be implemented using lesser or more number of separate and distinct engines, applications, or routines.

Figure 13:
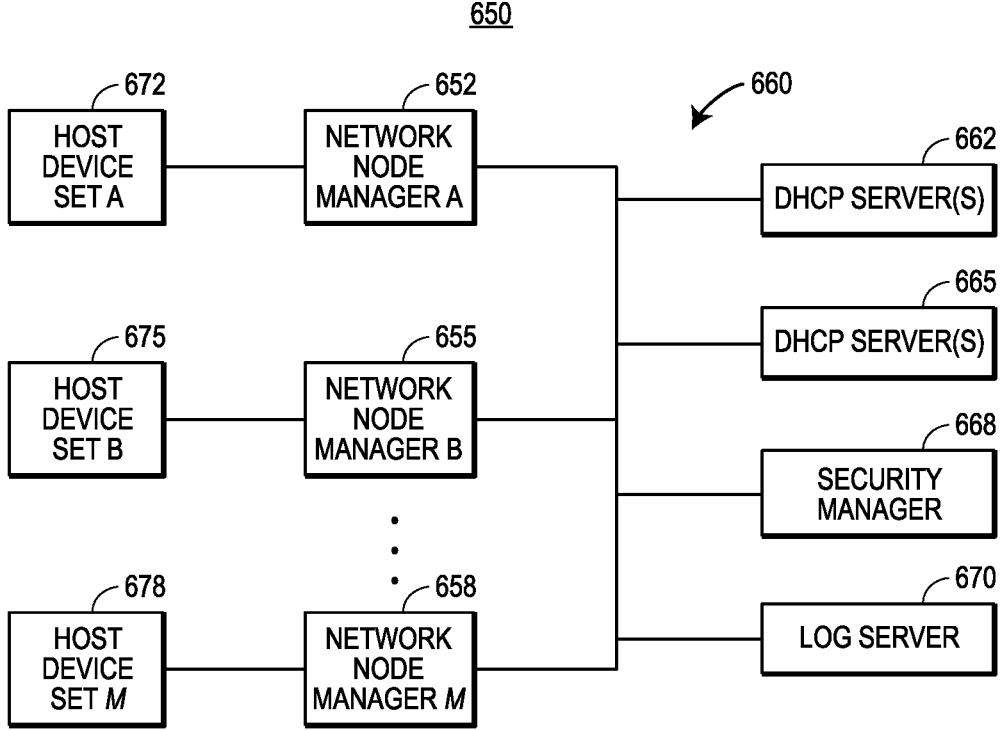
FIG. 13 depicts a block diagram of a node management system of a nodal communication network which includes multiple network node managers.

Turning now to FIG. 13, in some embodiments, a nodal communication network 402 may include multiple network node managers 432, at least some of which may be redundant and serve as back-up network node managers, and/or at least some of which may be distributive in nature. For example, FIG. 13 illustrates an arrangement of an example system 650 for managing nodes of a nodal communication network of an industrial process control or automation system, where the system 650 includes multiple, distributed network node managers 652, 655, 658. The system 650 may be an embodiment of the system 400, and is discussed herein with simultaneous reference to FIG. 9 for clarity of illustration. However, it is understood that other systems for managing nodes of a nodal communication network of an industrial process control or automation system may easily incorporate multiple redundant and/or distributed network node managers 652-658 using the principles and techniques described herein.

As shown in FIG. 13, each network node manager 652-658 is communicatively connected via the backbone of a nodal communication network 660 to other types of management nodes of the system 650, such one or more DHCP servers 662, one or more DNS servers 665, one or more security managers 668, one or more log servers 670, and/or the like. Further, each network node manager 652-658 respectively services a different set of host devices 672, 675, 678, where the different sets of host devices 672, 675, 678 are mutually exclusive sets. As such, each network node manager 652-658 manages the device tag, IP address or endpoint identification, status, and optionally security information of each host device included in its respective set of host devices 672, 675, 678, e.g., via its respective mapping database. As such, queries that are received at a first network node manager for the endpoint identification of a device that is not managed by the first network node manager may be routed to, via the nodal communication network 600, another network node manager that manages the device. In some embodiments, one or more of the network node managers 652-658 may share (and update) at least a portion of its respective mapping database with at least one other one of the node managers 652-658 so that the at least one other one of the node managers may service queries for non-managed devices without having to dialogue with the managing network node manager.

Further, the nodal communication network 402 may utilize time synchronization to synchronize clocks across network components or nodes, such as across devices D1-Dn (which may include one or more highly versatile devices, such as the highly versatile field device 10) and nodes 418, 420, 422, 425, 428, 430, 432, 435, 438, 440, 442, etc. Time synchronization across nodes is particularly important as process control requires that certain information be sent and/or received at particular times or within particular timing windows in order to keep an industrial process stable and safe. For example, NTP (Network Time Protocol), PTP (Precision Time Protocol), and/or other suitable time-synchronization techniques may be utilized to synchronize clocks across the nodes of the nodal communication network 402.

Network Resource Management

While the nodal communication network 80 in the plant 100 is extremely flexible, in part because it uses an IP-based network, IP-based networks implemented in a process or factory automation control environment require consideration of factors that may be of concern in typical or traditional process or factory automation control networks. For example, the self-routing nature of IP-based networks means that without proper management, networks will behave differently and/or unpredictably under normal, overloaded, and failure scenarios. As an example, under high load and contention scenarios, IP-based networks can drop or delay packets. When packets are delayed or dropped, the performance of monitor and control applications will be adversely affected by the resultant latency and jitter. Therefore, when performing network design in a process or factory automation control network, it is important to know how applications (e.g., monitor and control applications, condition monitoring applications, etc.) will be affected under varying network conditions. Specifically, it is important to provide the required quality of service (QoS) to support both existing and emerging application requirements, while also supporting a combination of traditional field device 224, traditional I/O devices 222, and highly versatile field devices 82.

It is also important that the IP-based network be configurable to support a variety of topologies. For example, the nodal communication network 80 should support a traditional factory automation or process automation topology, such as those depicted in FIG. 3, that includes both highly versatile field devices 82 and traditional field devices 224 coupled to the APL network architecture 892 by adaptor devices 130. The communication network 80 should support an edge topology, such as that depicted in FIG. 4, that runs on top of or in parallel to the traditional factory or process automation topology, and supports plan information integration such as scheduling, asset monitoring, analytics, simulations, and other functions. That is, the communication network 80 should be configurable to facilitate communication between the highly versatile field devices 82 and/or the traditional field devices 224 (via the adaptor devices 130) on one side, and various applications, including cloud-based client applications 182, on the other hand, via one or more edge gateways 166, as described above. Still further, the communication network 80 should support a cloud topology, such as that depicted in FIG. 5, that may run in parallel with automation instrumentation, and may be used, for example, for condition-based monitoring (e.g., energy monitoring, equipment and device monitoring, and process monitoring). In such systems, as described above, the monitoring systems may transmit data from the plant 100 to one more cloud-based applications 182, which perform analysis and transmit data and/or recommendations back to users and/or to the elements in the process control network 200, such as the controllers 140.

The nodal communication network 80 should also be configurable to facilitate communication in both traditional networking environments, such as that depicted in FIG. 6, and in flattened networking environments, such as that depicted in FIG. 7. In a traditional networking environment, highly versatile field devices 82 and traditional field devices 224 (via adaptor devices 130) transmit, to controllers 140 or I/O devices 212, data for use by the controllers 140 and/or for use by other applications that may receive data forwarded by the controllers 140 or the I/O devices 212. In a flattened networking environment, each of the highly versatile field devices 82 and the traditional field devices 224 sends data directly to other devices (e.g., the controllers 140) and applications (e.g., operating on engineering stations 202, on application stations 204, on operator stations 206, or in the cloud 168) via the communication network 80.

Regardless of whether implemented in a traditional networking environment or a flatted networking environment, because some data flowing from the highly versatile field devices 82 and the traditional field devices 224 to the various applications and devices of the process control network 200 is more time-sensitive than other data, the communication network 80 must be configured to account for such time sensitivity. For instance, some control modules (i.e., control routines or portions of control routines) operating in controllers 140 may require certain data much more frequently than other control modules, and/or more frequently than condition monitoring applications that are not performing real-time control of the process. Accordingly, is important that the communication network 80, while supporting transmission of a variety of data types to and from a variety of devices and applications, prioritize time-critical and time-sensitive data over data that is less sensitive to latency.

As described above with reference to FIGS. 3-7, the communication network 80 is implemented as an IP-based network, using an APL network architecture 892 that includes APL power switches 84 and APL field switches 86 coupled by the APL bus 88 (e.g., Ethernet) to one another and to various highly versatile field devices 82, adaptor devices 130, controllers 140, workstations 206, 145, 202, 204, edge gateways 166, and/or the cloud 168 (e.g., via firewall devices 162). The APL power switches 84 and the APL field switches 86 facilitate communication of data to and from the field devices 82 and 224, and to and from various applications. In some embodiments, the APL power and field switches 84 and 86 may cooperate with various other switches (e.g., the L2 switch depicted in FIG. 3) to facilitate communication of data from a source to a destination.

As also described above, the communication network 80 supports both client/server and publish/subscribe communications, and enables Internet connectivity between open platform communications (OPC) unified architecture (UA) servers (e.g., field instrumentation) and OPC UA clients (e.g., controllers), in addition to facilitating communication between field instrumentation and applications, each of which may be a client or a server in various instances. The communication network 80 supports both user datagram protocol (UDP) and transmission control (TCP) communication modes. In a client/server communication session, directed communication occurs between a host and a single, specific device. The address of the source and destination devices is both specific and unambiguous, and all client/server requests specify both the request and the response data to be communicated. In publish/subscribe communications, meanwhile, new values (e.g., measurement values, condition values, etc.) are transmitted from the server (e.g., device) only as often as required. For example, with respect to parameters published from the highly versatile field device 82 to the controller 140, the parameters may be transmitted as often as required to allow control action to correct for unmeasured disturbances or response to setpoint changes.

The communication network 80 is configured to cooperate with the highly versatile field devices 82 to support a variety of use cases. Of course, a primary use case is that of control, allowing highly versatile field devices 82 and traditional field devices 224 to communicate (via the adaptor devices 130, in the latter case) with controllers 140 and/or with operator stations 206 to facilitate control of the process plant 100. While, in traditional process plant communication networks, field devices communicate only with respective controllers, and operator stations both receive necessary parameter data from controllers and send new set point data through controllers to field devices, the communication network 80 may be configured to facilitate communication directly between the operator stations 206 and the highly versatile field devices 82 and traditional field devices 224. Specifically, the communication network 80 is configurable to allow a particular field device to publish parameter data simultaneously to multiple consumers of that data. Thus, a valve may, for example, publish parameter data both to the controller 140 and to the operator station 206, which may conserve bandwidth by eliminating repetitive transmission of data. That is, a single transmission may communicate data to both the controller 140 and the operator station 206, rather than requiring a second transmission of the data from the controller 140 to the operator station 206, as is typical of traditional control networks.

The communication network 80 may also improve plant asset management (PAM), including configuration of devices. PAM systems are used to configure and provision devices, run diagnostics on devices once deployed, monitor device alerts, and other functions. For example, PAM systems may receive condition monitoring data from the field devices 82 and/or 224, to determine when a device is malfunctioning, in need of calibration, etc.

Industrial IoT (Internet of Things) platforms may also benefit from the implementation of the communication network 80 as described herein. An Industrial IoT platform for continuous condition monitoring may be deployed to monitor a wide variety of parameters within the process plant 100. Such systems may monitor functions such as energy consumption, equipment and device function/performance, and process performance, among other items. Such systems typically operate using as input a variety of parameters collected from an array of devices throughout the process plant 100. In traditional systems, Industrial IoT platforms that perform continuous monitoring receive data from field devices indirectly, via the controllers 140 and/or one or more other devices, such as the operator station 206 or the plant asset management device 145. However, in the systems described herein, these industrial IoT platforms may receive data directly from the devices that are the source of the data, without requiring programming of intermediary devices to relay the data, either by direct request or using publish/subscribe (i.e., by subscribing to the data).

Other processes may be similarly facilitated by the communication network 80 described herein. For example, data logging may be enabled by streamlining the collection of energy and monitoring data, metering may be enabled by streamlining the collection of data from intelligent meter-reading systems and transmission of the data to processing applications through, for instance, the edge gateway 166 and/or the cloud 168, and environmental monitoring may be enabled by streamlining collection of data from sensors that monitor NOx, SOx, and other emissions or potential emissions that must be monitored and reported for regulatory compliance.

As will be understood the implementation of both traditional monitor and control data and other, non-traditional data, such as that described in the use cases above, on the same network, can result in problems, such as latency and dropped packets, that are not present in the case of traditional control networks, which communicate data only between individual devices and controllers, and on which the transmission of such data is scheduled, requested specifically by the controller, or otherwise tightly controlled in order to ensure that high-priority, latency-sensitive data are received at the controller from the devices (or at the devices from the controller) in a timely manner. One challenge is accommodating on the same network both scheduled network traffic (e.g., monitor and control data transmitted between field devices and controllers) and unscheduled traffic (e.g., condition monitoring and other data transmitted between and among devices and applications).

Figure 14:
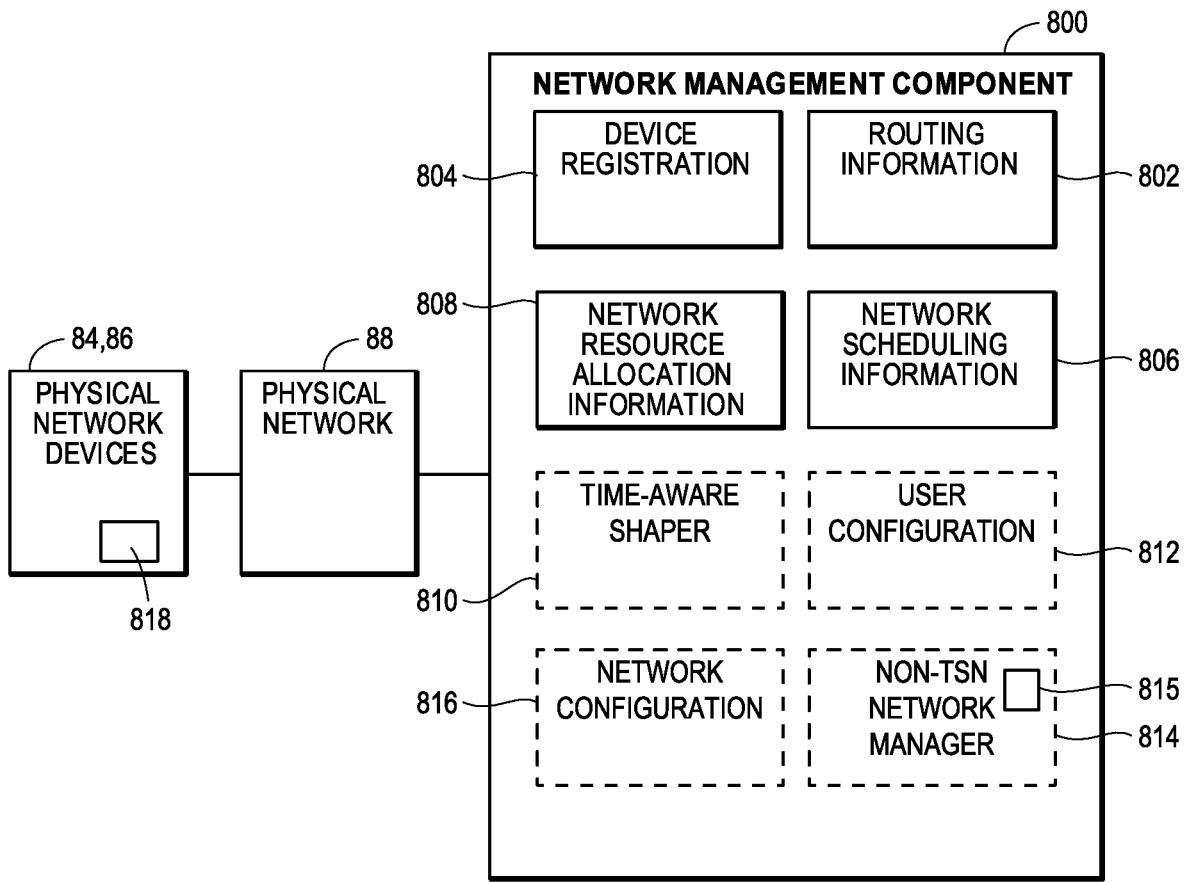
FIG. 14 depicts a block diagram of a network management component configurable to manage network traffic in the disclosed communication architecture.

In order to address and/or prevent such problems, the communication network 80 includes a network resource management component 800. With reference to FIG. 14, generally, the network resource management component 800 interacts with various physical network devices (e.g., with the APL power switches 84 and the APL field switches 86) via the physical network (e.g., APL bus 88) to manage network resources (e.g., bandwidth and scheduling), thereby facilitating communication of both managed network traffic (network traffic, such as scheduled network traffic, of which the network resource management component 800 is aware) and unmanaged network traffic (network traffic, such as unscheduled request-response network traffic, of which the network resource management component 800 is not aware). In various embodiments, the network resource management component 800 may be centralized in a particular device, such as the APL power switch 84, or may be distributed throughout the communication network 80 in various APL power switches 84 and APL field switches 86, in the controller 140, etc. That is, the network resource management component 800 may be a logical component embodied either in a specific physical component or distributed throughout a variety of physical components. For instance, the network resource management component 800 may be implemented in the I/O devices 212, in controllers 140, in switches, or as a separate hardware entity and, in fact, may be distributed among various hardware entities (e.g., multiple controllers 140 and/or multiple I/O devices 212, etc.).

By managing network resources to facilitate communication of both managed and unmanaged network traffic, the network resource management component 800 facilitates communication in a variety of modes between a variety of devices and applications, while ensuring that scheduled and/or high-priority network traffic reaches its destination without undue or unacceptable latency. This includes at least: network traffic between an highly versatile field device 82 and another highly versatile field device 82; network traffic between an highly versatile field device 82 and a controller 140; network traffic between an highly versatile field device 82 and multiple other highly versatile field devices 82; network traffic between an highly versatile field device 82 and one application operating on a workstation (on the process control network 80, through an edge gateway

166, a cloud-based application 182); network traffic between an highly versatile field device 82 and multiple applications operating on workstations.

The network resource management component 800 may be implemented as either using time-sensitive networking (TSN) or not using TSN. Each implementation will be described below.

TSN-Based Network Management

TSN-based network management requires management of TSN-based network resources (e.g., devices and applications) while simultaneously allowing non-TSN resources access to the same network. That is, TSN-based network management facilitates communication of both managed and unmanaged network traffic. As part of this networking scheme, TSN network devices and applications need to be aware of priorities, and network resources must be allocated in a manner that allows time-critical data to be transmitted with minimal blocking as the data are transferred from the source to the destination.

The TSN-based network resource management component 800 prioritizes data transmission according to rules and traffic types. In some implementations, for example, the priorities are assigned based on default traffic types generally associated with a TSN-based network, as depicted in Table 1.

TABLE 1

| Priority | Traffic Types |
|---|---|
| 0 (lowest) | Background |
| 1 | Best effort |
| 2 | Excellent effort |
| 3 | Critical applications |
| 4 | Video less than 100 ms latency and jitter |
| 5 | Voice less than 10 ms latency and jitter |
| 6 | Internetwork control |
| 7 (highest) | Network control |

However, when implemented in a factory automation or process control plant (e.g., the plant 100), the priorities need not be assigned based on the same types of traffic that may be present in an average network. Instead, and by way of example and without limitation, the priorities may be assigned based on the specific types of network traffic that may be present in the factory automation or process control environment. Table 2 is an example list of traffic types and priorities, though one can recognize that the traffic types associated with each of the priorities may be assigned according to the needs of the system operator.

| Priority | Traffic Types |
|---|---|
| 0 (lowest) | Background |
| 1 | Best effort |
| 2 | Excellent effort |
| 3 | Device Condition and Health monitoring |
| 4 | Low Priority Control (higher latency tolerance) |
| 5 | High Priority Control (lower latency tolerance) |
| 6 | Internetwork control |
| 7 (highest) | Network control |

With reference to table 2, some data used by a factory automation controller or a process controller may be more time-sensitive than other data. As a person familiar with such automation processes will appreciate, such data may be more time sensitive because the data are part of a control loop that executes frequently or in which small changes can very quickly have an outsize effect, or because the data are part of safety systems that must respond quickly to events in order to prevent or mitigate hazardous situations, for example. Other data used by the controller may be somewhat less sensitive to increased latency, for instance due to being part of control loops that execute less frequently, or with respect to processes that do not exhibit sudden changes in response to minor disturbances.

In any event, various types of data within the plant 100 may be assigned different priority levels within the TSN-based networking scheme implemented by the network resource management component 800. The prioritization of data according to the network scheme is executed in an outbound port 818 of a TSN-based device, such as the highly versatile field devices 82, the adaptor devices 130, the APL power switches 84, the APL field switches 86, etc. Of course, every TSN-based device sending data may have a corresponding outbound port 818.

Figure 15:
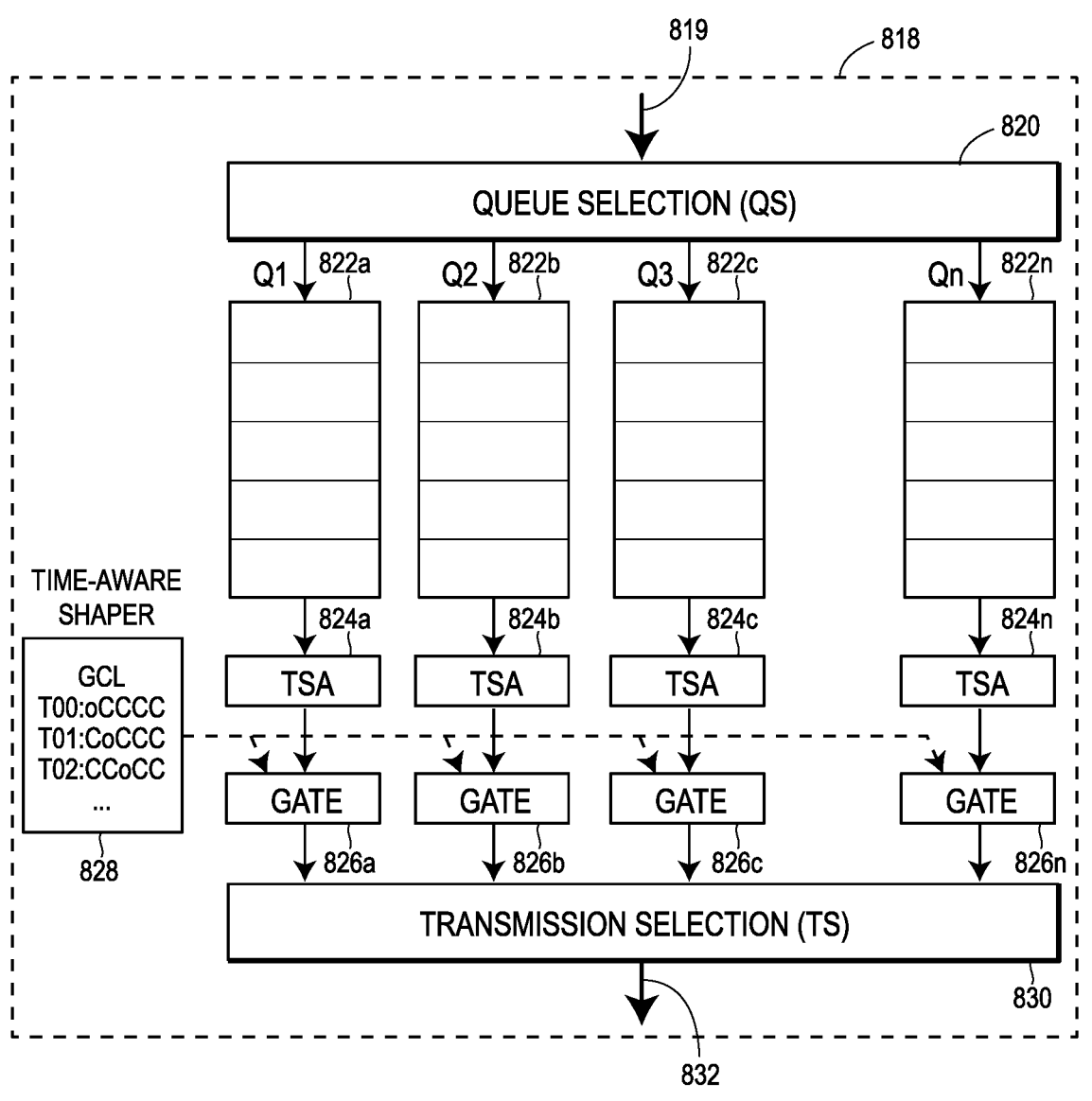
FIG. 15 depicts a block diagram of an example outbound port of a network device managed by the network management component of FIG. 14.

FIG. 15 depicts an example outbound port 818. Data enters the outbound port 818, via an input 819, and is placed by a queue selection unit 820 into one of a plurality of queues 822A-822N. The queue selection unit 820 may determine into which of the queues 822A-822N to place specific data based on the priority of the data and/or the type of data. In embodiments, each of the queues 822A-822N may correspond to a particular priority level, and each of priority level may be associated with one of the queues 822A-822N. In other embodiments, each of the queues 822A-822N may correspond to a particular priority level, but multiples ones of the queues 822A-822N may be associated with an associated one of the priority levels. That is, each priority level may be assigned a single one of the queues 822A-822N, or may be assigned multiple ones of the queues 822A-822N. In embodiments, each of the queues 822A-822N may have more than one priority level of data associated with it (e.g., if there are fewer queues than priorities or types of traffic). In embodiments, each of the queues 822A-822N may have data associated with a particular data source, data type, data destination, or data stream associated with it.

In any event, each of the queues 822A-822N has an associated transmission selection algorithm 824A-824N that operates to select which data to take from the corresponding queue 822A-822N. A plurality of gates 826A-826N, each associated with a corresponding one of the queues 822A-822N, determines whether the data selected by respective transmission selection algorithm 824A-824N can be transmitted. An open one of the gates 826A-826N allows data selected by the respective transmission selection algorithm 824A-824N to be transmitted from the respective one of the queues 822A-822N, while data is prevented from being transmitted when the various gates 826A-826N are closed. A gate control list 828 determines which of the plurality of gates 826A-826N are open at any given time. A transmission selection unit 830 selects which data provided and/or available from the open gates 826A-826N is transmitted from a data output 832, by selecting for transmission the highest priority frame available. As a result, of this arrangement, it is possible that even though the transmission selection algorithm 824A-824N determines in which order data will be transmitted from the respective queues 824A-824N, the gates 826A-826N may block the transmission to, in effect, give priority to data other than that having the highest assigned priority. The gates 826A-826N are therefore important in appropriately handling traffic to effect proper transmission of time-sensitive, scheduled traffic. As described, each of the gates 826A-826N may be either opened or closed. Multiple ones of the gates 826A-826N may be opened (or closed) at any given instant.

Of course, controlling the gates 826A-826N to ensure the highly predictable delivery of data in a real-time system, while accounting through latency and jitter during transmission through various switches between devices requires knowledge of the network topology, knowledge of the devices and applications sending and receiving data, knowledge of the timing requirements for the data, and knowledge, to the extent possible, of what traffic may not be scheduled traffic, but may nevertheless occur on the network.

To this end, the network resource management component 800 may include a routing information component 802 that determines and/or stores information about the network topology and the routing of data from one point to any other point in the network. For example, the routing information component 802 may store data indicating that a particular network switch (e.g., one of the APL field switches 86) is connected to particular upstream devices (e.g., a particular APL power switch 84) and downstream devices (e.g., highly versatile field devices 82). By having "knowledge" of the network topology, routing information component 802 allows the network resource management component 818 to estimate the network latency between any two devices and/or applications sending traffic over the network, and can predictably schedule recurring traffic.

Key to mapping the network topology is an understanding of which devices are present on the communication network 80. A device registration component 804 may implement this function, as described above with respect to device discovery. By implementing the device registration component 804, all discovered devices are known by the network resource management component 800, which may also implement the DHCP server and/or the DNS server for registering devices.

The network resource management component 800 may have routines or data for acquiring and/or storing network scheduling information 806 that may be received from, or be programmed by, the controllers 140 and/or various ones of the workstations, regarding the timing requirements of various data that will be transmitted over the communication network 80. In embodiments, some of the network scheduling information 806 is acquired directly from configuration files that program the controllers 140 (e.g., from control loop timing requirements specified in the configuration files). In embodiments, some of the network scheduling information 806 is determined according to publish-subscribe requests established between particular devices, as described herein. That is, as each publishing device (e.g., highly versatile field device 82) establishes a subscription with another device or application, it may update the network scheduling information 806 so that the network resource management component 800 may appropriately allocate network resources.

Network resource allocation information 808 may store the various data associated with allocation of network resources, and may include information such as the association between types of data and assigned priority levels, as well as particular time slots that are reserved for particular data priorities, specific scheduled data transmissions, etc., and including allocation of bandwidth for unscheduled traffic (e.g., request-response traffic).

A time aware shaper 810 may utilize the network resource allocation information 808, the routing information 802, and the network scheduling information 806 to set and synchronize the gate control lists 828 to meet the real-time requirements of the communication network 80 and the various devices and applications thereon. Because, in the plant 100, control data are often transmitted on a repeating time schedule, it is possible to have knowledge of when a particular transmission will occur. As should be understood, however, prioritization of data does not, by itself, guarantee that the data can be transmitted at the right time because other lower priority data may already be in transit over the communication network 80 at the time that the scheduled data is ready for transmission. If the lower priority transmission already in progress is large, it will have to finish before anything else can be transmitted, delaying the scheduled data.

This is where the gate control list 828 comes into the picture. Each gate control list 828 establishes or effects a repetitive pattern of open and closed gates in its associated outbound port 818. By synchronizing the gate control lists 828 of each outbound port 818, and programming them accordingly, clear transmission paths may be created for scheduled data at the proper times. That is, each of the outbound ports 818 must have a synchronized clock such that the gates 826A-826N for each of the outbound ports 818 may be opened and/or closed at precisely the right time to facilitate ultra-low latency data transmission. In embodiments, a TSN-based network resource management component 800 uses precision time protocol (PTP) to synchronize the clocks associated with the various outbound ports 818. The time-aware shaper 810 may manage the gate control lists 828A-828N to precisely time the opening and closing of the gates 826A-826N in each of the outbound ports 818, taking into consideration the network topology, routing information for each scheduled transmission, latencies created as data traverse various switches, network scheduling information, and network resource allocation information such that appropriate ones of the gates 826A-826N are opened and closed at precisely the right times and intervals.

Figure 16:
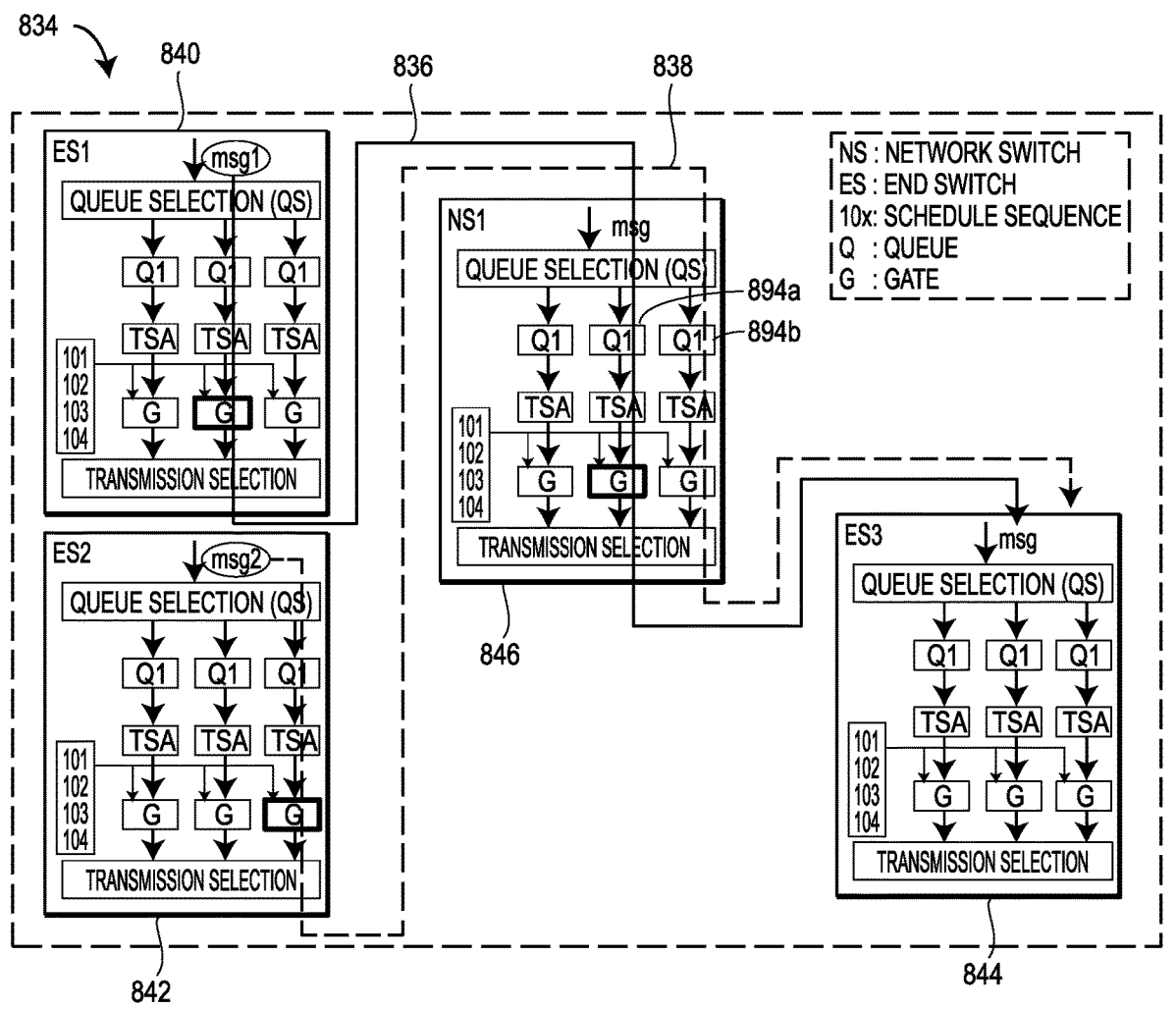
FIG. 16 is a diagram of two example data flows through a network controlled managed by the network management component of FIG. 14.

FIG. 16 is a diagram of an example data flow 834 illustrating this concept. In the example data flow 834, two different endpoint systems 840 and 842 send respective data frames 836 and 838 through a network switch 846 to a third endpoint system 844. Each of the endpoint systems 840, 842, 844 may be a device or application in the plant 100. By way of example, and without limitation, the endpoint systems 840 and 842 may each be highly versatile field devices 82 sending parameter data to the endpoint system 844, which may be the controller 140. In another example, the endpoint systems 840 and 842 may each be highly versatile field devices 82 sending health status data to the endpoint system 844, which may be a plant asset management device 145, on which an asset management system (AMS) is executing. In general, each of the endpoint systems 840, 842, 844 may be any device communicating over the nodal communication network 80, and may include devices for which the data frames 836 and 838 is scheduled traffic or unscheduled traffic, transmitted according to publish-subscribe protocols, request-response protocols, or based on some other criteria.

In the example data flow 834, the two data frames 836 and 838 are transmitted at the same time from their respective endpoint systems 840 and 842 to the endpoint system 844. Between the respective endpoint systems 840 and 842 and the endpoint system 844, each data frame passes through the network switch 846. Each of the endpoint systems 840, 842, 844 and the network switch 846 is depicted in the example data flow 834 as an outbound port 818 having the corresponding elements thereof. Of course, it should be understood that devices and systems described herein, including the highly versatile field devices 82, the APL power switches 84, the APL field switches 86, and other devices may each have multiple outbound ports 818. Turning back to FIG. 16, when both of the data frames 836 and 838 arrive at the network switch 846, both data frames 836 and 838 are put into corresponding queues 894A and 894B of the network switch 846 considered arriving at the same time. When the data frames 836 and 838 are transmitted from the network switch 846, the data frame 836 will be transmitted before the data frame 838, because the data frame 836 has a higher priority than the data frame 838.

As the data frames 836 and 838 arrive at the input 819 of the outbound port 818 of the network switch 846, the queue selection unit 820 analyzes the data frames 836 and 838 to determine the priority level of each, or the data type of each. The queue selection unit 820 places the data from the respective data frames 836 and 838 into the respective queues 894A and 894B. The transmission select algorithm 824 may select for transmission the data from each of the data frames 836 and 838 and, assuming that both of the transmission gates 826 for the respective queues 894A and 894B are open, the transmission selection routine 830 may select the highest priority data—the data from data frame 836—for transmission before selecting the data from data frame 838 for transmission.

Modifying this example slightly, if the data frames 836 and 838 each have the same priority, or if the data frame 836 has a lower priority than the data frame 838, the network resource management component 800 may nevertheless facilitate earlier arrival of the data frame 836 than of the data frame 838, for example, if the data frame 836 is scheduled network traffic while the data frame 838 is unscheduled network traffic. For example, it is possible that the data frame 836, while lower priority, contains data from a highly versatile field device 104 that is expected at a particular time by the controller 140. In this case, the network resource management component 800 may configure the communication network 80 such that the data frame 836 arrives at the endpoint system 844 (e.g., the controller 140) before the higher priority data frame 838. The network resource management component 800 may, via the time aware shaper 810, configure the gate control lists 828 of the various outbound ports 818 such that a clear data transmission path is created for the data frame 836, while one or more of the transmission gates 826 along the data path for data frame 838 (e.g., the transmission gate 826 corresponding to the queue 894B in the network switch 846) remains closed to block the transmission of the data frame 838 until the transmission of the data frame 836 is completed.

As will be understood, a network configuration component (NCC) 816 of the network resource management component 800 may discover devices (e.g., in cooperation with the device registration component 804) and determine the topology of the communication network 80. The NCC 816 may be centralized or distributed. In any event, the NCC may receive a request to discover the physical topology of the communication network 80 (or a portion thereof) and, in response, may traverse the topology of the network to discover each device and how that device is connected to the network 80. Alternatively, or in addition, the NCC 816 may cooperate with the device registration component 804 to determine the connection of each new device that registers via the device registration component 804 and thereby determine the topology of the network 80.

The NCC 816 may also be responsible for managing the switches and routers (e.g., the APL power switches 84, the APL field switches 86, etc.) in the communication network 80. The NCC 816 may be integrated with and/or may cooperate with the time-aware shaper 810 to, for example, configure the gate control lists 828 of the various outbound ports 818. The NCC 816 is also responsible for determining routes between the devices and applications operating on the network 80 (e.g., determining the routing information 802), and for using the routing information 802 and the network scheduling information 806 and network resource allocation information 808 to configure the switches and routers in its purview.

A user configuration component (UCC) 812 may be responsible for managing the various end stations (e.g., highly versatile field devices 82, adaptor devices 130, work-stations and applications, etc.). The UCC 812 requests scheduled flows of network traffic by making requests to the NCC 816. The requests provide specific requirements for those scheduled flows of network traffic by specifying the endpoint devices for each flow (sender and receiver(s)) and the specific timing requirements (e.g., how frequently the flow occurs, the size of the data payload, and how time-sensitive the data payload is, sequence order, etc.).

The NCC 816 may communicate with the UCC 812 to receive the communications requirements of the various traffic flows that will be present on the network 80, to determine a route for each traffic flow, and to schedule transmission of each traffic flow. The scheduling of the transmission of each traffic flow may include the use of the time-aware shaper 810 to create and manage the gate control lists 828 for each of the switches and routers controlled by the NCC 816. The NCC 816 then communicates the necessary scheduling data to each of the switches and routers it controls.

Non-TSN-Based Network Management

In embodiments in which the network resource management component 800 is not based on time-sensitive networking (TSN) protocols, it is possible to manage network traffic by controlling traffic flow through the network switches (e.g., the APL power switches 84 and APL field switches 86). The network resource management component 800 in a non-deterministic (i.e., non-TSN based) system includes a network manager 814. The network manager 814 monitors and adjusts network traffic flow among the various devices in the network 80, in particular, in the network switches. Devices and hosts communicate with the network manager 814 to allocate traffic, by requesting publish-subscribe traffic flows, for example. The network manager 814 would then control traffic through switches by enabling and disabling various ports of the switches and by throttling network traffic through the ports. In such an embodiment, the network traffic may be identified, for example, by traffic source (i.e., sender), destination(s) (i.e., receiver(s)), and application type.

The network manager 814 maintains a flexible runtime model 815 of the devices on the communication network 80. The network manager 814 uses the flexible runtime model 815 of the network, which may be stored as routing information 802 and device registration information 804, for example, to allocate network resource usage. The network resource allocation may be stored, for example, in the network resource allocation information 808. The network manager 814 may cooperate with the device registration 804 such that when devices join the network 80, the network manager 814 is part of the join process, and such that the network manager 814 uses its flexible runtime model 815 of the network 80 along with algorithms to optimize the traffic flow over the network. Once the network resources have been allocated (and information regarding the allocation stored, for example, in the network resource allocation information 808), the network manager 814 may use the information to manage the switches.

At some time after each of the devices joins the network 80, the various devices make requests to the network manager 814 to negotiate bandwidth. For example, the devices may negotiate with the network manager 814 for publish-subscribe bandwidth between particular devices (e.g., between one of the highly versatile field devices 82 and the controller 140, or between one of the highly versatile field devices 82 and the controller 140 and the operator station 206). If the network manager 814 approves the request, then the device may commence publishing data to hosts that are subscribed to the data.

The network manager 814 may allocate a particular portion or percentage of bandwidth on the network 80 for unmanaged traffic, such as network traffic from non-scheduled communications (e.g., ad hoc request-response communications), which is considered "best effort" traffic. The network manager 814 may monitor the traffic flow over the network 80 and may adjust the switches as the percentage of unmanaged traffic exceeds the allocated amount.

In any of the embodiments described herein, the network resource management component 800 supports both managed an unmanaged network traffic on the network 80, and supports publish-subscribe in both directions on the network 80 (i.e., from field devices to controllers/applications and from controllers/applications to field devices). Security and plug and play operations may be similarly supported, as described above. Peer-to-peer network traffic may be supported as well. The network resource management component 800 also facilitates devices that are both publishers of data and subscribers of data in the same device.

Publish Suites

In part because the nodal communication network 80 supports both publish-subscribe and request-response traffic between any devices on the communication network 80, and in part because each of the highly versatile field devices 82 and adaptor devices 130 can publish data to and subscribe to data from multiple devices, the highly versatile field devices 82 and nodal communication network 80 support a wide range of use cases, including monitor and control, plant asset management, condition monitoring, data logging, secure plant metering, environmental monitoring, etc., as described above. As also described above, any particular highly versatile field device 82 or adaptor device 130 may connect to more than one application type. For example, one of the highly versatile field devices 82 could support secure connections for monitor and control as well as condition monitoring, and the connections may be completely separate and support different workloads, with the separate applications each subscribing to different sets of data that are available from the highly versatile field device 82 and, therefore, the published list of parameters sent from the highly versatile field device 82 to each respective application will be different. As a result of these new capabilities in the devices and applications, it becomes desirable to simplify the publish-subscribe initiation protocol.

As will be understood, each device or application may have a variety of parameters or other data that are available to be published to other devices or applications on the communication network 80. By way of example, a valve may have both monitor and control parameters (e.g., current set point, valve temperature, etc.) and condition monitoring parameters (e.g., valve travel, valve drive, valve pressure, cycle count, etc.). Different types of available parameters may be of interest to different applications in the process plant 100. For instance, the monitor and control parameters may be required for the associated controller 140 to implement the control loops that control the process, while the condition monitoring parameters may be required by the plant asset management device 145 to monitor the condition of the device in the process plant 100 and to determine when maintenance is required, when a device is failing, when a device is out of calibration, and the like.

Figure 17:
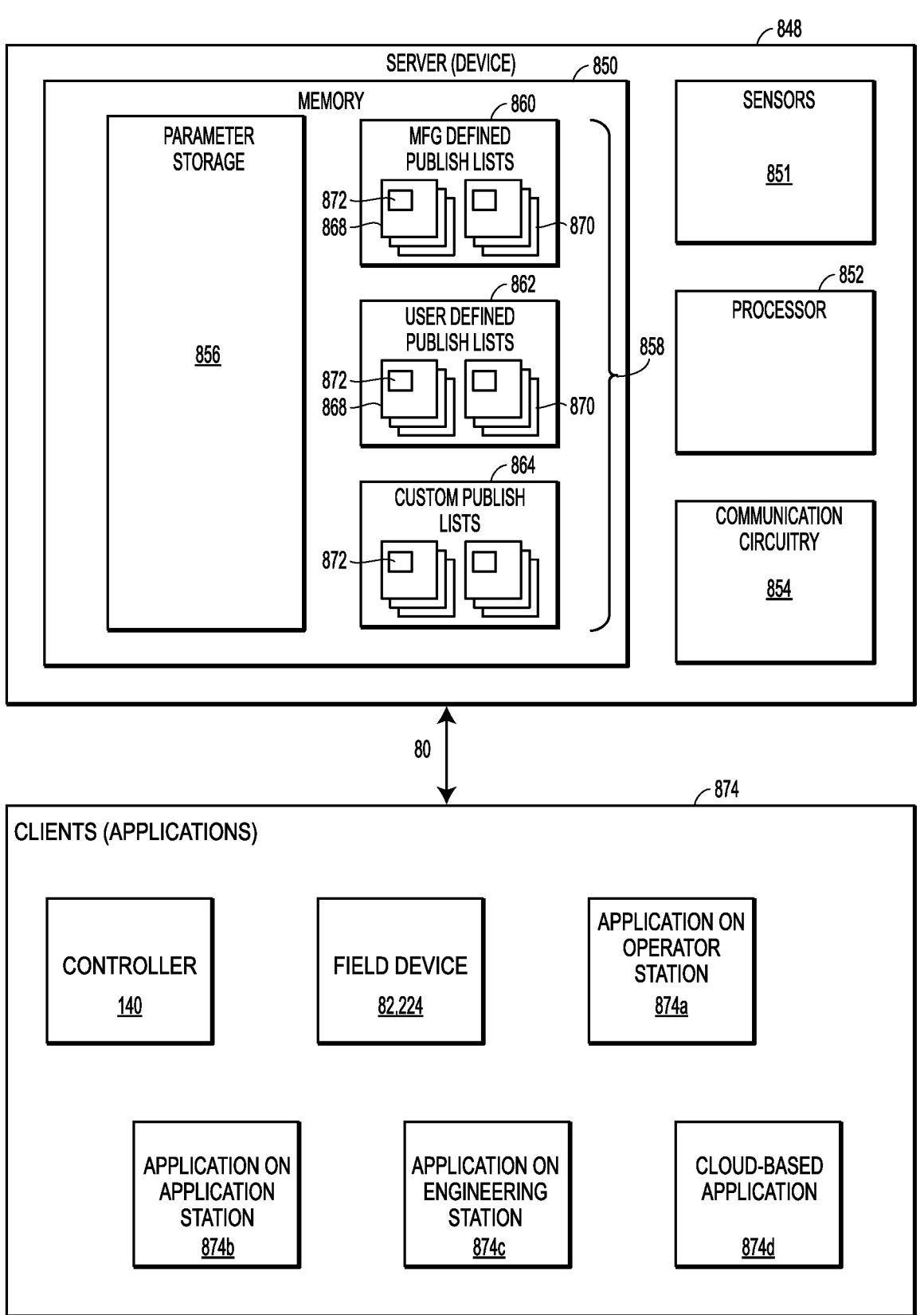
FIG. 17 depicts a block diagram of illustrating various components of a publish-subscribe communication architecture.

To that end, devices (and possibly applications) operating on the communication network 80 may have pre-defined lists of parameters and other data that are available for subscription. FIG. 17 illustrates an exemplary server 848 (e.g., a highly versatile field device 82, an application, a controller 140, etc.) and an exemplary application 874 (e.g., another highly versatile field device 82, a controller 140, or another application). While the FIG. 17 illustrates the server as an highly versatile field device and, as a result, depicts various elements that may not be present in a controller (e.g., the sensors) or in an application (e.g., the sensors, the communication circuitry, etc.), the general concepts illustrated in FIG. 17 relate to the set of publish lists 858 that are stored in the server 848. Turning to FIG. 17 specifically, the server 848 (e.g., a highly versatile field device 82) includes one or more sensors 851 (e.g., temperature sensors, position sensors, pressure sensors, flow sensors, etc.). The sensors 851 send data to a processor 852 that may monitor the data from the sensors, store data from the sensors, execute process control modules to implement a portion of a control strategy, and/or transmit the data to one or more other devices (e.g., controllers) or applications. The server 848 includes communication circuitry 854 to facilitate communication with various devices and applications via the communication network 80. The server 848 also includes a memory device 850 that may include parameter storage 856 for storing various parameters of the server 848 (e.g., data from the sensors, publish subscriptions, etc.). The server 848 also includes in the memory 850 a variety of publish lists 858, at least some of which are pre-defined and determined by the device or application manufacturer.

Thus, the memory 850 of the server 848 includes one or more manufacturer-defined publish lists 860. Each of the manufacturer-defined publish lists 860 may include parameters that are typically transmitted from the server 848 for a particular application. For example, a first one of the manufacturer-defined publish lists 860 may include device parameters related to control of the process. If the server 848 is a valve, the manufacturer-defined publish list 860 may be a monitor and control publish list 868, and may include the valve set point, the valve temperature, and the upstream and downstream flow rates and/or pressures. If the server 848 is a level transmitter, the monitor and control publish list 868 may include the level. Meanwhile, a second one of the manufacturer-defined publish lists 860 may be a condition monitoring publish list 870 that includes device parameters related to monitoring the condition of the device itself. For example, if the server 848 is a valve, the manufacturer-defined condition monitoring publish list 870 may include parameters such as valve travel, valve drive, valve pressure, cycle count, etc.

The server 848 includes at least one pre-defined publish list 858, defined by the manufacturer as a manufacturer-defined publish list 860. In embodiments, the manufacturer-defined publish lists 860 include a plurality of publish lists. In embodiments, at least one of the manufacturer-defined publish lists 860 is a monitor and control publish list 868. In embodiments, at least one of the manufacturer-defined publish lists 860 is a condition monitoring publish list 870. In embodiments, the manufacturer-defined publish lists include both a monitor and control publish list 868 and a condition monitoring publish list 870 and, in fact, may include multiple monitor and control publish lists 868 and/or multiple condition monitoring publish lists 870. In some embodiments, the manufacturer-defined publish lists 860 may also include one or more publish lists defined for applications other than monitor and control or condition monitoring.

The server 848 may also store in memory 850 one or more user-defined publish lists 862. The user-defined publish lists 862 may be defined, for example, by a particular plant operator operating, for example, a single plant 100 or multiple plants 100, and may be defined for use at a single plant 100 or across multiple plants 100. Like the manufacturer-defined publish lists 860, the user-defined publish lists 862 may include zero, one, or more each of monitor and control publish lists 868, condition monitoring publish lists 870, and publish lists for applications other than monitor and control or condition monitoring.

Still further, the server 848 may store in memory 850 one or more custom publish lists 864. The custom publish lists 864 may be defined, for example, for a particular device or application or a particular group of devices or applications in the plant 100. For instance, a controller 140 may subscribe to a manufacturer-defined publish list 860 or a user-defined publish list 862 for a particular type of device (e.g., a particular valve type) in most cases in an associated process control network 200, but may require (or not require) one or more specific parameters for a group of the devices (e.g., of the same particular valve type) with the process control network 200. Accordingly, a custom publish list 864 may be defined for that group of the devices. Like the manufacturer-defined publish lists 860 and the user-defined publish lists 862, the custom publish lists 864 may include zero, one, or more each of monitor and control publish lists 868, condition monitoring publish lists 870, and publish lists for applications other than monitor and control or condition monitoring.

In embodiments, each of the publish lists 858 includes associated publish list metadata 872. The publish list metadata 872 include, for example, one or more of a device type code, a device type string, a manufacturer code, a manufacturer string, a device revision, a publish list category (e.g., control, condition monitoring, etc.), a publish list name (e.g., "MfgControlList"), and a list of parameters included in the publish list. In such embodiments, the metadata 872 may be transmitted by the server 848 to a client 874 requesting to subscribe to data from the server 848, as described in greater detail below.

As described throughout, the clients 874 may be highly versatile field devices 82, adaptor devices 130, or application on the communication network 80 that subscribes to a published source of data. For instance, the clients 874 may be the controller 862, another highly versatile field device 82 or adaptor device 130, an application 874A on the operator station 206, an application 874B on the application station 204, an application 874C on the engineering station 202, a cloud-based application 874D, an application accessing the communication network 80 through the edge gateway 166, etc.

Each of the publish lists 858 may be defined to have information about the device type, manufacturer, and device revision; information about the device address, tag, publish list category, publish list name, version; and information about the parameters that are part of the publish list. For instance, published data for a typical monitor and control publish list 868 might look like:

```
[
  {
    "ExpandedDeviceTypeCode" : 4875,
    "ExpandedDeviceTypeString" : "DVC6000 HW2",
    "ManufacturerCode" : 19,
    "ManufacturerString" : "Fisher Controls",
    "DeviceRevision" : 2,
    "publishedData": [
      {
        "deviceAddr": "0x0000000020",
        "deviceTag": "FC-101",
        "publishCategory": "Control",
        "publishList": "MfgsControlList",
        "version": "1",
        "response": "Success",
        "fieldDeviceStatus": 0,
        "parameters": [
          {
          "deviceVariableCode": "PV",
          "deviceVariableClassification": 0,
          "valueType": "float",
          "value": 7.05,
          "status": "Good-NotLimited",
          "units": "",
          "timestamp": "2020-05-01T14:33:02"
          },
          {
          "deviceVariableCode": "SV",
          "deviceVariableClassification": 0,
          "valueType": "float",
          "value": 24.25601,
          "status": "Good-NotLimited",
          "units": "",
          "timestamp": "2020-05-01T14:33:02"
          }
        ]
      }
    ]
  }
]
```

While published data for a typical condition monitoring publish list 870 might look like:

```
[
  {
    "ExpandedDeviceTypeCode" : 4875,
    "ExpandedDeviceTypeString" : "DVC6000 HW2",
    "ManufacturerCode" : 19,
    "ManufacturerString" : "Fisher Controls",
    "DeviceRevision" : 2,
    "publishedData": [
      {
        "deviceAddr": "0x0000000020",
        "deviceTag": "FC-101",
        "publishCategory": "ConditionMonitoring",
        "publishList": "MfgsConditionMonitoringList",
        "version": "1",
        "response": "Success",
        "fieldDeviceStatus": 0,
        "parameters": [
          {
          "deviceVariableCode": "Travel",
          "deviceVariableClassification": 0,
          "valueType": "float",
          "value": 50.1464844,
          "status": "Good-NotLimited",
          "units": "",
          "timestamp": "2020-05-01T14:33:02"
          },
          {
          "deviceVariableCode": "Drive",
          "deviceVariableClassification": 0,
          "valueType": "float",
```

-continued

```
        "value": 75.31738,
        "status": "Good-NotLimited",
        "units": "",
        "timestamp": "2020-05-01T14:33:02"
    },
    {
    "deviceVariableCode": "PressureA",
    "deviceVariableClassification": 0,
    "valueType": "float",
    "value": 21.03125,
    "status": "Good-NotLimited",
    "units": "",
    "timestamp": "2020-05-01T14:33:02"
        },
        {
            "deviceVariableCode": "PressureB",
            "deviceVariableClassification": 0,
            "valueType": "float",
            "value": -0.097656,
            "status": "Good-NotLimited",
            "units": "",
            "timestamp": "2020-05-01T14:33:02"
        },
        {
            "deviceVariableCode": "CycleCount",
            "deviceVariableClassification": 0,
            "valueType": "float",
            "value": 3439080.0,
            "status": "Good-NotLimited",
            "units": "",
            "timestamp": "2020-05-01T14:33:02"
        }
    ]
    }
    ]
    }
]
```

The publish lists 858 may be defined in a similar manner, including information about the device, information about the type of publish list, and the various parameters of the publish list 858. The publish lists may be defined individually or group-wise. The example below shows how the two publish list outputs above may be defined group-wise:

```
[
    {
        "ExpandedDeviceTypeCode" : 4875,
        "ExpandedDeviceTypeString" : "DVC6000 HW2",
        "ManufacturerCode" : 19,
        "ManufacturerString" : "Fisher Controls",
        "DeviceRevision" : 2,
        "publishLists": [
            {
            "publishCategory": "Control",
            "publishList": "MfgsControlList",
            "version": "1",
            "parameters": [
                {
                "deviceVariableCode": "PV",
                "deviceVariableClassification": 0,
                "valueType": "float",
                "value": 0.0,
                "status": "",
                "units": ",
                "timestamp": "",
                },
                {
                "deviceVariableCode": "SV",
                "deviceVariableClassification": 0,
                "valueType": "float",
                "value": 0.0,
                "status": "",
                "units": "",
                "timestamp": "",
                }
```

-continued

```
    ]
    },
    {
        "publishCategory": "ConditionMonitoring",
        "publishList": "MfgsConditionMonitoringList",
        "version": "1",
        "parameters": [
            {
            "deviceVariableCode": "Travel",
            "deviceVariableClassification": 0,
            "value Type": "float",
            "value": 0.0,
            "status": "",
            "units": "",
            "timestamp": "",
            },
            {
            "deviceVariableCode": "Drive",
            "deviceVariableClassification": 0,
            "valueType": "float",
            "value": 0.0,
            "status": "",
            "units": "",
            "timestamp": "2020-05-01T14:33:02"
            },
            {
            "deviceVariableCode": "PressureA",
            "deviceVariableClassification": 0,
            "valueType": "float",
            "value": 0.0,
            "status": "",
            "units": "",
            "timestamp": ""
            },
            {
            "deviceVariableCode": "CycleCount",
            "deviceVariableClassification": 0,
            "valueType": "float",
            "value": 0.0,
            "status": "",
            "units": "",
            "timestamp": ""
            }
        ]
        }
    ]
    }
    }
]
```

Figure 18:
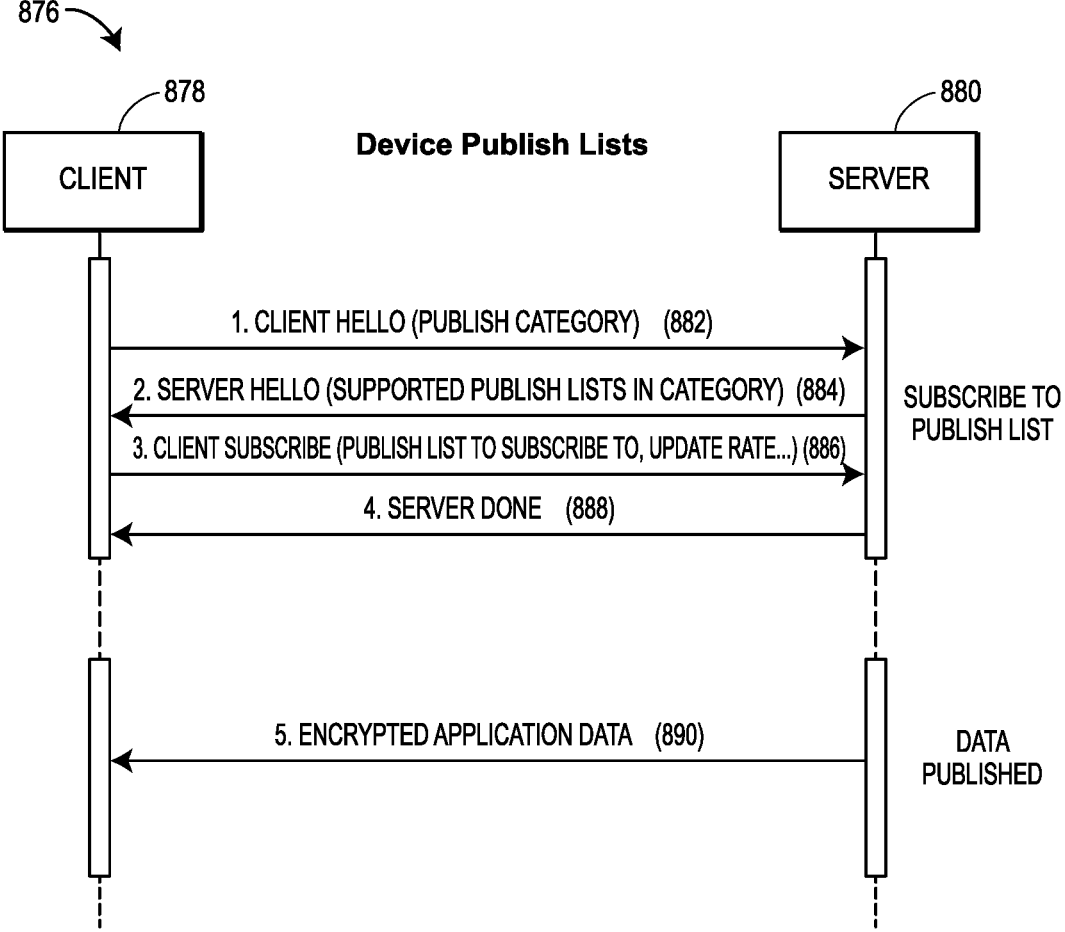
FIG. 18 depicts an example communication flow diagram employed by the publish-subscribe communication architecture of FIG. 17.

When a client 874 wants to subscribe to a server 848, the client discovers and selects a particular one of the available publish lists 858 for the server during the initial handshake between the client 874 and the server 848. FIG. 18 depicts an example communication flow diagram 876 of an initial handshake interaction between a client 878 and a server 880. The client 878 initiates a publish-subscribe session by sending an initial "hello" message 882 to the server 880. In embodiments, the initial "hello message" includes an indication of a publish list category (e.g., monitor and control, condition monitoring, etc.). In response to the initial "hello" message 882, the server 880 responds with its own "hello" message 884. In embodiments, the server's "hello" message 884 includes an indication of the publish lists 858 in the category indicated by the client 878. In some embodiments the indication of the publish lists 858 sent by the server 880 includes the metadata 872 for each of the publish lists 858 in the category indicated by the client 878, while in other embodiments, the indication of the publish lists 858 sent by the server 880 includes the publish list definitions for the publish lists 858 in the category indicated by the client 878.

While depicted in FIG. 18 as occurring over two messages 882 and 884, the initial exchange of messages may occur over more than two messages, in alternative embodiments. For example, while perhaps less efficient, the client 878 could send a "hello" message to the server 880, in response to which the server 880 could acknowledge its presence with its own "hello" message. The client 878 could respond to the acknowledgement sent by the server 880 by sending a request for publish lists in a particular publish list category. In response to that request, the server 880 could send the indication of the publish lists 858 that are available in the specified publish list category. Of course, other communication arrangements are similarly possible and contemplated.

In response to the indication from the server 880 indicating the available publish lists 858 in the publish list category indicated by the client 878, the client 878 may send a message 886 back to the server 880 requesting a particular one of the indicated publish lists. In embodiments, the client 878 may include in that message a requested update rate, indicating how frequently the client 878 would like to receive updated values for the parameters of the selected publish list. In some embodiments, the definition of the publish list 858 may include a default update rate and the server 880 may publish the parameters of the selected publish list at the default update rate unless the client 878 specifies an update rate different from the default update rate. In response to the message 886, the server 880 may send a message 888 acknowledging the request for the selected publish list 858 and confirming the active subscription to the selected publish list. Thereafter, the server 880 may publish encrypted data 890 to the client 878, the data corresponding to the subscribed publish list and transmitted at the agreed-upon update rate.

When implemented in software, any of the applications, modules, etc. described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

What is claimed:

1. A method comprising:

receiving at a field device, from a first client device or application, during run-time operations of a process plant, a message indicating a selection of a first one of a plurality of publish categories, the first one of the plurality of publish categories corresponding to a type of information desired by the first client device or application;

transmitting, from the field device to the first client device or application, an identification of each of a plurality of publish lists that are pre-defined and stored on the field device prior to receiving the message from the first client device or application, corresponding to the first one of the plurality of publish categories, the plurality of publish lists stored on the field device and each publish list comprising a particular set of parameters associated with the field device;

receiving at the field device, from the first client device or application, a selection of a first one of the plurality of publish lists identified by the field device; and transmitting, from the field device to the first client device or application, the particular set of parameters associated with the first one of the plurality of publish lists.

2. The method according to claim 1, wherein the field device is a process control field device and wherein the first client device or application is a process controller.

3. The method according to claim 1, wherein the field device is a robotic factory automation device and wherein the first client device or application is a factory automation controller.

4. The method according to claim 1, wherein the first client device or application is an application executing on a processor communicating with the field device through an edge gateway.

5. The method according to claim 1, wherein the first client device or application is an application executing on a cloud-computing platform.

6. The method according to claim 1, wherein the first client device or application is another field device.

7. The method according to claim 1, wherein receiving the message indicating the selection of the first one of the plurality of publish categories comprises receiving a message specifying a monitor and control category.

8. The method according to claim 1, wherein receiving the message indicating the selection of the first one of the plurality of publish categories comprises receiving a message specifying a condition monitoring category.

9. The method according to claim 1, wherein transmitting the identification of each of the plurality of publish lists comprises transmitting an identification of one or more manufacturer-defined publish lists, each of the one or more manufacturer-defined publish lists stored on the field device at the time of the field device's manufacture.

10. The method according to claim 1, wherein transmitting the identification of each of the plurality of publish lists comprises transmitting an identification of one or more user defined publish lists.

11. The method according to claim 1, wherein transmitting the identification of each of the plurality of publish lists comprises transmitting an identification of one or more custom publish lists.

12. The method according to claim 1, further comprising:

receiving, at the field device, from a second client device or a second application, a second message indicating a selection of a second one of the plurality of publish categories;

transmitting, from the field device to the second client device or the second application, an identification of each of a second plurality of publish lists corresponding to the second one of the plurality of publish categories received from the second client device or the second application;

receiving at the field device, from the second client device or the second application, a selection of a one of the second plurality of publish lists identified by the field device;

transmitting, from the field device to the second client device or the second application, the particular set of parameters associated with the selection of the one of the second plurality of publish lists received from the second client device or the second application.

13. The method according to claim 12, wherein the second message from the second client device or the second application indicating the selection of the second one of the plurality of publish categories is a message indicating a selection of a different one of the plurality of publish categories from the first one of the plurality of publish categories.

14. The method according to claim 12, wherein receiving from the second client device or the second application the selection of the one of the second plurality of publish lists identified by the field device comprises receiving a selection of a different one of the plurality of publish lists from the first one of the plurality of publish lists.

15. The method according to claim 12, wherein:

receiving from the first client device or application the selection of the first one of the plurality of publish lists further comprises receiving an update rate specifying a frequency with which the particular set of parameters associated with the first one of the plurality of publish lists will be transmitted from the field device to the first client device or application, and/or receiving from the second client device or the second application the selection of the one of the second plurality of publish lists identified by the field device comprises receiving a second update rate specifying a second frequency with which the particular set of parameters associated with the one of the second plurality of publish lists will be transmitted from the field device to the second client device or the second application.

16. The method according to claim 1, wherein each of the publish lists includes an update rate parameter specifying a frequency with which the particular set of parameters associated with a corresponding publish list will be transmitted from the field device to the client device or application subscribed to the corresponding publish list.

17. A field device comprising:

a processor; and a memory device, coupled to the processor, the memory device storing (I) a plurality of pre-defined publish lists, each pre-defined publish list corresponding to one of at least two available publish categories, each pre-defined publish list comprising a particular set of parameters associated with the field device, and (ii) a set of instructions executable by the processor to cause the processor to:

receive, from a client device or application, during run-time operations of a process plant, a message indicating a one of the at least two available publish categories, the one publish category indicating a category of information desired by the client device or application;

transmit, to the client device or application, an identification of each of the plurality of pre-defined publish lists that are stored in the memory device prior to receiving the message from the client device or application, corresponding to the indicated publish category;

receive, from the client device or application, a selection of one of the plurality of pre-defined publish lists identified by the field device; and transmit, to the client device or application, the particular set of parameters associated with the selected one of the plurality of pre-defined publish lists.

18. The field device according to claim 17, wherein the client device or application is another field device.

19. The field device according to claim 17, wherein the plurality of pre-defined publish lists include one or more manufacturer-defined publish lists.

20. The field device according to claim 17, wherein the plurality of pre-defined publish lists include one or more user-defined publish lists.

21. The field device according to claim 17, wherein the plurality of pre-defined publish lists include one or more custom publish lists.

22. The field device according to claim 17, wherein the at least two available publish categories include a monitor and control publish category, and wherein publish lists corresponding to the monitor and control publish category include parameters of the field device related to performing control actions.

23. The field device according to claim 17, wherein the at least two available publish categories include a condition monitoring category, and wherein publish lists corresponding to the condition monitoring publish category include parameters of the field device related to monitoring a health, maintenance, calibration, or energy consumption state of the field device.

24. The field device according to claim 17, wherein at least one of the plurality of pre-defined publish lists comprises an update rate parameter specifying a frequency with which the particular set of parameters in the at least one pre-defined publish list is transmitted to a subscribing client device or application.

25. The field device according to claim 17, wherein the field device is configurable to:

transmit a first set of parameters corresponding to a first one of the plurality of pre-defined publish lists to a first client device or application; and transmit a second set of parameters corresponding to a second one of the plurality of pre-defined publish lists to a second client device or a second application.

26. The field device according to claim 25, wherein the first one of the plurality of predefined publish lists corresponds to a first one of the at least two available publish categories and the second one of the plurality of pre-defined publish lists corresponds to a second one of the at least two available publish categories.

27. The field device according to claim 25, wherein the first client device or application is a controller controlling one or more field devices including the field device and wherein the second client device or the second application is a condition monitoring application monitoring one or more field devices including the field device.

28. The field device according to claim 17, further comprising a communication adapter configured to be coupled to an advanced physical layer (APL) communication network and to receive via the APL communication network a power signal provided by an APL power switch either directly or via one or more APL field switches.

29. A system comprising:

a controller controlling a plant that performs operations on one or more materials to transform the one or more materials into a product;

a communication network; and a plurality of field devices coupled by the communication network to the controller, the plurality of field devices receiving commands from the controller and transmitting parameter values to the controller, each of the plurality of field devices comprising:

a processor; and a memory device, coupled to the processor, the memory device storing (a) a plurality of pre-defined publish lists, each pre-defined publish list corresponding to one of at least two available publish categories, each pre-defined publish list comprising a particular set of parameters associated with a particular field device, and (ii) a set of instructions executable by the processor to cause the processor to:

receive, from a client device or application, during run-time operations of the plant, a message indicating a one of the at least two available publish categories, the one publish category indicating a category of information desired by the client device or application;

transmit, to the client device or application, an identification of each of the plurality of pre-defined publish lists that are stored in the memory device prior to receiving the message from the client device or application, corresponding to the indicated publish category;

receive, from the client device or application, a selection of one of the plurality of pre-defined publish lists identified by the particular field device; and transmit, to the client device or application, the particular set of parameters associated with the selected one of the plurality of pre-defined publish lists.

30. The system according to claim 29, wherein the client device or application is the controller.

31. The system according to claim 29, wherein the client device or application is a second field device.

32. The system according to claim 29, wherein the client device or application is an application communicating with the particular field device over the communication network using an edge gateway device.

33. The system according to claim 29, wherein the client device or application is an application executing on a cloud-computing platform and communicating with the particular field device over the communication network.

34. The system according to claim 29, wherein each of the plurality of field devices is configured to receive, from each of multiple different client devices or applications, a corresponding selection of one of the plurality of pre-defined publish lists, and to transmit, to each of the multiple different client devices or applications, the particular set of parameters associated with the particular pre-defined publish list selected by the particular client device or application.

35. The system according to claim 29, wherein each of the plurality of field devices is configured to receive, from a single client device or application, a selection of more than one of the plurality of pre-defined publish lists, and to transmit to the single client device or application, the particular set of parameters associated with each of the more than one of the plurality of pre-defined publish lists.

36. The system according to claim 29, wherein the communication network comprises:

advanced physical layer (APL) Ethernet wiring comprising ruggedized, two-wire, twisted pair Ethernet cable configured to provide loop-powered Ethernet connectivity;

one or more APL power switches each configured to provide Ethernet connectivity to other Ethernet devices and each including a power supply to provide power via the APL Ethernet wiring; and one or more APL field switches, each receiving power from one of the one or more APL power switches via the APL Ethernet wiring, and each configured to distribute both communication signals and power signals to the plurality of field devices communicatively coupled by APL Ethernet wiring to a respective APL field switch while complying with intrinsic safety requirements.

37. The system according to claim 29, wherein the plurality of pre-defined publish lists stored in the memory device of each of the plurality of field devices is specific to a type of the particular field device.

38. The system according to claim 37, wherein the type of the particular field device is one of: valve, flow measurement, pressure measurement, level measurement, and temperature measurement.

39. A method comprising:

transmitting to a field device during run-time operations of a process plant, a message indicating a selection of a first one of a plurality of publish categories, each of the plurality of publish categories corresponding to a type of information;

receiving, from the field device, an identification of each of a plurality of publish lists that are pre-defined and stored on the field device prior to receiving the message, the identification corresponding to the first one of the plurality of publish categories, each of the plurality of publish lists comprising a particular set of parameters associated with the field device;

transmitting to the field device a selection of a first one of the plurality of publish lists identified by the field device; and receiving, from the field device, the particular set of parameters associated with the first one of the plurality of publish lists.

* * * * *